United States Patent
Kissler et al.

(10) Patent No.: US 12,545,895 B2
(45) Date of Patent: *Feb. 10, 2026

(54) PROTECTION OF BETA CELLS FROM IMMUNE ATTACK

(71) Applicant: Joslin Diabetes Center, Boston, MA (US)

(72) Inventors: Stephan Kissler, Arlington, MA (US); Peng Yi, Needham, MA (US)

(73) Assignee: Joslin Diabetes Center, Boston, MA (US)

( * ) Notice: Subject to any disclaimer, the term of this patent is extended or adjusted under 35 U.S.C. 154(b) by 33 days.

This patent is subject to a terminal disclaimer.

(21) Appl. No.: 18/330,020

(22) Filed: Jun. 6, 2023

(65) Prior Publication Data
US 2024/0240152 A1 Jul. 18, 2024

Related U.S. Application Data

(63) Continuation of application No. 16/542,721, filed on Aug. 16, 2019, now Pat. No. 11,708,561, which is a continuation of application No. PCT/US2018/019862, filed on Feb. 27, 2018.

(60) Provisional application No. 62/464,532, filed on Feb. 28, 2017.

(51) Int. Cl.
| | | |
|---|---|---|
| C12N 15/00 | (2006.01) | |
| A61K 35/39 | (2015.01) | |
| A61P 3/10 | (2006.01) | |
| C12N 5/071 | (2010.01) | |
| C12N 15/90 | (2006.01) | |

(52) U.S. Cl.
CPC ............ *C12N 5/0676* (2013.01); *A61K 35/39* (2013.01); *A61P 3/10* (2018.01); *C12N 15/907* (2013.01); *C12N 2310/20* (2017.05); *C12N 2510/00* (2013.01); *C12N 2800/80* (2013.01)

(58) Field of Classification Search
CPC ... C12N 15/00; C12N 2510/00; C12N 5/0676
See application file for complete search history.

(56) References Cited

U.S. PATENT DOCUMENTS

2013/0023491 A1 1/2013 Annes et al.

FOREIGN PATENT DOCUMENTS

| WO | 2009045403 A2 | 4/2009 |
| WO | 2016040330 A1 | 3/2016 |

OTHER PUBLICATIONS

Matsumoto et al. (2006) "Pancreatic islet transplantation for treating diabetes" Expert Opinion on Biological Therapy, 6(1), 23-37. (Year: 2006).*
Palazzo et al. (2024) "The influence of glutamate receptors on insulin release and diabetic neuropathy" Pharmacology & Therapeutics, 263, 108724, 12 pages. (Year: 2024).*
Cai et al. (2020) "Genome-scale in vivo CRISPR screen identifies RNLS as a target for beta cell protection in type 1 diabetes" Nature metabolism, 2:934-945. (Year: 2020).*
Addgene, "Mouse Cris Pr Knockout Pooled Library (GeCKO v2)", webpage: www.addgene.org/pooled-library/zhang-mouse-gecko-v2/, accessed: Jun. 3, 2022, library published: Mar. 9, 2015.
Ariyachet, C. et al. "Reprogrammed Stomach Tissue as a Renewable Source of Functional β Cells for Blood Glucose Regulation" Cell Stem Cell 18(3):410-21 (Mar. 2016).
Ben-Othman, N. et al. "Long-Term GABA Administration Induces Alpha Cell-Mediated Beta-like Cell Neogenesis" Cell 168(1-2):73-85 (Jan. 12, 2017).
Brorsson, C.A. et al. "Genetic Risk Score Modelling for Disease Progression in New-Onset Type 1 Diabetes Patients: Increased Genetic Load of Islet-Expressed and Cytokine-Regulated Candidate Genes Predicts Poorer Glycemic Control" Journal of Diabetes Research, vol. 2016, Article ID 9570424, 8 pages. (Jan. 2016).
Guo, X. et al. "Inhibition of renalase expression and signaling has antitumor activity in pancreatic cancer" Scientific reports, 6(1), 1-10 (Mar. 2016).
Hamaguchi, K. et al. "NIT-1, a pancreatic beta-cell line established from a transgenic NOD/Lt mouse" Diabetes 40:842-9 (Jul. 1991).
Howson, J.M.M. et al. "Evidence of gene-gene interaction and age-at-diagnosis effects in type 1 diabetes" Diabetes, 61(11): 3012-3017 (Nov. 2012).
International Search Report and Written Opinion for PCT/US2018/019862 dated Jul. 9, 2018.
Kroon, E. et al. "Pancreatic endoderm derived from human embryonic stem cells generates glucose-responsive insulin-secreting cells in vivo" Nature Biotech 26(4):443-452 (Feb. 2008).
Li, J. et al. "Artemisinins Target GABAA Receptor Signaling and Impair a Cell Identity" Cell 168:86-100 (Jan. 12, 2017).
Li, X. et al. "Renalase, a new secretory enzyme: Its role in hypertensive-ischemic cardiovascular diseases" Medical Science Monitor: international medical journal of experimental and clinical research, 20, 688 (Apr. 2014).
Moede, T. et al. "Alpha cell regulation of beta cell function" Diabetologia, 63(10):2064-2075 (Oct. 2020).
Morita, S. et al. "Targeting ABL-IRE1α Signaling Spares ER-Stressed Pancreatic β Cells to Reverse Autoimmune Diabetes" Cell Metabolism; 25(4):883-897 (Apr. 4, 2017).
Mosmann, T. "Rapid colorimetric assay for cellular growth and survival: application to proliferation and cytotoxicity assays" J Immunol Methods 65(1-2):55-63 (Dec. 1983).
Pagliuca, F.W. et al. "Generation of functional human pancreatic β cells in vitro" Cell 159:428-439 (Oct. 2014).
Pearson, J.A. et al. "The importance of the Non Obese Diabetic (NOD) mouse model in autoimmune diabetes" J. Autoimmun. 66:76-88 (Jan. 2016).
Podkowa, K et al. "Group II mGlu receptor antagonist LY341495 enhances the antidepressant-like effects of ketamine in the forced swim test in rats" Psychopharmacology (Berl) 233(15-16):2901-14 (Aug. 2016).

(Continued)

*Primary Examiner* — James Joseph Graber
(74) *Attorney, Agent, or Firm* — McNeill PLLC

(57) ABSTRACT

Compositions of genetically modified beta-like cells are encompassed. Also encompassed are methods of treatment of type 1 diabetes using these compositions or compositions that inhibit the function of the identified genes.

14 Claims, 12 Drawing Sheets

Specification includes a Sequence Listing.

(56) References Cited

OTHER PUBLICATIONS

Rezania, A. et al. "Reversal of diabetes with insulin-producing cells derived in vitro from human pluripotent stem cells" Nature Biotech 32(11):1121-1133 (Nov. 2014).

Sanjana, N.E. et al. "Improved vectors and genome-wide libraries for CRISPR screening" Nature methods, 11 (8):783-784 (Aug. 2014).

Steinfeld, H. et al. "Mutations in H IVEP2 are associated with developmental delay, intellectual disability, and dysmorphic features" Neurogenetics, 17(3), 159-164 (Mar. 2016).

Xie, M. et al. "β-cell-mimetic designer cells provide closed-loop glycemic control" Science 354(6317):1296-1301 (Dec. 2016).

Zhou, Q. et al. "In vivo reprogramming of adult pancreatic exocrine cells to beta-cells" Nature 455(7213):627-633 (Oct. 2008).

* cited by examiner gene locus

T7E1 assay

PROTECTION OF BETA CELLS FROM IMMUNE ATTACK

This application is a Continuation of U.S. application Ser. No. 16/542,721, which issued on Jul. 25, 2023, as U.S. Pat. No. 11,708,561, which was filed on Aug. 16, 2019, which is a Continuation of International Application PCT/US2018/019862, which was filed on Feb. 27, 2018, which claims the benefit of priority to U.S. Provisional Application No. 62/464,532, which was filed on Feb. 28, 2017, and both of which are incorporated by reference in their entirety.

REFERENCE TO SEQUENCE LISTING

The present application contains a Sequence Listing which has been submitted electronically in XML format. Said XML copy, created on Jun. 2, 2023, is named "2023-06-02-01123-0008-01US-ST26" and is 89,172 bytes in size. The information in the electronic format of the sequence listing is incorporated herein by reference in its entirety.

BACKGROUND

Type 1 diabetes is caused by a malfunctioning immune system that targets and destroys healthy insulin-producing beta cells in the pancreas. Strategies to tame the immune attack on beta cells may ultimately help prevent type 1 diabetes before onset. However, individuals at risk of type 1 diabetes in the general population cannot yet be identified. Furthermore, immune-mediated destruction of beta cells often starts very early in life.

Consequently, a successful immune intervention would help prevent disease in some individuals but will not help patients with long-standing disease or in whom disease-onset could not be predicted in time for prevention. For these patients, a method to replace lost beta cells and restore insulin production is urgently needed and will remain essential even when successful immune therapies exist.

Two approaches have been proposed to replenish beta cell mass in patients with type 1 diabetes. Beta cells could be regenerated by stimulating the patient's own cells to cause beta cell replication or to cause other cell types (e.g. precursor cells, pancreatic ductal cells, exocrine cells, or alpha cells) to become beta cells. The advantages of this approach are that it is non-invasive and that new beta cells would be perfectly well tolerated by the patient compared to an allogenic islet transplant. The critical caveat is that newly generated beta cells will be as susceptible to autoimmune killing as the patient's original beta cells. Therefore, beta cell regeneration would only be effective in combination with a successful immune therapy that abrogates autoimmunity.

Alternatively, beta cells can be provided from external sources. Several groups have demonstrated that induced human pluripotent stem cells (hiPSCs) can be reprogrammed into beta-like cells that secrete insulin in response to glucose stimulation. hiPSCs can be derived from a patient's own blood or skin cells. Conceivably, one day clinicians may be able to use a patient's own cells to generate vast amounts of beta-like cells in the laboratory that could be transplanted back into the same individual. Alternatively, some researchers have postulated that cells could be generated that are 'universal-donor' cells and could be used to treat any patient. Regardless of the source of these newly generated beta-like cells, one key challenge will be to protect them against the autoimmune attack that underlies type 1 diabetes.

Protection against immune killing could be achieved by a physical barrier, and a number of laboratories have a long-standing interest in developing beta cell encapsulation whereby beta cells are packaged within a man-made device that keeps immune cells out. Encapsulation poses many challenges such as packaging a sufficiently large number of cells, allowing proper oxygenation of densely packed cells and preventing fibrosis around the artificial device. Furthermore, encapsulation of beta cell can cause a delay in insulin secretion and action.

Achieving protection without the need for a physical barrier would overcome all of these issues. The killing of beta cells by immune cells proceeds in two stages. First, immune cells must recognize beta cells by interacting with cell surface molecules including HLA molecules. In a second step, immune cells launch an attack to kill beta cells. This attack may come in the form of cytokines, death-receptor ligands (e.g. FasL) or cytolytic molecules (e.g. perforin and granzymes). With the advent of CRISPR/Cas technology and other highly-efficient genome editing methods, it has become possible to precisely engineer hiPSCs. This has led to the prospect of generating gene-modified beta cells with mutations that protect against immune killing.

One approach would then be to target known molecules involved in immune recognition. This strategy may seem promising, however the immune system has evolved many complementary and redundant mechanisms to identify and kill target cells. Driven by the pressures of constantly-evolving pathogens that try to evade host immunity, the immune system has become exceedingly flexible in its ability to find and destroy cells it believes to be diseased. Trying to subvert the immune system by mutating only those molecules we know to be involved in immune recognition may prove futile.

Described herein are unbiased experiments that assess a wide range of genetic modifications to find loss-of-function (LOF) mutations that protect beta cells from autoimmune destruction. These mutations provide therapeutic targets that, individually or in combination, allow genetic engineering to develop beta or beta-like cells resistant to the immune killing that underlies type 1 diabetes. Administration of these engineered beta or beta-like cells may be a novel means to promote survival of beta or beta-like cell transplants in patients with type 1 diabetes.

SUMMARY

In accordance with the description, a composition is provided comprising a human beta-like cell, wherein the beta-like cell is capable of producing insulin in response to glucose, and wherein the beta-like cell is genetically or otherwise modified to inhibit expression of one or more of menin (SEQ ID No: 1); transcription factor HIVEP2 (SEQ ID No: 2); renalase (SEQ ID No: 3); lengsin (SEQ ID No: 4); eIF-2-alpha kinase activator GCN1 (SEQ ID No: 5); perilipin-4 (SEQ ID No: 6); mediator of RNA polymerase II transcription subunit 11 (SEQ ID No: 7); protein-glutamine gamma-glutamyltransferase 6 (SEQ ID No: 8); zinc finger BED domain-containing protein 3 (SEQ ID No: 9); and metabotropic glutamate receptor 2 (SEQ ID No: 10).

In some embodiments, the genetic modification inhibits expression of menin (SEQ ID No: 1).

In some embodiments, the genetic modification inhibits expression of transcription factor HIVEP2 (SEQ ID No: 2).

In some embodiments, the genetic modification inhibits expression of renalase (SEQ ID No: 3).

In some embodiments, the genetic modification inhibits expression of lengsin (SEQ ID No: 4).

In some embodiments, the genetic modification inhibits expression of eIF-2-alpha kinase activator GCN1 (SEQ ID No: 5).

In some embodiments, the genetic modification inhibits expression of perilipin-4 (SEQ ID No: 6).

In some embodiments, the genetic modification inhibits expression of mediator of RNA polymerase II transcription subunit 11 (SEQ ID No: 7).

In some embodiments, the genetic modification inhibits expression of protein-glutamine gamma-glutamyltransferase 6 (SEQ ID No: 8).

In some embodiments, the genetic modification inhibits expression of zinc finger BED domain-containing protein 3 (SEQ ID No: 9).

In some embodiments, the genetic modification inhibits expression of metabotropic glutamate receptor 2 (SEQ ID No: 10).

In some embodiments, the beta-like cell is a pancreatic beta cell isolated from a human, non-human primate, cow, horse, pig, sheep, goat, dog, cat, or rodent.

In some embodiments, the beta-like cell is generated from a stem cell.

In some embodiments, the stem cell is an adult stem cell, pluripotent stem cell, or embryonic stem cell. In some embodiments, the stem cell is a hematopoietic stem cell, bone marrow stromal stem cell, or mesenchymal stem cell.

In some embodiments, the beta-like cell is a cell that is reprogrammed or transdifferentiated. In some embodiments, the reprogrammed or transdifferentiated cell is a pancreatic alpha cell. In some embodiments, the reprogrammed or transdifferentiated cell is a pancreatic exocrine cell. In some embodiments, the reprogrammed or transdifferentiated cell is a gut or stomach cell.

In some embodiments, the genetic modification is a substitution, insertion, deletion, or excision of one or more nucleotides.

In some embodiments, the genetic modification is performed using the CRISPR/Cas9 system. In some embodiments, the guide RNA is selected from the guide RNAs in Table 2 (SEQ ID Nos: 23-35).

In some embodiments, the genetic modification is performed using zinc-finger nucleases.

In some embodiments, the genetic modification is performed using transcription activator-like effector nucleases (TALENs).

In some embodiments, the genetic modification is performed using meganucleases.

In some embodiments, the genetic modification is performed using group one intron encoded endonucleases (GIIEE).

In some embodiments, the genetic modification is within the coding region of the gene, and no gene product is expressed, or a non-functional gene product is produced.

In some embodiments, the genetic modification is not within a coding region of the gene, and no gene product is expressed or a non-functional gene product is produced.

In some embodiments, survival of the beta-like cells over 1, 2, 3, 4, 5, 6, 12, 18, 24, or 36 months is improved compared to beta-like cells without the genetic modification.

In some embodiments, proliferation of beta-like cells over 1, 2, 3, 4, 5, 6, 12, 18, 24, or 36 months is improved compared to beta-like cells without the genetic modification.

In some embodiments, a method of lowering blood glucose in a subject comprises administering any one of the compositions described herein.

In some embodiments, a method of increasing insulin secretion in response to glucose in a subject comprises administering any one of the compositions described herein.

In some embodiments, a method of treating type 1 diabetes in a subject comprises administering any one of the compositions described herein.

In some embodiments, a method of treating type 1 diabetes in a subject comprises administering an agent that genetically modifies any one of human menin (SEQ ID No: 1); transcription factor HIVEP2 (SEQ ID No: 2); renalase (SEQ ID No: 3); lengsin (SEQ ID No: 4); eIF-2-alpha kinase activator GCN1 (SEQ ID No: 5); perilipin-4 (SEQ ID No: 6); mediator of RNA polymerase II transcription subunit 11 (SEQ ID No: 7); protein-glutamine gamma-glutamyltransferase 6 (SEQ ID No: 8); zinc finger BED domain-containing protein 3 (SEQ ID No: 9); and metabotropic glutamate receptor 2 (SEQ ID No: 10).

In some embodiments, a method of preventing the death of pancreatic islet cells comprises administering any one of the compositions described herein.

In some embodiments, a method of preventing the death of pancreatic islet cells comprises administering an agent that genetically modifies any one of human menin (SEQ ID No: 1); transcription factor HIVEP2 (SEQ ID No: 2); renalase (SEQ ID No: 3); lengsin (SEQ ID No: 4); eIF-2-alpha kinase activator GCN1 (SEQ ID No: 5); perilipin-4 (SEQ ID No: 6) mediator of RNA polymerase II transcription subunit 11 (SEQ ID No: 7); protein-glutamine gamma-glutamyltransferase 6 (SEQ ID No: 8); zinc finger BED domain-containing protein 3 (SEQ ID No: 9); and metabotropic glutamate receptor 2 (SEQ ID No: 10).

In some embodiments, a method of ameliorating type 1 diabetes in a subject comprises administering any one of the compositions described herein. In some embodiments, the subject has a blood sugar level higher than 11.1 mmol/liter or 200 mg/dl.

In some embodiments, the subject is a mammal. In some embodiments, the mammal is a human.

In some embodiments, a composition is administered in combination with an additional treatment.

In some embodiments, the additional treatment is insulin. In some embodiments, the insulin is a rapid-acting, intermediate-acting, or long-acting insulin.

In some embodiments, the additional treatment is a glucagon-like peptide analog or agonist, dipeptidyl peptidase-4 inhibitor, amylin analog, biguanide, thiazolidinedione, sulfonylurea, meglitinide, alpha-glucosidase inhibitor, or sodium/glucose transporter 2 inhibitor.

In some embodiments, the beta-like cells are administered by transplant into the pancreas, liver, or fat pads via surgery, injection, or infusion.

In some embodiments, a method of treating type 1 diabetes in a subject comprises administering a composition that inhibits the function of any one of human menin (SEQ ID No: 1); transcription factor HIVEP2 (SEQ ID No: 2); renalase (SEQ ID No: 3); lengsin (SEQ ID No: 4); eIF-2-alpha kinase activator GCN1 (SEQ ID No: 5); perilipin-4 (SEQ ID No: 6); mediator of RNA polymerase II transcription subunit 11 (SEQ ID No: 7); protein-glutamine gamma-glutamyltransferase 6 (SEQ ID No: 8); zinc finger BED domain-containing protein 3 (SEQ ID No: 9); and metabotropic glutamate receptor 2 (SEQ ID No: 10).

In some embodiments, the composition inhibits the function of metabotropic glutamate receptor 2 (SEQ ID No: 10). In some embodiments, the composition is LY341495, (2S)-α-ethylglutamic acid (EGLU), or MGS-0039.

In some embodiments, a method of preventing the death of pancreatic islet cells comprises administering a composition that inhibits the function of any one of human menin (SEQ ID No: 1); transcription factor HIVEP2 (SEQ ID No: 2); renalase (SEQ ID No: 3); lengsin (SEQ ID No: 4); eIF-2-alpha kinase activator GCN1 (SEQ ID No: 5); perilipin-4 (SEQ ID No: 6); mediator of RNA polymerase II transcription subunit 11 (SEQ ID No: 7); protein-glutamine gamma-glutamyltransferase 6 (SEQ ID No: 8); zinc finger BED domain-containing protein 3 (SEQ ID No: 9); and metabotropic glutamate receptor 2 (SEQ ID No: 10).

In some embodiments, the composition inhibits the function of metabotropic glutamate receptor 2 (SEQ ID No: 10). In some embodiments, the composition is LY341495, (2S)-α-ethylglutamic acid (EGLU), or MGS-0039.

Additional objects and advantages will be set forth in part in the description which follows, and in part will be obvious from the description, or may be learned by practice. The objects and advantages will be realized and attained by means of the elements and combinations particularly pointed out in the appended claims.

It is to be understood that both the foregoing general description and the following detailed description are exemplary and explanatory only and are not restrictive of the claims.

The accompanying drawings, which are incorporated in and constitute a part of this specification, illustrate one (several) embodiment(s) and together with the description, serve to explain the principles described herein.

BRIEF DESCRIPTION OF THE DRAWINGS

FIG. 5A shows location of primers in relation to gRNA targeting site. FIG. 5B shows design of the T7E1 assay. FIG. 5C shows editing data in NIT-1 stable cell lines.

FIG. 6A shows an overview of the assay. FIG. 6B shows results of staining for active caspase 3 at 24 hours. FIG. 6C shows a summary of cell death in different conditions. The ratios represent ratios of splenocytes to NIT-1 cells. For example, 50:1 indicates 50-times more splenocytes than NIT-1 cells, while 0:1 indicates NIT-1 cells cultured without splenocytes. $P<0.0001=****$.

DESCRIPTION OF THE SEQUENCES

Figure 1:
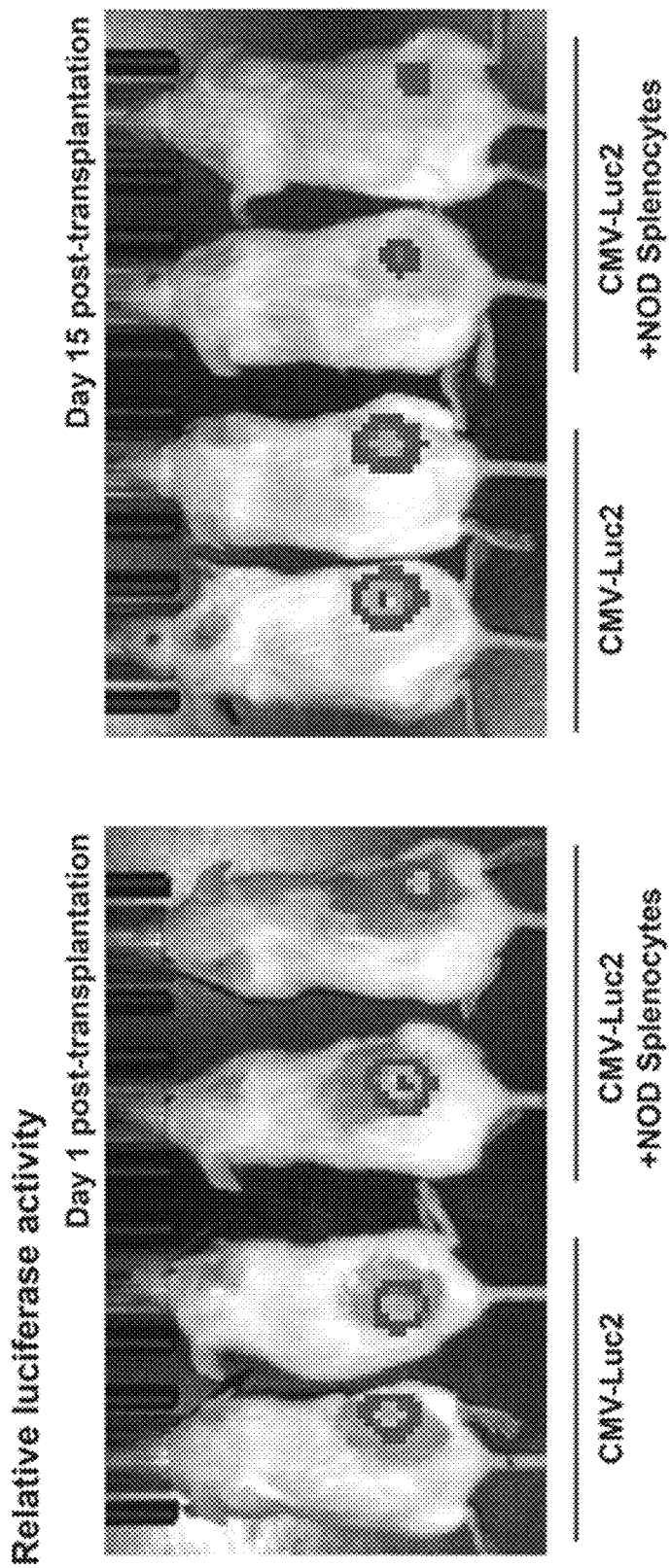
FIG. 1 shows non-invasive live imaging of CMV-Luc2 lentivirus infected NIT-1 cells in non-obese diabetic (NOD) .severe combined immune deficiency (scid) mice (NOD.scid mice). Images on left show imaging on Day 1 post-transplantation, while images on the right show imaging on Day 15 post-transplantation. One set of mice also had transfer of splenocytes from diabetic NOD mice (NOD splenocytes).

Table 1 provides a listing of certain sequences referenced herein.

TABLE 1

Description of the Sequences

| Description | Sequences | SEQ ID NO |
|---|---|---|
| Human Menin protein (MEN1 gene product) (UniprotKB-O00255) | MGLKAAQKTLFPLRSIDDVVRLFAAELGREEPDLVLLSLVLGFVE HFLAVNRVIPTNVPELTFQPSPAPDPPGGLTYFPVADLSIIAALY ARFTAQIRGAVDLSLYPREGGVSSRELVKKVSDVIWNSLSRSYFK DRAHIQSLFSFITGWSPVGTKLDSSGVAFAVVGACQALGLRDVHL ALSEDHAWVVFGPNGEQTAEVTWHGKGNEDRRGQTVNAGVAERSW LYLKGSYMRCDRKMEVAFMVCAINPSIDLHTDSLELLQLQQKLLW LLYDLGHLERYPMALGNLADLEELEPTPGRPDPLTLYHKGIASAK TYYRDEHIYPYMYLAGYHCRNRNVREALQAWADTATVIQDYNYCR EDEEIYKEFFEVANDVIPNLLKEAASLLEAGEERPGEQSQGTQSQ GSALQDPECFAHLLRFYDGICKWEEGSPTPVLHVGWATFLVQSLG RFEGQVRQKVRIVSREAEAAEAEEPWGEEAREGRRRGPRRESKPE EPPPPKKPALDKGLGTGQGAVSGPPRKPPGTVAGTARGPEGGSTA QVPAPTASPPPEGPVLTFQSEKMKGMKELLVATKINSSAIKLQLT AQSQVQMKKQKVSTPSDYTLSFLKRQRKGL | 1 |

TABLE 1-continued

Description of the Sequences

| Description | Sequences | SEQ ID NO |
|---|---|---|
| Human transcription factor HIVEP2 (HIVEP2 gene product) (UniProtKB-P31629) | MDTGDTALGQKATSRSGETDKASGRWRQEQSAVIKMSTFGSHEGQ RQPQIEPEQIGNTASAQLFGSGKLASPSEVVQQVAEKQYPPHRPS PYSCQHSLSFPQHSLPQGVMHSTKPHQSLEGPPWLFPGPLPSVAS EDLFPFPIHGHSGGYPRKKISSLNPAYSQYSQKSIEQAEEAHKKE HKPKKPGKYICPYCSRACAKPSVLKKHIRSHTGERPYPCIPCGFS FKTKSNLYKHRKSHAHAIKAGLVPFTESAVSKLDLEAGFIDVEAE IHSDGEQSTDTDEESSLFAEASDKMSPGPPIPLDIASRGGYHGSL EESLGGPMKVPILIIPKSGIPLPNESSQYIGPDMLPNPSLNTKAD DSHTVKQKLALRLSEKKGQDSEPSLNLLSPHSKGSTDSGYFSRSE SAEQQISPPNTNAKSYEEIIFGKYCRLSPRNALSVTTTSQERAAM GRKGIMEPLPHVNTRLDVKMFEDPVSQLIPSKGDVDPSQTSMLKS TKFNSESRQPQIIPSSIRNEGKLYPANFQGSNPVLLEAPVDSSPL IRSNSVPTSSATNLTIPPSLRGSHSFDERMTGSDDVFYPGTVGIP PQRMLRRQAAFELPSVQEGHVEVEHHGRMLKGISSSSLKEKKLSP GDRVGYDYDVCRKPYKKWEDSETPKQNYRDISCLSSLKHGGEYFM DPVVPLQGVPSMFGTICENRKRRKEKSVGDEEDIPMICSSIVSTP VGIMASDYDPKLQMQEGVRSGFAMAGHENLSHGHTERFDPCRPQL QPGSPSLVSEESPSAIDSDKMSDLGGRKPPGNVISVIQHTNSLSR PNSFERSESAELVACTQDKAPSPSETCDSEISEAPVSPEWAPPGD GAESGGKPSPSQQVQQQSYHTQPRLVRQHNIQVPEIRVTEEPDKP EKEKEAQSKEPEKPVEEFQWPQRSETLSQLPAEKLPPKKKRLRLA DMEHSSGESSFESTGTGLSRSPSQESNLSHSSSFSMSFEREETSK LSALPKQDEFGKHSEFLTVPAGSYSLSVPGHHHQKEMRRCSSEQM PCPHPAEVPEVRSKSFDYGNLSHAPVSGAAASTVSPSRERKKCFL VRQASFSGSPEISQGEVGMDQSVKQEQLEHLHAGLRSGWHHGPPA VLPPLQQEDPGKQVAGPCPPLSSGPLHLAQPQIMHMDSQESLRNP LIQPTSYMTSKHLPEQPHLFPHQETIPFSPIQNALFQFQYPTVCM VHLPAQQPPWWQAHFPHPFAQHPQKSYGKPSFQTEIHSSYPLEHV AEHTGKKPAEYAHTKEQTYPCYSGASGLHPKNLLPKFPSDQSSKS TETPSEQVLQEDFASANAGSLQSLPGTVVPVRIQTHVPSYGSVMY TSISQILGQNSPAIVICKVDENMIQRTLVINAAMQGIGFNIAQVL GQHAGLEKYPIWKAPQTLPLGLESSIPLCLPSTSDSVATLGGSKR MLSPASSLELFMETKQQKRVKEEKMYGQIVEELSAVELTNSDIKK DLSRPQKPQLVRQGCASEPKDGLQSGSSSFSSLSPSSSQDYPSVS PSSREPFLPSKEMLSGSRAPLPGQKSSGPSESKESSDELDIDETA SDMSMSPQSSSLPAGDGQLEEEGKGHKRPVGMLVRMASAPSGNVA DSTLLLTDMADFQQILQFPSLRTTTTVSWCFLNYTKPNYVQQATF KSSVYASWCISSCNPNPSGLNTKTTLALLRSKQKITAEIYTLAAM HRPGTGKLTSSSAWKQFTQMKPDASFLFGSKLERKLVGNILKERG KGDIHGDKDIGSKQTEPIRIKIFEGGYKSNEDYVYVRGRGRGKYI CEEECGIRCKKPSMLKKHIRTHTDVRPYVCKLCNFAFKTKGNLTKH MKSKAHMKKCLELGVSMTSVDDTETEEAENLEDLHKAAEKHSMSS ISTDHQFSDAEESDGEDGDDNDDDDEDEDDFDDQGDLTPKTRSRS TSPQPPRFSSLPVNVGAVPHGVPSDSSLGHSSLISYLVTLPSIRV TQLMTPSDSCEDTQMTEYQRLFQSKSTDSEPDKDRLDIPSCMDEE CMLPSEPSSSPRDFSPSSHHSSPGYDSSPCRDNSPKRYLIPKGDL SPRRHLSPRRDLSPMRHLSPRKEAALRREMSQRDVSPRRHLSPRR PVSPGKDITARRDLSPRRERRYMTTIRAPSPRRALYHNPPLSMGQ YLQAEPIVLGPPNLRRGLPQVPYFSLYGDQEGAYEHPGSSLFPEG PNDYVFSHLPLHSQQQVRAPIPMVPVGGIQMVHSMPPALSSLHPS PTLPLPMEGFEEKKGASGESFSKDPYVLSKQHEKRGPHALQSSGP PSTPSSPRLLMKQSTSEDSLNATEREQEENIQTCTKAIASLRIAT EEAALLGPDQPARVQEPHQNPLGSAHVSIRHFSRPEPGQPCTSAT HPDLHDGEKDNFGTSQTPLAHSTFYSKSCVDDKQLDFHSSKELSS STEESKDPSSEKSQLH | 2 |
| Human renalase protein (RNLS gene product) (UniProtKB-Q5VYX0) | MAQVLIVGAGMTGSLCAALLRRQTSGPLYLAVWDKAEDSGGRMIT ACSPHNPQCTADLGAQYITCTPHYAKKHQRFYDELLAYGVLRPLS SPIEGMVMKEGDCNFVAPQGISSIIKHYLKESGAEVYFRHRVTQI NLRDDKWEVSKQTGSPEQFDLIVLTMPVPEILQLQGDITTLISEC QRQQLEAVSYSSRYALGLFYEAGTKIDVPWAGQYITSNPCIRPVS IDNKKRNIESSEIGPSLVIHTTVPFGVTYLEHSIEDVQELVFQQL ENILPGLPQPIATKCQKWRHSQVTNAAANCPGQMTLHHKPFLACG GDGFTQSNFDGCITSALCVLEALKNYI | 3 |
| Human lengsin (LGSN gene product) (UniProtKB-Q5TDP6) | MNNEEDLLQEDSTRDEGNETEANSMNTLRRTRKKVTKPYVCSTEV GETDMSNSNDCMRDSSQILTPPQLSSRMKHIRQAMAKNRLQFVRF EATDLHGVSRSKTIPAHFFQEKVSHGVCMPRGYLEVIPNPKDNEM NNIRATCFNSDIVLMPELSTFRVLPWADRTARVICDTFTVTGEPL LTSPRYIAKRQLSHLQASGFSLLSAFIYDFCIFGVPEILNSKIIS FPALTFLNNHDQPFMQELVDGLYHTGANVESFSSSTRPGQMEISF LPEFGISSADNAFTLRTGVKEVARKYNYIASFFIETGFCDSGILS HSLWDVDRKKNMFCSTSGTEQLTITGKKWLAGLLKHSAALSCLMA PSVSCRKRYSKDRKDLKKSVPTTWGYNDNSCIFNIKCHGEKGTRI | 4 |

TABLE 1-continued

Description of the Sequences

| Description | Sequences | SEQ ID NO |
|---|---|---|
| | ENKLGSATANPYLVLAATVAAGLDGLHSSNEVLAGPDESTDFYQV EPSEIPLKLEDALVALEEDQCLRQALGETFIRYFVAMKKYELENE EIAAERNKFLEYFI | |
| Human eIF-2-alpha kinase activator GCN1 (GCN1 gene product) (UniProtKB-Q92616) | MAADTQVSETLKRFAGKVTTASVKERREILSELGKCVAGKDLPEG AVKGLCKLFCLTLHRYRDAASRRALQAAIQQLAEAQPEATAKNLL HSLQSSGIGSKAGVPSKSSGSAALLALTWTCLLVRIVFPSRAKRQ GDIWNKLVEVQCLLLLEVLGGSHKHAVDGAVKKLTKLWKENPGLV EQYLSAILSLEPNQNYAGMLGLLVQFCTSHKEMDVVSQHKSALLD FYMKNILMSKVKPPKYLLDSCAPLLRYLSHSEFKDLILPTIQKSL LRSPENVIETISSLLASVTLDLSQYAMDIVKGLAGHLKSNSPRLM DEAVLALRNLARQCSDSSAMESLTKHLFAILGGSEGKLTVVAQKM SVLSGIGSVSHHVVSGPSSQVLNGIVAELFIPFLQQEVHEGTLVH AVSVLALWCNRFTMEVPKKLTEWFKKAFSLKTSTSAVRHAYLQCM LASYRGDTLLQALDLLPLLIQTVEKAASQSTQVPTITEGVAAALL LLKLSVADSQAEAKLSSFWQLIVDEKKQVFTSEKFLVMASEDALC TVLHLTERLFLDHPHRLTGNKVQQYHRALVAVLLSRTWHVRRQAQ QTVRKLLSSLGGFKLAHGLLEELKTVLSSHKVLPLEALVTDAGEV TEAGKAYVPPRVLQEALCVISGVPGLKGDVTDTEQLAQEMLIISH HPSLVAVQSGLWPALLARMKIDPEAFITRHLDQIIPRMTTQSPLN QSSMNAMGSLSVLSPDRVLPQLISTITASVQNPALRLVTREEFAI MQTPAGELYDKSIIQSAQQDSIKKANMKRENKAYSFKEQIIELEL KEEIKKKKGIKEEVQLTSKQKEMLQAQLDREAQVRRRLQELDGEL EAALGLLDIILAKNPSGLTQYIPVLVDSFLPLLKSPLAAPRIKNP FLSLAACVMPSRLKALGTLVSHVTLRLLKPECVLDKSWCQEELSV AVKRAVMLLHTHTITSRVGKGEPGAAPLSAPAFSLVFPFLKMVLT EMPHHSEEEEEWMAQILQILTVQAQLRASPNTPPGRVDENGPELL PRVAMLRLLTWVIGTGSPRLQVLASDTLTTLCASSSGDDGCAFAE QEEVDVLLCALQSPCASVRETVLRGLMELHMVLPAPDTDEKNGLN LLRRLWVVKFDKEEEIRKLAERLWSMMGLDLQPDLCSLLIDDVIY HEAAVRQAGAEALSQAVARYQRQAAEVMGRLMEIYQEKLYRPPPV LDALGRVISESPPDQWEARCGLALALNKLSQYLDSSQVKPLFQFF VPDALNDRHPDVRKCMLDAALATLNTHGKENVNSLLPVFEEFLKN APNDASYDAVRQSVVVLMGSLAKHLDKSDPKVKPIVAKLIAALST PSQQVQESVASCLPPLVPAIKEDAGGMIQRLMQQLLESDKYAERK GAAYGLAGLVKGLGILSLKQQEMMAALTDAIQDKKNFRRREGALF AFEMLCTMLGKLFEPYVVHVLPHLLLCFGDGNQYVREAADDCAKA VMSNLSAHGVKLVLPSLLAALEEESWRTKAGSVELLGAMAYCAPK QLSSCLPNIVPKLTEVLTDSHVKVQKAGQQALRQIGSVIRNPEIL AIAPVLLDALTDPSRKTQKCLQTLLDTKFVHFIDAPSLALIMPIV QRAFQDRSTDTRKMAAQIIGNMYSLTDQKDLAPYLPSVTPGLKAS LLDPVPEVRTVSAKALGAMVKGMGESCFEDLLPWLMETLTYEQSS VDRSGAAQGLAEVMAGLGVEKLEKLMPEIVATASKVDIAPHVRDG YIMMFNYLPITFGDKFTPYVVGPIIPCILKALADENEFVRDTALRA GQRVISMYAETAIALLLPQLEQGLFDDLWRIRFSSVQLLGDLLFH ISGVIGKMITETASEDDNFGTAQSNKAIITALGVERRNRVLAGLY MGRSDTQLVVRQASLHVWKIVVSNTPRTLREILPTLFGLLLGFLA STCADKRTIAARTLGDLVRKLGEKILPEIIPILEEGLRSQKSDER QGVCIGLSEIMKSTSRDAVLYFSESLVPTARKALCDPLEEVREAA AKTFEQLHSTIGHQALEDILPFLLKQLDDEEVSEFALDGLKQVMA IKSRVVLPYLVPKLTTPPVNTRVLAFLSSVAGDALTRHLGVILPA VMLALKEKLGTPDEQLEMANCQAVILSVEDDIGHRIIIEYLLEAT RSPEVGMRQAAAIILNIYCSRSKADYTSHLRSLVSGLIRLFNDSS PVVLEESWDALNAITKKLDAGNQLALIEELHKEIRLIGNESKGEH VPGFCLPKKGVISILPVLREGVLIGSPEQKEEAAKALGLVIRLTS ADALRPSVVSITGPLIRILGDRFSWNVKAALLETLSLLLAKVGIA LKPFLPQLQTTFTKALQDSNRGVRLKAADALGKLISIHIKVDPLF TELLNGIRAMEDPGVRDTMLQALRPVIQGAGAKVDAVIRKNIVSL LLSMLGHDEDNTRISSAGCLGELCAFLTEEELSAVLQQCLLADVS GIDWMVRHGRSLALSVAVNVAPGRLCAGRYSSDVQEMILSSATAD RIPIAVSGVRGMGFLMRHHIETGGGQLPAKLSSLPVKCLQNPSSD IRLVAEKMIWWANKDPLPPLDPQAIKPILKALLDNIKDKNIVVRA YSDQAIVNLLKMRQGEEVFQSLSKILDVASLEVLNEVNRRSLKKL ASQADSTEQVDDTILT | 5 |
| Human perilipin-4 (PLIN4 gene product) (UniProtKB-Q96Q06) | MQTLGSFFGSLPGFSSARNLVANAHSSARARPAADPTGAPAAEAA QPQAQVAAHPEQTAPWTEKELQPSEKQMVSGAKDLVCSKMSRAKD AVSSGVASVVDVAKGVVQGGLDTTRSALIGTKEVVSSGVTGAMDM AKGAVQGGLDTSKAVLTGTKDTVSTGLTGAVNVAKGTVQAGVDTT KTVLIGTKDIVITGVMGAVNLAKGIVQTGVETSKAVLIGTKDAVS TGLTGAVNVARGSIQTGVDTSKTVLTGTKDTVCSGVTGAMNVAKG TIQTGVDTSKTVLTGTKDTVCSGVTGAMNVAKGTIQTGVDTSKTV LTGTKDTVCSGVTGAMNVAKGTIQTGVDTTKTVLTGTKNTVCSGV TGAVNLAKEAIQGGLDTIKSMVMGTKDIMSTGLIGAANVAKGAMQ | 6 |

TABLE 1-continued

Description of the Sequences

| Description | Sequences | SEQ ID NO |
|---|---|---|
| | TGLNTTQNIATGTKDTVCSGVTGAMNLARGTIQTGVDTTKIVLTG<br>TKDTVCSGVTGAANVAKGAVQGGLDTTKSVLTGTKDAVSTGLTGA<br>VNVAKGTVQTGVDTTKTVLTGTKDTVCSGVTSAVNVAKGAVQGGL<br>DTTKSVVIGTKDTMSTGLTGAANVAKGAVQTGVDTAKTVLTGTKD<br>TVTTGLVGAVNVAKGTVQTGMDTTKTVLTGTKDTIYSGVTSAVNV<br>AKGAVQTGLKTTQNIATGTKNTFGSGVTSAVNVAKGAAQTGVDTA<br>KTVLTGTKDTVTTGLMGAVNVAKGTVQTSVDTTKTVLTGTKDTVC<br>SGVTGAANVAKGAIQGGLDTTKSVLTGTKDAVSTGLTGAVKLAKG<br>TVQTGMDTTKTVLTGTKDAVCSGVTGAANVAKGAVQMGVDTAKTV<br>LTGTKDTVCSGVTGAANVAKGAVQTGLKTTQNIATGTKNTLGSGV<br>TGAAKVAKGAVQGGLDTIKSVLIGTKDAVSTGLIGAVNLAKGIVQ<br>TGVDTSKTVLTGTKDTVCSGVTGAVNVAKGTVQTGVDTAKTVLSG<br>AKDAVTTGVTGAVNVAKGTVQTGVDASKAVLMGTKDTVFSGVTGA<br>MSMAKGAVQGGLDTTKTVLTGTKDAVSAGLMGSGNVATGATHTGL<br>STFQNWLPSTPATSWGGLTSSRTTDNGGEQTALSPQEAPFSGIST<br>PPDVLSVGPEPAWEAAATTKGLATDVATFTQGAAPGREDTGLLAT<br>THGPEEAPRLAMLQNELEGLGDIFHPMNAEEQAQLAASQPGPKVL<br>SAEQGSYFVRLGDLGPSFRQRAFEHAVSHLQHGQFQARDTLAQLQ<br>DCFRLIEKAQQAPEGQPRLDQGSGASAEDAAVQEERDAGVLSRVC<br>GLLRQLHTAYSGLVSSLQGLPAELQQPVGRARHSLCELYGIVASA<br>GSVEELPAERLVQSREGVHQAWQGLEQLLEGLQHNPPLSWLVGPF<br>ALPAGGQ | |
| Human mediator of RNA polymerase II transcription subunit 11 (MED11 gene product) (UniProtKB-Q9P086) | MATYSLANERLRALEDIEREIGAILQNAGTVILELSKEKTNERLL<br>DRQAAAFTASVQHVEAELSAQIRYLTQVATGQPHEGSSYSSRKDC<br>QMALKRVDYARLKLSDVARTCEQMLEN | 7 |
| Human protein-glutamine gamma-glutamyl-transferase (6TGM3L gene product) protein (UniProtKB-O95932) | MAGIRVTKVDWQRSRNGAAHHTQEYPCPELVVRRGQSFSLTLELS<br>RALDCEEILIFTMETGPRASEALHTKAVFQTSELERGEGWTAARE<br>AQMEKTLTVSLASPPSAVIGRYLLSIRLSSHRKHSNRRLGEFVLL<br>FNPWCAEDDVFLASEEERQEYVLSDSGIIFRGVEKHIRAQGWNYG<br>QFEEDILNICLSILDRSPGHQNNPATDVSCRHNPIYVTRVISAMV<br>NSNNDRGVVQGQWQGKYGGGTSPLHWRGSVAILQKWLKGRYKPVK<br>YGQCWVFAGVLCTVLRCLGIATRVVSNFNSAHDTDQNLSVDKYVD<br>SPGRTLEDLTEDSMWNPHVWNESWFARQDLGPSYNGWQVLDATPQ<br>EESEGVFRCGPASVTAIREGDVHLAHDGPFVFAEVNADYITWLWH<br>EDESRERVYSNTKKIGRCISTKAVGSDSRVDITDLYKYPEGSRKE<br>RQVYSKAVNRLFGVEASGRRIWIRRAGGRCLWRDDLLEPATKPSI<br>AGKFKVLEPPMLGHDLRLALCLANLTSRAQRVRVNLSGATILYTR<br>KPVAEILHESHAVRLGPQEEKRIPITISYSKYKEDLTEDKKILLA<br>AMCLVTKGEKLLVEKDITLEDFITIKVLGPAMVGVAVTVEVTVVN<br>PLIERVKDCALMVEGSGLLQEQLSIDVPTLEPQERASVQFDITPS<br>KSGPRQLQVDLVSPHFPDIKGFVIVHVATAK | 8 |
| Human zinc finger BED domain-containing protein 3 (ZBED3 gene product) (UniProtKB-Q96IU2) | MRSGEPACTMDQARGLDDAAARGGQCPGLGPAPTPTPPGRLGAPY<br>SEAWGYFHLAPGRPGHPSGHWATCRLCGEQVRGRPGFHAGTSALW<br>RHLRSAHRRELESSGAGSSPPAAPCPPPPGPAAAPEGDWARLLEQ<br>MGALAVRGSRREERELERRELAVEQGERALERRRRALQEEERAAAQ<br>ARRELQAEREALQARLRDVSRREGALGWAPAAPPPLKDDPEGDRD<br>GCVITKVLL | 9 |
| Human metabotropic glutamate receptor 2 (GRM2 gene product) (UniProtKB-Q14416) | MGSLLALLALLLLWGAVAEGPAKKVLTLEGDLVLGGLFPVHQKGG<br>PAEDCGPVNEHRGIQRLEAMLFALDRINRDPHLLPGVRLGAHILD<br>SCSKDTHALEQALDFVRASLSRGADGSRHICPDGSYATHGDAPTA<br>ITGVIGGSYSDVSIQVANLLRLFQIPQISYASTSAKLSDKSRYDY<br>FARTVPPDFFQAKAMAEILRFFNWTYVSTVASEGDYGETGIEAFE<br>LEARARNICVATSEKVGRAMSRAAFEGVVRALLQKPSARVAVLFT<br>RSEDARELLAASQRLNASFTWVASDGWGALESVVAGSEGAAEGAI<br>TIELASYPISDFASYFQSLDPWNNSRNPWFREFWEQRFRCSFRQR<br>DCAAHSLRAVPFEQESKIMFVVNAVYAMAHALHNMHRALCPNTTR<br>LCDAMRPVNGRRLYKDFVLNVKFDAPFRPADTHNEVRFDRFGDGI<br>GRYNIFTYLRAGSGRYRYQKVGYWAEGLILDTSLIPWASPSAGPL | 10 |

TABLE 1-continued

Description of the Sequences

| Description | Sequences | SEQ ID NO |
|---|---|---|
| | PASRCSEPCLQNEVKSVQPGEVCCWLCIPCQPYEYRLDEFTCADC GLGYWPNASLTGCFELPQEYIRWGDAWAVGPVTIACLGALATLFV LGVFVRHNATPVVKASGRELCYILLGGVFLCYCMTFIFIAKPSTA VCTLRRLGLGTAFSVCYSALLTKTNRIARIFGGAREGAQRPRFIS PASQVAICLALISGQLLIVVAWLVVEAPGTGKETAPERREVVTLR CNHRDASMLGSLAYNVLLIALCTLYAFKTRKCPENFNEAKFIGFT MYTTCIIWLAFLPIFYVTSSDYRVQTTTMCVSVSLSGSVVLGCLF APKLHIILFQPQKNVVSHRAPTSRFGSAAARASSSLGQGSGSQFV PTVCNGREVVDSTTSSL | |
| Mouse menin (UniProtKB-O88559) | MGLKAAQKTLFPLRSIDDVVRLFAAELGREEPDLVLLSLVLGFVE HFLAVNRVIPTNVPELTFQPSPAPDPPGGLTYFPVADLSIIAALY ARFTAQIRGAVDLSLYPREGGVSSRELVKKVSDVIWNSLSRSYFK DRAHIQSLFSFITGTKLDSSGVAFAVVGACQALGLRDVHLALSED HAWVVFGPNGEQTAEVTWHGKGNEDRRGQTVNAGVAERSWLYLKG SYMRCDRKMEVAFMVCAINPSIDLHTDSLELLQLQQKLLWLLYDL GHLERYPMALGNLADLEELEPTPGRPDPLTLYHKGIASAKTYYQD EHIYPYMYLAGYHCRNRNVREALQAWADTATVIQDYNYCREDEEI YKEFFEVANDVIPNLLKEAASLLETGEERTGEQAQGTQGQGSALQ DPECFAHLLRFYDGICKWEEGSPTPVLHVGWATFLVQSLGRFEGQ VRQKVHIVSREAEAAEAEEPWGDEAREGRRRGPRRESKPEEPPPP KKPALDKGPGSGQSAGSGPPRKTSGTVPGTTRGGQEVGNAAQAPA PAASPPPEGPVLTFQSEKMKGMKELLVATKINSSAIKLQLTAQSQ VQMKKQKVSTPSDYTLSFLKRQRKGL | 11 |
| Mouse transcription factor Hivep2 (UniProtKB-Q3UHF7) | MDTGDTALGQKATSRSGETDSVSGRWRQEQSAVLKMSTFSSQEGP RQPQIDPEQIGNAASAQLFGSGKLASPGEGLHQVTEKQYPPHRPS PYPCQHSLSFPQHSLSQGMTHSHKPHQSLEGPPWLFPGPLPSVAS EDLFPFPMHGHSGGYPRKKISNLNPAYSQYSQKSIEQAEDAHKKE HKPKKPGKYICPYCSRACAKPSVLKKHIRSHTGERPYPCIPCGFS FKIKSNLYKHRKSHAHAIKAGLVPFTESSVSKLDLEAGFIDVEAE IHSDGEQSTDIDEESSLFAEASDKVSPGPPVPLDIASRGGYHGSL EESLGGPMKVPILIIPKSGIPLASEGSQYLSSEMLPNPSLNAKAD DSHTVKQKLALRLSEKKGQDSEPSLNLLSPHSKGSTDSGYFSRSE SAEQQISPPNTNAKSYEEIIFGKYCRLSPRNTLSVTPTGQERTAM GRRGIMEPLPHLNTRLEVKMFEDPISQLNPSKGEMDPGQINMLKT TKFNSECRQPQAIPSSVRNEGKPYPGNFLGSNPMLLEAPVDSSPL IRSNSMPTSSATNLSVPPSLRGSHSFDERMTGSDDVFYPGTVGIP PQRMLRRQAAFELPSVQEGHMESEHPARVSKGLASPSLKEKKLLP GDRPGYDYDVCRKPYKKWEDSETLKQSYLGSFKQGGEYFMDPSVP VQGVPTMFGTTCENRKRRKEKSVGDEEDVPMICGGMGNAPVGMMS SEYDPKLQDGGRSGFAMTAHESLAHGHSDRLDPARPQLPSRSPSL GSEDLPLAADPDKMTDLGKKPPGNVISVIQHTNSLSRPNSFERSE STEMVACPQDKTPSPAETCDSEVLEAPVSPEWAPPGDGGESGSKP TPSQQVPQHSYHAQPRLVRQHNIQVPEIRVTEEPDKPEKEKEAPT KEPEKPVEEFQWPQRSETLSQLPAEKLPPKKKRLRLADLEHSSGE SSFESTGTGLSRSPSQESNLHSSSFSMSFDREETVKLTAPPKQD ESGKHSEFLTVPAGSYSLSVPGHHHQKEMRRCSSEQMPCPHPTEV PEIRSKSFDYGNLSHAPVAGTSPSTLSPSRERKKCFLVRQASFSG SPEIAQGEAGVDPSVKQEHMEHLHAGLRAAWSSVLPPLPGDDPGK QVGTCGPLSSGPPLHLTQQQIMHMDSQESLRNPLIQPTSYMTSKH LPEQPHLFPHQDAVPFSPIQNALFQFQYPTVCMVHLPAQQPPWWQ THFPHPFAPHPQNSYKPPFQADLHSSYPLEHVAEHTGKKSADYP HAKEQTYPCYSGTSGLHSKNLPLKFPSDPGSKSTETPTEQLLRED FASENAGPLQSLPGTVVPVRIQTHVPSYGSVMYTSISQILGQNSP AIVICKVDENMIQRTLVINAAMQGIGLNIAQVLGQHTGLEKYPLW KVPQTLPLGLESSIPLCLPSTSDNAASLGGSKRMLSPASSLELFM ETKQQKRVKEEKMYGQIVEELSAVELTNSDIKKGLSRPQKPQLVR QGCASEPKDGCFQSRSSSFSSLPSSSQDHPSASGPFPPNREILP GSRAPPRRKFSGPSESRESSDELDMDETSSDMSMSPQSSALPTGG GQQEEEGKARKLPVSMLVHMASGPGGNVANSTLLFTDVADFQQIL QFPSLRTTTTVSWCFLNYTKPSFVQQATFKSSVYASWCISSCNPN PSGLNTKTTLALLRSKQKITAEIYTLAAMHRPGAGKLTSSSVWKQ FAQMKPDAPFLFGNKLERKLAGNVLKERGKGEIHGDKDLGSKQTE PIRIKIFEGGYKSNEDYVYVRGRGRGKYICEECGIRCKKPSMLKK HIRTHTDVRPYVCKLCNFAFKTKGNLTKHMKSKAHMKKCLELGVS MTSVDDTETEEAENMEELHKTSEKHSMSGISTDHQFSDAEESDGE DGDDNDDDDEDDDDFDDQGDLTPKTRSRSTSPQPPRFSSLPVNVG AVAHGVPSDSSLGHSSLISYLVTLPSIQVTQLMTPSDSCDDTQMT EYQRLFQSKSTDSEPDKDRLDIPSSMDEEAMLSSEPSSSPRDFSP SSYRSSPGYDSSPCRDNSPKRYLIPKGDLSPRRHLSPRRDLSPMR HLSPRKEAALRREMSQGDASPRRHLSPRRPLSPGKDITARRDLSP RRERRYMTTIRAPSPRRALYPNPPLSMGQYLQTEPIVLGPPNLRR GIPQVPYFSLYGDQEGAYEHHGSSLFPEGPTDYVFSHLPLHSQQQ | 12 |

TABLE 1-continued

Description of the Sequences

| Description | Sequences | SEQ ID NO |
|---|---|---|
| | VRAPIPMVPVGGIQMVHSLPPALSGLHPPPTLPLPTEGSEEKKGA PGEAFAKDPYILSRRHEKQAPQVLQSSGLPSSPSSPRLLMKQSTS EDSLNSTEREQEENIQTCTKAIASLRIATEEAALLGADPPTWVQE SPQKPLESAHVSIRHFGGPEPGQPCTSAAHPDLHDGEKDTFGTSQ TAVAHPTFYSKSSVDEKRVDFQSSKELSLSTEEGNEPSPEKNQLH | |
| Mouse renalase (UniProtKB-A7RDN6) | MSRVLVVGAGLTGSLCAALLRKEITAPLYLGLWDKGGDIGGRMIT ASSPHNPRCTADLGAQYITCSPHYVKEHQNFYEELLAHGILKPLT SPIEGMKGKEGDCNFVAPQGFSSVIKYYLKKSGAEVSLKHCVTQI HLKDNKWEVSTDTGSAEQFDLVILTMPAPQILELQGDIVNLISER QREQLKSVSYSSRYALGLFYEVGMKIGVPWSCRYLSSHPCICFIS IDNKKRNIESSECGPSVVIQTTVPFGVQHLEASEADVQKLMIQQL ETILPGLPQPVATICHKWTYSQVTSSVSDRPGQMTLHLKPFLVCG GDGFTHSNFNGCISSALSVMKVLKRYI | 13 |
| Mouse lengsin (UniProtKB-Q8CIX8) | MIDEGDLAQEDTAKDEGNVIEGSRMSKLRRARRKVIKPHLCSMDG EEIAKANSSEMSRNQIADLSKPGSAESWSSHSAKDAYHPTPVVKP SLPSALAGAPDAEFSPNTDPTRYNAQSFNPPQLSARMKHIKQEMA KNHLQFVRFEATDLHGVSRSKSIPAQFFQEKVIHGVFMPRGYLEL MPNPKDNEVNHIRATCFNSDIVLMPELSTFRVLPWAERTARVICD TFTVTGEPLLTSPRYIAKRQLRQLQDAGFCLLSAFIYDFCIFGVP EVINSKTISFPASTLLSNHDQPFMQELVEGLYQTGANVESFSSST RPGQMEICFLPEFGISSADNAFTLRTGLQEVARRYNYIASLVIET GFCNSGILSHSIWDVGGKTNMFCSGSGVERLTLTGKKWLAGLLKH SAALSCLMAPAVNCRKRYCKDSRDLKDSVPTTWGYNDNSCALNIK CHGEKGTQIENKLGSATANPYLVLAATVAAGLDGLQSSDGAAAGS DESQDLYQPEPSEIPLKMEDALAALEQDECLKQALGETFIRYFVA MKKYELENEETDAEGNKFLEYFI | 14 |
| Mouse eIF-2-alpha kinase activator GCN1 (Gcn1l1) | MAADTQVSETLKRFAVKVTTASVKERREILSELGRCIAGKDLPEG AVKGLCKLFCLTLHRYRDAASRRALQAAIQQLAEAQPEATAKNLL HSLQSSGVGSKACVPSKSSGSAALLALTWTCLLVRIVFPLKAKRQ GDIWNKLVEVQCLLLLEVLGGSHKHAVDGAVKKLTKLWKENPGLV EQYFSAILSLEPSQNYAAMLGLLVQFCTNHKEMDAVSQHKSTLLE FYVKNILMSKAKPPKYLLDNCAPLLRFMSHSEFKDLILPTIQKSL LRSPENVIETISSLLASVTLDLSQYALDIVKGLANQLKSNSPRLM DEAVLALRNLARQCSDSSATEALTKHLFAILGGSEGKLTIIAQKM SVLSGIGSLSHHVVSGPSGQVLNGCVAELFIPFLQQEVHEGTLVH AVSILALWCNRFTTEVPKKLTDWFKKVFSLKTSTSAVRHAYLQCM LASFRGDTLLQALDFLPLLMQTVEKAASQGTQVPTVTEGVAAALL LSKLSVADAQAEAKLSGFWQLVVDEKRQTFTSEKFLLLASEDALC TVLRLTERLFLDHPHRLTNSKVQQYYRVLVAVLLSRTWHVRRQAQ QTVRKLLSSLGGVKLANGLLDELKTVLNSHKVLPLEALVTDAGEV TEMGKTYVPPRVLQEALCVISGVPGLKGDIPSTEQLAQEMLIISH HPSLVAVQSGLWPALLTRMKIDPDAFITRHLDQIIPRITTQSPLN QSSMNAMGSLSVLSPDRVLPQLISTITASVQNPALCLVTREEFSI MQTPAGELFDKSIIQSAQQDSIKKANMKRENKAYSFKEQIIEMEL KEEIKKKKGIKEEVQLTSKQKEMLQAQMDKEAQIRRRLQELDGEL EAALGLLDAIMARNPCGLIQYIPVLVDAFLPLLKSPLAAPRVKGP FLSLAACVMPPRLKTLGTLVSHVTLRLLKPECALDKSWCQEELPV AVRRAVSLLHTHTIPSRVGKGEPDAAPLSAPAFSLVFPMLKMVLT EMPYHSEEEEEQMAQILQILTVHAQLRASPDTPPERVDENGPELL PRVAMLRLLTWVIGIGSPRLQVLASDTLTALCASSSGEDGCAFAE QEEVDVLLAALQSPCASVRETALRGLMELRLVLPSPDTDEKSGLS LLRRLWVIKFDKEDEIRKLAERLWSTMGLDLQSDLCSLLIDDVIY HEAAVRQAGAEALSQAVARYQRQAAEVMGRLMEIYQEKLYRPPPV LDALGRVISESPPDQWEARCGLALALNKLSQYLDSSQVKPLFQFF VPDALNDRNPDVRKCMLDAALATLNAHGKENVNSLLPVFEEFLKD APNDASYDAVRQSVVVLMGSLAKHLDKSDPKVKPIVAKLIAALST PSQQVQESVASCLPPLVPAVKEDAGGMIQRLMQQLLESDKYAERK GAAYGLAGLVKGLGILSLKQQEMMAALTDAIQDKKNFRRREGALF AFEMLCTMLGKLFEPYVVHVLPHLLLCFGDGNQYVREAADDCAKA VMSNLSAHGVKLVLPSLLAALEEESWRTKAGSVELLGAMAYCAPK QLSSCLPNIVPKLTEVLTDSHVKVQKAGQQALRQIGSVIRNPEIL AIAPVLLDALTDPSRKTQKCLQTLLDTKFVHFIDAPSLALIMPIV QRAFQDRSTDTRKMAAQIIGNMYSLTDQKDLAPYLPSVTPGLKAS LLDPVPEVRTVSAKALGAMVKGMGESCFEDLLPWLMETLTYEQSS VDRSGAAQGLAEVMAGLGVEKLEKLMPEIVATASKVDIAPHVRDG YIMMFNYLPITFGDKFTPYVVGPIIPCILKALADENEFVRDTALRA GQRVISMYAETAIALLLPQLEQGLFDDLWRIRFSSVQLLGDLLFH ISGVTGKMTTETASEDDNFGTAQSNKAIITALGVDRRNRVLAGLY MGRSDTQLVVRQASLHVWKIVVSNTPRTLREILPTLFGLLLGFLA STCADKRTIAARTLGDLVRKLGEKILPEIIPILEEGLRSQKSDER QGVCIGLSEIMKSTSRDAVLFFSESLVPTARKALCDPLEEVREAA | 15 |

TABLE 1-continued

Description of the Sequences

| Description | Sequences | SEQ ID NO |
|---|---|---|
| | AKTFEQLHSTIGHQALEDILPFLLKQLDDEEVSEFALDGLKQVMA<br>VKSRVVLPYLVPKLTTPPVNTRVLAFLSSVAGDALTRHLGVILPA<br>VMLALKEKLGTPDEQLEMANCQAVILSVEDDTGHRIIIEDLLEAT<br>RSPEVGMRQAAAIILNMYCSRSKADYSSHLRSLVSGLIRLFNDSS<br>PVVLEESWDALNAITKKLDAGNQLALIEELHKEIRFIGNECKGEH<br>VPGFCLPKRGVTSILPVLREGVLTGSPEQKEEAAKGLGLVIRLTS<br>ADALRPSVVSITGPLIRILGDRFNWTVKAALLETLSLLLGKVGIA<br>LKPFLPQLQTTFTKALQDSNRGVRLKAADALGKLISIHVKVDPLF<br>TELLNGIRAVEDPGIRDTMLQALRFVIQGAGSKVDAAIRKNLVSL<br>LLSMLGHDEDNTRISTAGCLGELCAFLTDEELNTVLQQCLLADVS<br>GIDWMVRHGRSLALSVAVNVAPSRLCAGRYSNEVQDMILSNAVAD<br>RIPIAMSGIRGMGFLMKYHIETGSGQLPPRLSSLLIKCLQNPCSD<br>IRLVAEKMIWWANKEPRPPLEPQTIKPILKALLDNTKDKNTVVRA<br>YSDQAIVNLLKMRRGEELLQSLSKILDVASLEALNECSRRSLRKL<br>ACQADSVEQVDDTILT | |
| Mouse<br>perilipin 4<br>(UniProtKB-<br>O88492) | MSASGDGTRVPPKSKGKTLSSFFGSLPGFSSARNLVSHTHSSTST<br>KDLQTATDPSGTPAPSSKVSTNSQMAGDAAGLLQPSEQTAGDKDM<br>GSFSVTSSEDAFSGVFGIMDAAKGMVQGGLGATQSALVGTKEAVS<br>GGVMGAVGVAKGLVKGGLDTSKNVLTNTKDTVTTGVMGAANMAKG<br>TVQTGLDTTKSVVMGTKDTVATGLAGAVNVAKGTIQGGLDTTKSV<br>VMGTKDTVTTGLTGAVNVAKGVVQGGLDTTKSVVMGTKDTVTTGL<br>TGAMNVAKGTAQMGIDTSKTVLTGTKDTVCAGATGAINVAKGAAQ<br>GGLDTTKSVLIGTKDTVTTGLTGAVNVAKGAVQGGLDTTKSVVMG<br>TKDTVTTGLTGAMNVAKGTAQMGLGTSKTVLTGTKDTVCAGLTGA<br>INVAKGAAQGGLDTTKSVLMGTKDTVTTGLTGAVNVAKGTIQGGL<br>DTTKSVVMGTKDTVTTGLTGAVNVAKGTIQGGLDTTKSVVMGTKD<br>TVITGLTGAVNVAKGAAQGGLDTTKSVVMGTKDTVITGLTGAMNV<br>AKGTAQMGLGTSKTVLTGTKDTVCAGLTGAINVAKGAAQGGLDTT<br>KSVLMGTKDTVITGLIGAVNVAKGTIQGGLDTTKSVVMGTKDTVT<br>TGLTGAVNVAKGAVQGGLDTTKSVVMGTKDTVTTGLTGALNVAKG<br>TAQMGIDTSKTVLIGTKDTVCAGATGAINMAKGAAQGGLDTTKSV<br>LMGTKDTVTTGLTGAINVAKGSAQGGLDTTKSVLIGTKDTVTTGL<br>TGALNVAKGTVQTGLDTSQRVLTGTKDNVYAGVTGAVNVAKGTIQ<br>GGLDTTKSVVMGTKDTVTTGLTGAVNVAKGAVQGGLDTTKSVVMG<br>TKDTVTTGLTGAMNVAKGTAQMGIDTSKTVLTGTKDTVCAGLTGA<br>INVAKGATQGGLDTTKSVLMGTKDTVTTGLTGAINVAKGAAQGGL<br>DTTKSVLLGTKDTVTTGLTGAANVAKETVQMGLDTSKNILMDTKD<br>SICAGATGAITVVKGAAQGGLDTSNAALTGTMDTAKGTVQTSLDT<br>SKHMLIGMKDTVCAGVTSAMNMAKGIHKNTDTTRDTQSSVLAHSG<br>NVATNAIHTGVHTVPSSLSGSHSIICHEPSIYRATNHGVGQAILT<br>STESLCCETSSFSDKYGLGHVTEPRADTKTLVSGMASSACAATRS<br>VEECGQLAATGFAALPDELKGLGDIFQPMTTEEQAQLAVSESGPR<br>VLSADRGSYYIRLGDLAPSFRQRAFEHALSHIQHNQFQARAALAQ<br>LQEAFQMTDMTMEAACGKLCSDQSLNTMVEAVGSHEMRASVAQDR<br>LCTLAHQLHAAYSSLVTSLQGLPEVQQQAGQARHSLCKLYGLVSS<br>EAGSELQTEQLAQSSAGVVEAWQGLEVLLEKLQQNPPLSWLVGPF<br>TSMPCGQL | 16 |
| Mouse<br>mediator of<br>RNA<br>polymerase<br>II<br>transcription<br>subunit<br>11<br>(UniProtKB-<br>Q6ID77) | MDPQTQNTSLQRLQNVENRVVKVLELAGGVMEELASPSGPKKEFV<br>NSHCREFMQSMKDIQVTLREEIKSACEYRPFEKCDYNARIANEIC<br>FQKLEYVLTQLEDLKQTADRYPSSD | 17 |
| Mouse<br>protein-<br>glutamine<br>gamma-<br>glutamyl-<br>transferase 6<br>(UniProtKB-<br>Q14CG3) | MVNSNNDRGVVQGQWQGKYGGGTNPLNWRGSVAILQKWFKGRYKP<br>VKYGQCWVFAGVMCTVLRCLGIATRVVSNFNSAHDTDGNLSVDKY<br>VDSYGRTLEDLTEDSMWNFHVWNESWFARQDLGPSYDGWQVLDAT<br>PQEESEGMFRCGPASVTAIREGDVHLAHDGPFVFAEVNADYITWL<br>WHEDKRRERVYSDTKKIGRCISTKAVGSDSRVDITGLYKYPEGSR<br>KERQVYSKAVKKLLSVEAWGRRRRIRRASVRGVWRDDLLEPVTKP<br>SITGKFKVLEPPVLGQDLKLALCLTNLTARAQRVRVNVSGATILY<br>TRKPVAEILRESHTVKLGPLEEKKIPVTISYSQYKGDLTEDKKIL<br>LAAMCLVSKGEKLLVEKDITLEDFITIKVLGPAVVGVTVTVEVLV<br>INPLSESVKDCVLMVEGSGLLQGQLSIEVPSLQPQEKALIQFNIT<br>PSKSGPRQLQVDLVSSQFPDIKGFVIIHVATAK | 18 |

TABLE 1-continued

Description of the Sequences

| Description | Sequences | SEQ ID NO |
|---|---|---|
| Mouse zinc finger BED domain-containing protein 3 (UniProtKB-Q9D0L1) | MKSKKPLKITMEDSRRLNDPAEQGGLCPAPVGPSYSEAWGYFHLD PAQPRHRMMSAWATCRLCGLQVGGLPNFQMWTRALCQHLSDVHLP ELKKSAAPSSPTTMPCPPPPSPTMAAEGDWARLLEQMGELAMRGS QRELELERREAALMQAELELERKRQALKQEAQSVEQERHQLQVER EALSKWIKKQSPGAQVPEPPSPLPLLPKEDPDIHDNNSDNDMVTK VLL | 19 |
| Mouse metabotropic receptor 2 (UniProtKB-Q14BI2) | MESLLRFLALLLLRGAVAEGPAKKVLTLEGDLVLGGLFPVHQKGG PAEECGPVNEHRGIQRLEAMLFALDRINRDPHLLPGVRLGAHILD SCSKDTHALEQALDFVRASLSRGADGSRHICPDGSYATLSDAPTA ITGVIGGSYSDVSIQVANLLRLFQIPQISYASTSAKLSDKSRYDY FARTVPPDFFQAKAMAEILRFFNWTYVSTVASEGDYGETGIEAFE LEARARNICVATSEKVGRAMSRAAFEGVVRALLQKPSARVAVLFT RSEDARELLAATQRLNASFTWVASDGWGALESVVAGSERAAEGAI TIELASYPISDFASYFQNLDPWNNSRNPWFREFWEERFRCSFRQR DCAAHSLRAVPFEQESKIMFVVNAVYAMAHALHNMHRALCPNTTR LCDAMRPVNGRRLYKDFVLNVKFDAPFRPADTDDEVRFDRFGDGI GRYNIFTYLRAGNGRYRYQKVGYWAEGLTLDTSIIPWASPSAGTL PASRCSEPCLQNEVKSVQPGEVCCWLCIPCQPYEYRLDEFTCADC GLGYWPNASLTGCFELPQEYIRWGDAWAVGPVTIACLGALATLFV LGVFVRHNATPVVKASGRELCYILLGGVFLCYCMTFIFIAKPSTA VCTLRRLGLGTAFSVCYSALLTKTNRIARIFGGAREGAQRPRFIS PASQVAICLALISGQLLIVAAWLVVEAPGIGKETAPERREVVTLR CNHRDASMLGSLAYNVLLIALCTLYAFKTRKCPENFNEAKFIGFT MYTTCIIWLAFLPIFYVTSSDYRVQTTTMCVSVSLSGSVVLGCLF APKLHIILFQPQKNVVSHRAPTSRFGSAAPRASANLGQGSGSQLV PTVCNGREVVDSTTSSL | 20 |
| Mouse Gm3604 protein (Gm3604 gene product) (UniProtKB-D3YUB7) | NAVTYEDVHVNFTQEEWALLDPSQKTLYKDVMLETFRNLNAIGFN WEAQNIEEYCQSSRRHRRCERSQSAEKPSEYTQRDKAFALHDHSH AQRHERVHTEKIPSEVIHCVEDFLPYTSLQVHKRTQTGQKPYECN QCGKGFVMPSCLKRHERFHTGEKPYKCNQCDKAFSQYNNLQTHRR THTGEKPYKCNQCDKAFSQHSTLQTHRRTHTGEKPFKCNQCDKAF SEKCSLQTHRRTHTGEKPYKCNQCDKAFSQYSHLHIHRRTHTGEK PLKCNECDETFSNHSNLQTHRRIHTGEKPYKCNQCDKAFSQHSTL QNHRRTHTGEKPFKCNQCDKAFSRHSTLQTHRRTHTGEKPFKCNQ CDKAFSQYSHLHIHRRTHTGEKPFKCNQCNKAFSQYSHLHIHRRT HTGEKPYKCNQCDKTFSNHSTLQTHRRTHTGEKPYKCNQCDKAFS RHSTLQTHRRTHTGEKPFKCNQCDKAFSQKCSLQKHIRIHTGEKL YKCNECDKAFSQHSTLQTHRRTHTGEKPFKFNECDEGFSHHYNLQ IHERRHTREKPYKCIQCV | 21 |
| Mouse olfactory receptor (Olfr911-ps1 gene product) (UniProtKB-A0A140T8K0) | MGLENGSLVTEFILLGLTNDPDLQLPLFLLFLLIYTTTAVGNLAL ITLIALNSHLHTPMYFFLLNLSCIDLCYSSVITPKMLMNFLVRKN IISYMGCMTQLYFFCFFAICECCVLTSMAYDRYVAICNPLLYNIT MSPKVCSYLMLGSYIMGFSGAMIHTGCILRLTFCDRNIINHYFCD LFPLLQLSCTSTYANEIEILIVGGKDIIVPSVIIFTSYGFILSNI LQMRSTAGMSKAFSTCSSHILAVSLFFGSCAFMYLQPSSPGSMDQ GKVSSVFYTIVVPMMNPLIYSFRNKDVKIALRKIFGKRRFS | 22 |

DESCRIPTION OF THE EMBODIMENTS

I. Definitions

In addition to definitions included in this sub-section, further definitions of terms are interspersed throughout the text.

In this invention, "a" or "an" means "at least one" or "one or more," etc., unless clearly indicated otherwise by context. The term "or" means "and/or" unless stated otherwise. In the case of a multiple-dependent claim, however, use of the term "or" refers back to more than one preceding claim in the alternative only.

"Autoimmune" or "autoimmune attack," as used herein, refers to an attack by the subject's immune system against cells that are part of the subject. As such, an autoimmune disease is an abnormal immune response to a normal body part. In the case of type 1 diabetes, the autoimmune attack is predominantly against the beta cells of the pancreas that normally secrete insulin in a glucose-dependent manner.

As used herein, "beta-like cell" refers to any cell that secretes insulin in response to glucose. Thus, a pancreatic beta cell is a "beta-like cell." Beta-like cells may be derived from cells that do not normally produce insulin in response to glucose. For example, a beta-like cell may be a stem cell that is induced to differentiate into a "beta-like cell" that produces insulin in a glucose-responsive manner. (see F W Pagliuca et al., Cell 159:428-439 (2014); E Kroon et al., Nature Biotech 26(4):443-452 (2008); and A Rezania et al., Nature Biotech 32(11): 1121-1133 (2014). Likewise, a "beta-like cell" may also be a pancreatic exocrine cell (see Q Zhou et al., Nature 455:627-633 (2008)), pancreatic alpha cell (see Li et al, *Cell* 168:86-100 (2017), or gut cell (see Ariyachet C et al., *Cell Stem Cell* 18(3):410-21 (2016)) that is induced to produce insulin in response to glucose. The term "beta-like cells" also includes cells that become glucose responsive insulin secretors after transplantation into a subject.

The term "genetically modified" or to "genetically modify," as used herein, describes any method that reduces the expression or function of one or more protein in a cell from the baseline or unmodified state. Examples of means to genetically modify cells include decreasing expression of a protein, inhibiting expression of a protein, silencing expression of a protein, eliminating expression of a protein, reducing function of a protein, inhibiting proper confirmation of a protein, or any other means to change expression or function of a protein.

The term "inhibit expression of a gene" or "inhibiting expression of a gene," as used herein refers to causing a decrease in expression of a protein product of the gene.

The term "silence a gene" or "silencing a gene," as used herein refers to causing a lack of expression of the protein product of the gene.

The term "treatment," as used herein, covers any administration or application of a therapeutic for disease in a subject, and includes inhibiting the disease, arresting its development, relieving one or more symptoms of the disease, or preventing reoccurrence of one or more symptoms of the disease. For example, treatment of diabetes type 1 subjects may comprise alleviating hyperglycemia as compared to a time point prior to administration or reducing the subject's need for exogenous insulin administration.

II. Compositions

In some embodiments, compositions are provided comprising modified beta-like cells. In general, the modifications allow the beta-like cell to survive when implanted into an animal model of type 1 diabetes, or when implanted into a human with type 1 diabetes. The modifications generally allow the beta-like cell to survive autoimmune attack.

In some embodiments, the genetic modification comprises any modification that results in a reduced expression of the following proteins: menin (SEQ ID No: 1), transcription factor HIVEP2 (SEQ ID No: 2), renalase (SEQ ID No: 3), lengsin (SEQ ID No: 4), eIF-2-alpha kinase activator GCN1 (SEQ ID No: 5), perilipin-4 (SEQ ID No: 6), mediator of RNA polymerase II transcription subunit 11 (SEQ ID No: 7), protein-glutamine gamma-glutamyltransferase 6 (SEQ ID No: 8), zinc finger BED domain-containing protein 3 (SEQ ID No: 9), and metabotropic glutamate receptor 2 (SEQ ID No: 10).

A. Types of beta cells to be genetically modified

1. Beta Cells Themselves

Beta cells of pancreas are the cells that normally can secrete insulin. These beta cells of the pancreas are located in pancreatic islets, also known as the islets of Langerhans.

In some embodiments, the genetically-modified beta-like cell is a beta cell of the pancreas. In some embodiments, the genetically-modified beta-like cell is a beta cell that has been genetically modified ex vivo, and reintroduced into the same or different individual from which it was isolated. When introduced into the same subject from which it was isolated it is an autologous genetically-modified beta-like cell. When introduced into a different subject from which it was isolated it is a heterologous genetically-modified beta-like cell.

2. Cells Induced to Have a Phenotype of a Beta-Like Cell

In some embodiments, the beta-like cell is a cell that does not normally produce insulin in response to glucose, but is induced or designed to have a phenotype of a beta-like cell, i.e., induced or designed to produce insulin in response to glucose. Beta-like cells include "designer beta cells," which have been described as using synthetic pathways to produce insulin (see M Xie et al., Science 354(6317): 1296-1301 (2016)).

a) Stem Cells

Any stem cell capable of differentiating into a beta-like cell may be genetically modified according to the invention. In some embodiments, the beta-like cell may be differentiated from a hematopoietic stem cell, bone marrow stromal stem cell, or mesenchymal stem cell.

Beta-like cells capable of secreting insulin in response to glucose can be generated from pluripotent stem cells (PSCs) (see F W Pagliuca et al., *Cell* 159:428-439 (2014)) or embryonic stem cells (ESCs) (see E Kroon et al., *Nature Biotech* 26(4):443-452 (2008) and A Rezania et al., *Nature Biotech* 32(11): 1121-1133 (2014)).

In some embodiments, the stem cell may be an embryonic stem cell. In some embodiments, the embryonic stem cell is taken from a blastocyst. In some embodiments, the embryonic stem cell may be derived from an embryo fertilized in vitro and donated. In some embodiments, the embryonic stem cell undergoes directed differentiation.

In some embodiments, the stem cell may be an adult stem cell. An adult stem cells may also be referred to as a "somatic" stem cell. In some embodiments, the adult stem cell is an undifferentiated cell found among differentiated cells in a tissue or organ.

In some embodiments, the stem cell is an induced pluripotent stem cell (iPSC).

In some embodiments, the stem cells may be from bone marrow, adipose tissue, or blood. In some embodiments, the cells may be from umbilical cord blood.

In some embodiments, stem cells undergo directed differentiation into beta-like cells. In some embodiments, the directed differentiation is based upon treatment of stem cells with modulators. In some embodiments, the directed differentiation is based on culture conditions.

In some embodiments, beta-like cells are generated from human PSCs (hPSCs) in vitro. In some embodiments, beta-like cells are generated from hPSCs using directed differentiation. In some embodiments, beta-like cells are generated from hPSCs using a multi-step protocol. In some embodiments, beta-like cells are generated from hPSCs using sequential modulation of multiple signaling pathways. In some embodiments, beta-like cells are generated from hPSCs using a three-dimensional cell culture system.

In some embodiments, beta-like cells are generated from human ESCs (hESCs) in vitro. In some embodiments, beta-like cells are generated from hESCs using directed differentiation. In some embodiments, beta-like cells are generated from hPSCs using a multi-step protocol. In some embodiments, beta-like cells are generated from hESCs using sequential modulation of multiple signaling pathways. In some embodiments, beta-like cells are generated from hESCs using a planar cell culture and air-liquid interface at different stages of differentiation.

b) Non-stem cells

In some embodiments, beta-like cells are produced from non-stem cells. In some embodiments, beta-like cells are produced from differentiated non-beta cells. In some embodiments, beta-like cells are produced from reprogramming or transdifferentiation of differentiated non-beta cells.

In some embodiments, the beta-like cell is a reprogrammed non-beta cell. In some embodiments, the beta-like cell is a transdifferentiated non-beta cell.

As all cells of the body contain the full genome, any type of cell could be induced into a beta-like cell based on principles of reprogramming and transdifferentiation. Thus, the invention is not limited by the original phenotype of the beta-like cell.

Pancreatic exocrine cells can be reprogrammed into beta-like cells that secrete insulin (see Q Zhou et al., Nature 455:627-633 (2008)).

In some embodiments, a pancreatic exocrine cell is reprogrammed into a beta-like cell. In some embodiments, the pancreatic exocrine cell is differentiated into a beta-like cell based on re-expression of transcription factors. In some embodiments, these transcription factors are Ngn3. Pdx1, and Mafa.

Pancreatic alpha cells can be transdifferentiated into beta-like cells. The anti-malarial drug, artemisin, inhibits the master regulatory transcription factor Arx (Aristaless related homeobox) and enhances gamma-amino butyric acid (GABA) receptor signaling, leading to impaired pancreatic alpha cell identity and transdifferentiation of alpha cells into a beta-like cell phenotype (see Li et al, Cell 168:86-100 (2017) and Ben-Othman N et al., Cell 168(1-2): 73-85 (2017)).

In some embodiments, the beta-like cell is a transdifferentiated cell. In some embodiments, an alpha cell is transdifferentiated into a beta-like cell. In some embodiments, the transdifferentiation into a beta-like cell is due to inhibition of Arx. In some embodiments, the transdifferentiation into a beta-like cell is due to enhancement of GABA receptor signaling.

Stomach tissue can be reprogrammed into beta-like cells (see Ariyachet C et al., Cell Stem Cell 18(3):410-21 (2016)). In some embodiments, a gut or stomach cell is reprogrammed into a beta-like cell. In some embodiments, the reprogramming is based on expression of beta cell reprogramming factors. In some embodiments, cells of the antral stomach are reprogrammed into beta-like cells. In some embodiments, these cells of the antral stomach are antral endocrine cells. In some embodiments, reprogrammed antral endocrine cells can be assembled into a mini-organ of beta-like cells.

B. Types of Genetic Modification to the Beta-like Cells

In some embodiments, genetic modification inhibits or reduces expression of a protein, thus leading to improved survival and/or proliferation of transplanted beta-like cells. In some embodiments, genetic modification silences expression of a gene, thus leading to improved survival and/or proliferation of transplanted beta-like cells.

In some embodiments, silencing of a gene or inhibiting expression of a protein is due to editing that removes all or a portion of the target gene, or all or a portion of a region of DNA that regulates the target gene. In some embodiments, editing that removes a portion of the target gene, or the DNA controlling its regulation, results in silencing the gene or inhibiting expression of the gene product.

A variety of methods of gene editing would be known to one skilled in the art, and this invention is not limited by the particular mechanism used for editing.

a) CRISPR/Cas9

The clustered regularly interspaced short palindromic repeats (CRISPR)/Cas9 system is a prokaryotic immune system that confers resistance to foreign gene elements.

In some embodiments, the CRISPR/Cas9 system is used to genetically modify beta-like cells. In some embodiments, a synthetic guide RNA (gRNA) is used to direct the CRISPR/Cas9 system to a specific sequence within the genome of the beta-like cell to perform gene editing.

b) Zinc-Finger Nucleases

Zinc-finger nucleases are artificial restriction enzymes generated by fusing a zinc finger DNA-binding domain to a DNA-cleavage domain.

In some embodiments, a zinc-finger nuclease is used to genetically modify beta-like cells. In some embodiments, the zinc-finger nuclease targets to a specific sequence within the genome of the beta-like cell to perform gene editing.

c) Transcription Activator-Like Effector Nuclease (TALEN)

Transcription activator-like effector nucleases (TALEN) are restriction enzymes engineered to cut specific sequences of DNA. TALEN are generated by fusion of a TAL effector DNA-binding domain to a nuclease.

In some embodiments, a TALEN is used to genetically modify beta-like cells. In some embodiments, the TALEN targets to a specific sequence within the genome of the beta-like cell to perform gene editing.

d) Meganuclease

Meganucleases are endodeoxyribonucleases with a large recognition site that often will only occur rarely within a genome. Modified meganucleases can have a targeted recognition site.

In some embodiments, a meganuclease is used to genetically modify beta-like cells. In some embodiments, the meganuclease targets to a specific sequence within the genome of the beta-like cell to perform gene editing.

e) Group One Intron Encoded Endonuclease (GIIEE)

In some embodiments, a GIIEE is used to genetically modify beta-like cells.

In some embodiments, the meganuclease or GIIEE is I-SceI, I-Cre, I-AniI, I-CeuI, I-ChuI, I-CpaI, I-CpaII, I-DmoI, H-DreI, I-HmuI, I-HmuII, I-LlaI, I-MsoI, PI-PfuI, PI-PkoII, I-PorI, I-PpoI, PI-PspI, I-ScaI, PI-SceI, I-SceII, I-SecIII, I-SceIV, I-SceV, I-SceVI, I-SceVII, I-Ssp6803I, I-TevI, I-TevII, I-TevIII, PI-TliI, PI-TliII, I-Tsp061I, or I-Vdi141I.

In some embodiments, gene modifications silence a gene or inhibit expression of a gene that promotes beta-like cell death. In some embodiments, gene modifications silence a gene or inhibit expression of a gene, thereby promoting beta-like cell survival or proliferation.

In some embodiments, the gene encoding human menin (SEQ ID No: 1), transcription factor HIVEP2 (SEQ ID No: 2), renalase (SEQ ID No: 3), lengsin (SEQ ID No: 4), eIF-2-alpha kinase activator GCN1 (SEQ ID No: 5), perilipin-4 (SEQ ID No: 6), mediator of RNA polymerase II transcription subunit 11 (SEQ ID No: 7), protein-glutamine gamma-glutamyltransferase 6 (SEQ ID No: 8), zinc finger BED domain-containing protein 3 (SEQ ID No: 9), or metabotropic glutamate receptor 2 (SEQ ID No: 10) is silenced or its expression is inhibited. In some embodiments, more than one gene encoding these proteins is inhibited or silenced. The term "gene encoding" includes any DNA encoding the amino acid or functional equivalents thereof. In some embodiments, the functional equivalent is a mutated or variated protein, wherein the protein has same or similar function. The term "gene encoding" further includes all isoforms, splice variants, and mature and immature forms of the protein. In some embodiments, inhibiting or silencing a protein includes inhibiting expression, function, structure, or any other property of a protein needed to perform its normal role in the body.

In some embodiments, a genetic modification is introduced into an exon, intron, promoter, or other region of the Men I (Gene ID No: 4221), HIVEP2 (Gene ID No: 3097), RNLS (Gene ID No: 55328), LGSN (Gene ID No: 51557), GCN1 (Gene ID No: 10985), PLIN4 (Gene ID No: 729359), MED11 (Gene ID No: 400569), TGM6 (Gene ID No: 343641), ZBED3 (Gene ID No: 84327), or GRM2 (Gene ID No: 2912), and the gene is silenced or its expression is inhibited by introduction of the genetic modification. In some embodiments, more than one of these genes is silenced or its expression is inhibited. In some embodiments, the genetic modification introduced is a deletion, substitution, or insertion of one or more nucleotides.

C. Non-Cellular Agents to Modify Function of a Protein Promoting Beta-Like Cell Death The function of human menin (SEQ ID No: 1), transcription factor HIVEP2 (SEQ ID No: 2), renalase (SEQ ID No: 3), lengsin (SEQ ID No: 4), eIF-2-alpha kinase activator GCN1 (SEQ ID No: 5), perilipin-4 (SEQ ID No: 6), mediator of RNA polymerase II transcription subunit 11 (SEQ ID No: 7), protein-glutamine gamma-glutamyltransferase 6 (SEQ ID No: 8), zinc finger BED domain-containing protein 3 (SEQ ID No: 9), or metabotropic glutamate receptor 2 (SEQ ID No: 10) can also be inhibited by post-translational means. Any means of post-translational modulation may be used, including inhibiting binding of ligand, inhibiting function of an enzyme protein, allosteric modulation, or increasing degradation of the protein.

In some embodiments, small molecules can be used to inhibit the function of human menin (SEQ ID No: 1), transcription factor HIVEP2 (SEQ ID No: 2), renalase (SEQ ID No: 3), lengsin (SEQ ID No: 4), eIF-2-alpha kinase activator GCN1 (SEQ ID No: 5), perilipin-4 (SEQ ID No: 6), mediator of RNA polymerase II transcription subunit 11 (SEQ ID No: 7), protein-glutamine gamma-glutamyltransferase 6 (SEQ ID No: 8), zinc finger BED domain-containing protein 3 (SEQ ID No: 9), or metabotropic glutamate receptor 2 (SEQ ID No: 10). In some embodiments, the function of the target protein is inhibited without an effect on the expression level of the protein.

Renalase (SEQ ID No: 3) and protein-glutamine gamma-glutamyltransferase 6 (SEQ ID No: 8) are enzymes. In some embodiments, enzyme inhibitors of renalase or protein-glutamine gamma-glutamyltransferase 6 inhibit the function of the enzymes. In some embodiments, inhibition of renalase or protein-glutamine gamma-glutamyltransferase 6, promotes survival and/or proliferation of beta-like cells.

Inhibitors of menin have been described (see Grembecka J et al., *Nature Chemical Biology* 8:277-284 (2012)). In some embodiments, an inhibitor of menin promotes survival and/or proliferation of beta-like cells.

Metabotropic glutamate receptor 2 (mGluR2) inhibitors or negative allosteric modulators have been described (see Podkowa K et al., *Psychopharmacology* (*Berl*) 233(15-16): 2901-14 (2016)). In some embodiments, an inhibitor or negative allosteric modulator of mGluR2 promotes survival and/or proliferation of beta-like cells. In some embodiments, LY341495 is the inhibitor or negative allosteric modulator of mGluR2. In some embodiments, (2S)-α-ethylglutamic acid (EGLU) is the inhibitor or negative allosteric modulator of mGluR2. In some embodiments, MGS-0039 is the inhibitor or negative allosteric modulator of mGluR2.

III. Methods of Treatment

In each embodiment of the invention, the subject treated is a mammal. In one embodiment, the mammal is a human, non-human primate, cow, horse, pig, sheep, goat, dog, cat, or rodent. In embodiment, the subject is a human subject.

Glucose levels in the blood are normally tightly regulated to maintain an appropriate source of energy for cells of the body. Dysregulation of blood sugar must be ameliorated to maintain health and longevity, and therapies that are fast acting are especially desired. Such fast acting therapies allow subjects to monitor blood glucose in real time and immediately self-medicate themselves to bring glucose levels within normal limits. Dosing with exogenous insulin is one example of a fast-acting glucose modulator that has allowed subjects with diabetes to maintain relatively normal lifestyles. Described herein is a non-insulin fast-acting compound that regulates blood glucose levels in real-time.

Insulin and glucagon are principal hormones that regulate blood glucose levels. In response to an increase in blood glucose, such as after a meal, insulin is released from beta cells of the pancreas. Insulin regulates the metabolism of carbohydrates and fats by promoting uptake of glucose from the blood into fat and skeletal muscle. Insulin also promotes fat storage and inhibits the release of glucose by the liver. Regulation of insulin levels is a primary means for the body to regulate glucose in the blood.

When glucose levels in the blood are decreased, insulin is no longer released and instead glucagon is released from the alpha cells of the pancreas. Glucagon causes the liver to convert stored glycogen into glucose and to release this glucose into the bloodstream. Thus, insulin and glucagon work in concert to regulate blood glucose levels.

In one embodiment, treatment of diabetes mellitus is to administer a composition to a subject to lower blood glucose.

Hyperglycemia refers to an increased level of glucose in the blood. Hyperglycemia can be associated with high levels of sugar in the urine, frequent urination, and increased thirst. Diabetes mellitus refers to a medical state of hyperglycemia.

The American Diabetes Association (ADA) suggests that fasting plasma glucose (FPG) levels of 100 mg/dL to 125 mg/dL or HbA1c levels of 5.7% to 6.4% may be considered hyperglycemia and may indicate that a subject is at high risk of developing diabetes mellitus (i.e. prediabetes, see ADA Guidelines 2015).

The ADA states that a diagnosis of diabetes mellitus may be made in a number of ways. A diagnosis of diabetes mellitus can be made in a subject displaying an HbA1c level of ≥6.5%, an FPG levels of ≥126 mg/dL, a 2-hour plasma glucose of ≥200 mg/dL during an OGTT, or a random plasma glucose level ≥200 mg/dL in a subject with classic symptoms of hyperglycemia.

Diabetes mellitus can be broken into Type 1 and Type 2. Type 1 diabetes mellitus (previously known as insulin-dependent diabetes or juvenile diabetes) is an autoimmune disease characterized by destruction of the insulin-producing beta cells of the pancreas. Classic symptoms of Type 1 diabetes mellitus are frequent urination, increased thirst, increased hunger, and weight loss. Subjects with Type 1 diabetes mellitus are dependent on administration of insulin for survival.

Type 2 diabetes mellitus is a metabolic disease characterized by a relative decrease in insulin levels and/or a phenotype of insulin resistance. Insulin resistance refers to when cells of the body no longer respond appropriately to insulin. The risk of Type 2 diabetes mellitus is increased in individuals who are obese or who have a sedentary lifestyle.

In the absence of regulation of glucose levels in subjects with diabetes, a range of serious complications may be seen. These include atherosclerosis, kidney disease, stroke, nerve damage, and blindness.

A method of treating diabetes mellitus comprising administering a composition is encompassed. In one embodiment, the method comprises lowering blood glucose levels in the diabetic subject to below about 200 mg/dL, 150 mg/dL, 100 mg/dL, or about 125 mg/dL.

In some embodiments, treatment of diabetes is increasing insulin levels in the subject after administering a composition.

In some embodiments, administering a composition causes a decrease in blood glucose levels such that levels are less than 200 mg/dL.

In some embodiments, the subject treated with a composition has Type 1 diabetes mellitus. In some embodiments, the diabetic subject treated has a relative decrease in insulin levels. In some embodiments, the subject treated has decreased beta cell mass. In some embodiments, the decrease in beta cell mass in a subject is due to an autoimmune disease.

In some embodiments, the subject treated has diabetes mellitus based on diagnosis criteria of the American Diabetes Association. In some embodiments, the subject with diabetes mellitus has an HbA1c level of ≥6.5%. In some embodiments, the subject with diabetes mellitus has an FPG levels of ≥126 mg/dL. In some embodiments, the subject with diabetes mellitus has a 2-hour plasma glucose of ≥200 mg/dL during an OGTT. In some embodiments, the subject with diabetes mellitus has a random plasma glucose level ≥200 mg/dL or 11.1 mmol/L. In some embodiments, the subject with diabetes mellitus has a random plasma glucose level ≥200 mg/dL or 11.1 mmol/L with classic symptoms of hyperglycemia.

A. Treatment With Genetically Modified Beta-Like Cells

In some embodiments, a method of treating type 1 diabetes, improving glucose tolerance, lowering blood glucose, and increasing insulin secretion in response to glucose is encompassed comprising administering a composition comprising a human beta-like cell, wherein the beta-like cell is capable of producing insulin in response to glucose, and wherein the beta-like cell is genetically modified to inhibit expression of one or more of human menin (SEQ ID No: 1); transcription factor HIVEP2 (SEQ ID No: 2); renalase (SEQ ID No: 3); lengsin (SEQ ID No: 4); eIF-2-alpha kinase activator GCN1 (SEQ ID No: 5); perilipin-4 (SEQ ID No: 6); mediator of RNA polymerase II transcription subunit 11 (SEQ ID No: 7); protein-glutamine gamma-glutamyltransferase 6 (SEQ ID No: 8); zinc finger BED domain-containing protein 3 (SEQ ID No: 9); and metabotropic glutamate receptor 2 (SEQ ID No: 10).

In some embodiments, the method comprises administering an agent that genetically modifies any one of human menin (SEQ ID No: 1); transcription factor HIVEP2 (SEQ ID No: 2); renalase (SEQ ID No: 3); lengsin (SEQ ID No: 4); eIF-2-alpha kinase activator GCN1 (SEQ ID No: 5); perilipin-4 (SEQ ID No: 6); mediator of RNA polymerase II transcription subunit 11 (SEQ ID No: 7); protein-glutamine gamma-glutamyltransferase 6 (SEQ ID No: 8); zinc finger BED domain-containing protein 3 (SEQ ID No: 9); and metabotropic glutamate receptor 2 (SEQ ID No: 10) to an individual with type 1 diabetes is encompassed.

In some embodiments, the administering prevents the death of pancreatic islet cells.

In some embodiments, the administering lowers blood glucose in a subject.

In some embodiments, the administering increases insulin secretion in a subject.

In some embodiments, the administering treats type 1 diabetes in a subject.

In some embodiments, the subject is a mammal. In some embodiments, the mammal is a human.

In some embodiments, the subject has a blood sugar level higher than 11.1 mmol/liter or 200 mg/dl.

In some embodiments, genetically modified beta-like cells are administered via subcutaneous or intraperitoneal injection. In some embodiments, genetically modified beta-like cells are administered by portal vein infusion.

In some embodiments, genetically modified beta-like cells are transplanted. The genetically modified beta-like cells may be transplanted into any tissue that can support their survival/growth. In some embodiments, genetically modified beta-like cells are administered by transplant into the pancreas, liver, or fat pads. In some embodiments, genetically modified beta-like cells are transplanted via surgery, injection, or infusion.

In some embodiments, transplanted genetically modified beta-like cells can survive for 1, 2, 3, 4, 5, 6, 12, 18, 24, 36 months or indefinitely. In some embodiments, transplanted beta-like cells can survive for a year. In some embodiments, transplanted beta-like cells can survive for two years. In some embodiments, transplanted beta-like cells can survive for three years.

In some embodiments, proliferation of genetically modified beta-like cells over 1, 2, 3, 4, 5, 6, 12, 18, 24, or 36 months is improved compared to beta-like cells without the genetic modification.

B. Treatment With Agents Modulating Function of Protein Promoting Beta-Like Cell Death In some embodiments, a method of treating type 1 diabetes, improving glucose tolerance, lowering blood glucose, and increasing insulin secretion in response to glucose in a subject comprises administering a composition that inhibits the function of any one of human menin (SEQ ID No: 1); transcription factor HIVEP2 (SEQ ID No: 2); renalase (SEQ ID No: 3); lengsin (SEQ ID No: 4); eIF-2-alpha kinase activator GCN1 (SEQ ID No: 5); perilipin-4 (SEQ ID No: 6); mediator of RNA polymerase II transcription subunit 11 (SEQ ID No: 7); protein-glutamine gamma-glutamyltransferase 6 (SEQ ID No: 8); zinc finger BED domain-containing protein 3 (SEQ ID No: 9); and metabotropic glutamate receptor 2 (SEQ ID No: 10).

In some embodiments, a method of preventing the death of pancreatic islet cells comprises administering a composition that inhibits the function of any one of human menin (SEQ ID No: 1); transcription factor HIVEP2 (SEQ ID No: 2); renalase (SEQ ID No: 3); lengsin (SEQ ID No: 4); eIF-2-alpha kinase activator GCN1 (SEQ ID No: 5); perilipin-4 (SEQ ID No: 6); mediator of RNA polymerase II transcription subunit 11 (SEQ ID No: 7); protein-glutamine gamma-glutamyltransferase 6 (SEQ ID No: 8); zinc finger BED domain-containing protein 3 (SEQ ID No: 9); and metabotropic glutamate receptor 2 (SEQ ID No: 10).

In some embodiments, composition inhibits the function of metabotropic glutamate receptor 2 (SEQ ID No: 10). In some embodiments, the composition is LY341495, (2S)-α-ethylglutamic acid (EGLU), or MGS-0039.

C. Combination Treatment

In some embodiments, treatment further comprises an additional therapeutic agent.

In some embodiments, the further therapeutic agent is insulin. In some embodiments, the insulin is a rapid-acting, intermediate-acting, or long-acting insulin.

In some embodiments, the further therapeutic agent is an immunosuppressant or immunomodulatory agent. In some embodiments, the further therapeutic agent decreases the autoimmune response of the subject against beta-like cells.

In some embodiments, the further therapeutic agent is a glucagon-like peptide analog or agonist, dipeptidyl peptidase-4 inhibitor, amylin analog, biguanide, thiazolidinedione, sulfonylurea, meglitinide, alpha-glucosidase inhibitor, or sodium/glucose transporter 2 inhibitor.

EXAMPLES

Example 1. Whole-Genome Loss-of-Function (LOF) Screen

Unbiased whole-genome screening is a powerful approach to discover novel genes and signaling pathways that underlie disease. An LOF screen was performed in a mouse model using CRISPR/Cas9 genome editing technology (see Komor A C et al., Cell 168(1-2):20-36 (2016)).

This screen took advantage of the NOD mouse model of type 1 diabetes (see Pearson J A et al., J. Autoimmun. 66:76-88 (2016)). NOD mice develop type 1 diabetes due to autoimmune attack on beta cells of the pancreas.

In addition, the model used NIT-1 cells that are an immortalized beta cell line derived from NOD mice (see Hamaguchi K et al., Diabetes 40:842-9 (1991)). NIT-1 cells can be implanted into NOD mice without triggering alloreactivity, because of the cells' NOD origin. However, NIT-1 cells express all the beta cell antigens that are targeted by the immune system during autoimmunity and so are subject to immune killing in a NOD mouse.

A mouse model of induced attack on beta cells was developed using NIT-1 and NOD.scid mice. NOD.scid mice are NOD mice lacking a normal immune system. The scid mutation prevents the development of mature T and B lymphocytes, so that NOD.scid mice are protected from autoimmunity. Therefore, transplanted NIT-1 cells will not be targeted for immune killing by the NOD.scid immune system, and NIT-1 cells can be used as surrogate beta cells.

To elicit an experimentally regulated autoimmune attack on NIT-1 cells transplanted into the NOD.scid mice model, lymphocytes were transferred from diabetic NOD mice into NOD.scid animals. Autoreactive NOD T cells from the donor lymphocytes can start killing endogenous NOD.scid beta cells, as well as experimentally implanted NIT-1 cells.

This model system was tested as shown in FIG. 1. NIT-1 cells were infected with a lentiviral construct encoding a luciferase reporter at a multiplicity-of-infection (MOI) of 0.3-0.6. Transduced cells were then injected into NOD.scid mice subcutaneously, and some mice were also administered diabetogenic splenocytes (NOD splenocytes) on the same day. As shown in FIG. 1, non-invasive bioluminescence imaging of transplanted cells showed that the NOD splenocytes eliminated most of the implanted NIT-1 cells (~90%) within 15 days (compare the two animals on the right of the images for day 1 and day 15). In contrast, in the absence of autoreactive lymphocytes, NIT-1 cell mass expanded (see the two animals on the left of each image). These data indicate that the autoimmune attack on NIT-1 cells by injected NOD splenocytes can be used as a means of selective pressure on beta cell survival in the NOD.scid mice model.

A series of tools to run a CRISPR/Cas9 mediated whole-genome loss-of-function (LOF) screen were developed. The GeCKO V2 lentiviral pooled library was used that comprises guide RNAs (gRNAs) against every gene (Addgene, targeting >20,000 genes with 6 gRNAs/gene). This library was split into two sub-libraries (A and B), which each cover all targeted genes with 3 gRNAs/gene. These libraries cover the entire coding genome to potentially mutate every gene and also contain >1000 non-targeting gRNAs as internal negative controls. In the GeCKO library, Cas9 and gRNAs were incorporated into a single lentiviral vector to introduce these gene-targeting elements into beta cells by lentiviral infection. This CRISPR/Cas9 LOF system is superior to other previous LOF screening platforms because it is highly efficient and is likely to mutate both copies of a gene simultaneously.

A high-stringency LOF screen was done using a single mouse. In this model, $10^7$ GeCKO library-A infected NIT-1 cells (multiplicity of infection (MOI)=0.3) were injected subcutaneously, and $10^7$ diabetic NOD splenocytes were injected intravenously at the same time.

Figure 2:
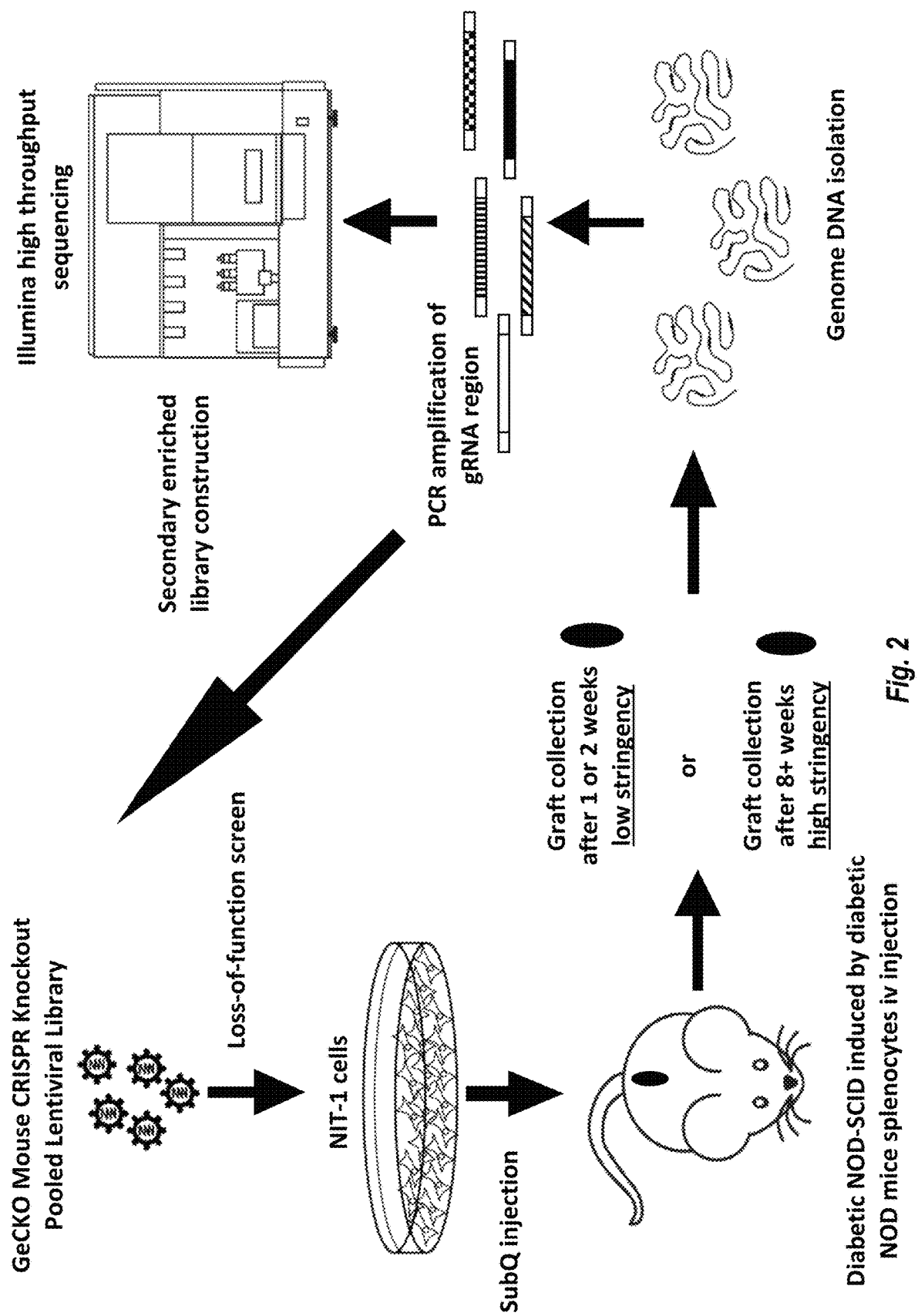
FIG. 2 shows schematic illustration of CRISPR/Cas9 based whole-genome loss-of-function (LOF) screen.

The workflow for the genome-wide LOF CRISPR-Cas9 screenings of beta cells is illustrated in FIG. 2.

Figure 3:
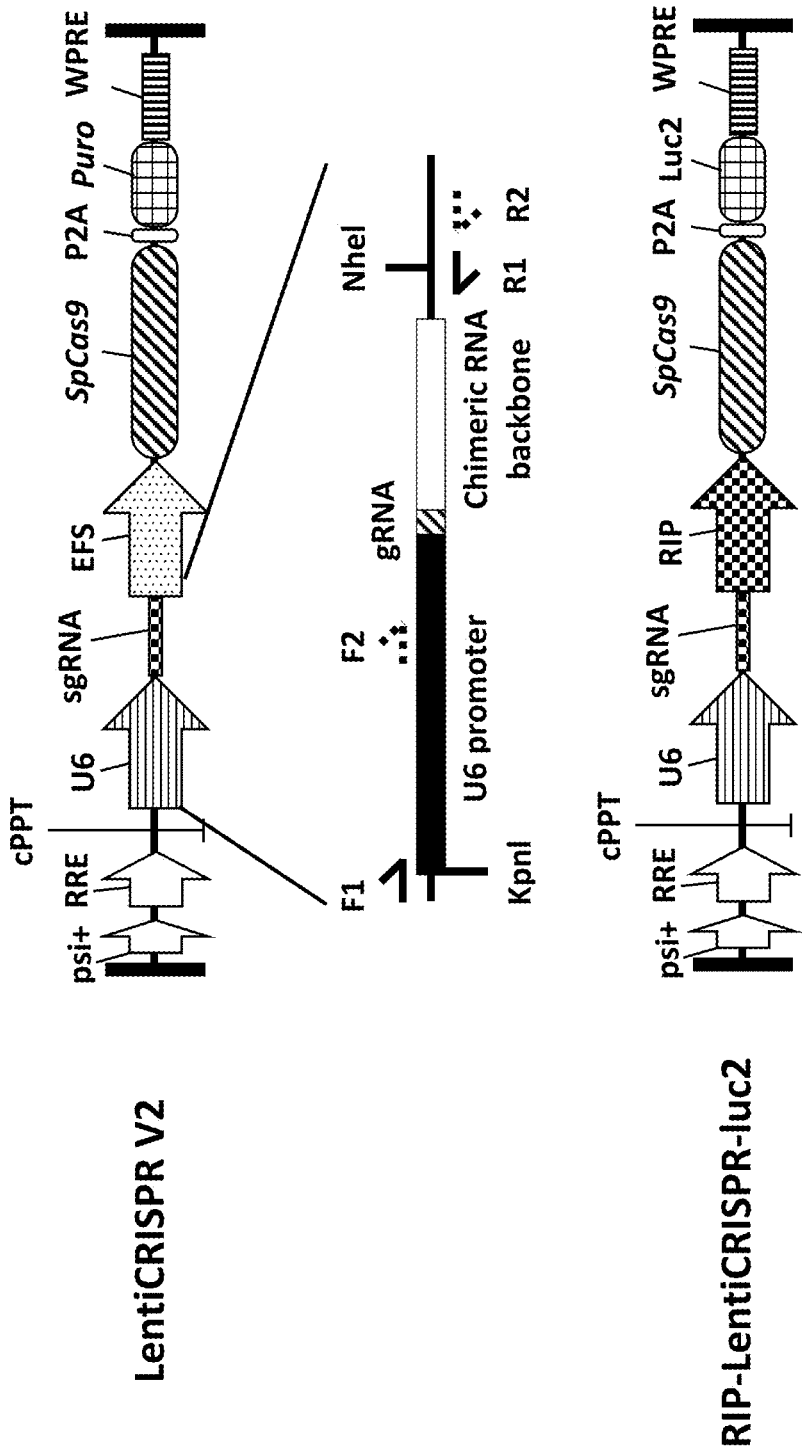
FIG. 3 shows lentiviral constructs used in GeCKO screen and subsequent confirmation in primary beta cells.

For sequencing, genomic DNA from explanted grafts was extracted with genome DNA midi prep kits, and the gRNA region was amplified from genomic DNA using established protocols. As illustrated in FIG. 3, the gRNA region from LentiCRISPR-V2 genomic insertion was amplified by PCR using the primers F2 and RI, barcoded and sequenced.

Figure 4:
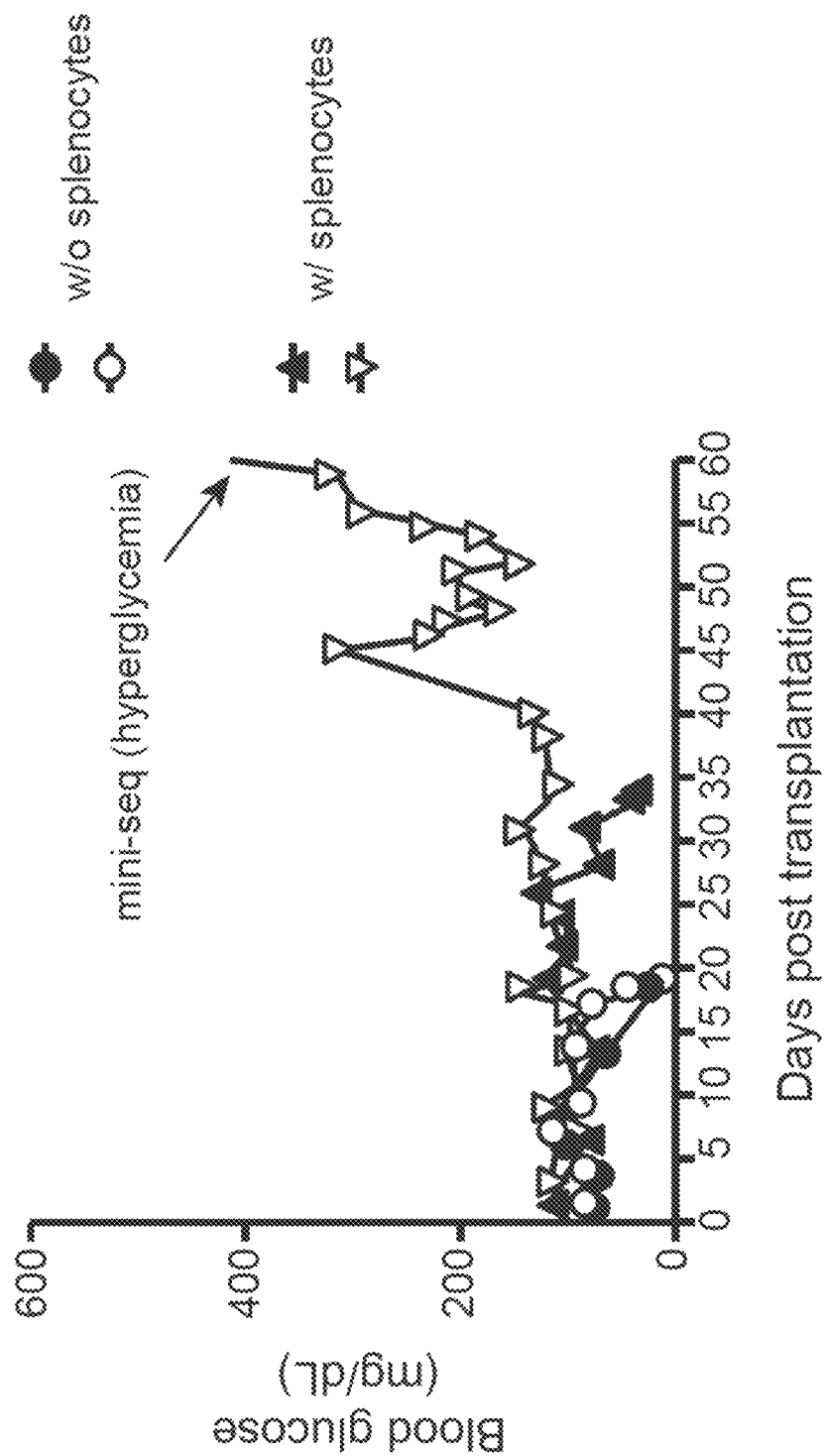
FIG. 4 shows blood glucose levels over 60 days in the LOF screen. The arrow shows blood glucose levels in the NOD.scid mice receiving transplanted NIT-1 cells transduced and splenocytes at the time when samples were taken for sequencing.

Selection pressure (i.e., autoimmune attack) on transplanted NIT-1 cells was maximized by waiting until NOD.scid mice had become severely hyperglycemic (~60 days, marked by the arrow) as shown in FIG. 4. Even after the blood glucose of one recipient NOD.scid mouse had reached approximately 500 mg/dL, approximately 50,000 cells from the remaining graft could be isolated. gRNAs were amplified from the genome DNA of the graft and surveyed by mini-seq (low-depth sequencing).

Since the GeCKO library (A library) only contain approximately 60,000 unique gRNAs, $10^6$-$10^7$ sequencing reads was sufficient to cover the whole library and to achieve statistical significance. Typically, one high throughput sequencing reaction using the second generation Illumina system (e.g. NextSeq 500) can yield ~150 millions of sequence reads, so multiple samples from different grafts were barcoded, mixed and sequenced together, thus greatly reducing sequencing costs.

The sequencing data was de-barcoded and then analyzed by bioinformatics analysis. Established analysis tools such as HiTSelect or MAGeCK were used for gRNA enrichment analysis. In sum, the ability to amplify, sequence and subclone gRNAs after in vivo selection allowed identification of genes whose suppression improved beta cell survival.

Data from a single recipient of CRISPR-targeted beta cells yielded a surprisingly small number of target genes. As expected with the high stringency selection, only 13 unique gRNAs that target 12 genes out of >60,000 gRNAs present in pre-implantation cells were identified. The number of times the gRNA was present in sequence (count), the frequency of the gRNA in the total reads, and the gene targeted by the gRNA are shown in Table 2. Two different gRNAs targeting Men1 were found in the screen. The target genes in Table 2 encode for mouse SEQ ID Nos: 11-22 in Table 1, and the known human equivalents of these gene products are SEQ ID Nos: 1-10 in Table 1.

TABLE 2

Unique gRNAs identified

| Target gene | SEQ IDs | gRNA sequence | Count | Frequency (% of total reads) | Target gene product | Gene product class |
|---|---|---|---|---|---|---|
| Men1 | 23 | CACGCCCGAGCTGTCCAGTT | 4919 | 16.34 | Menin 1 | Known beta cell gene |
| Hivep2 | 24 | TACGCACTCATACTGATGTT | 4073 | 13.53 | human immunodeficiency virus type I enhancer binding protein 2 | Transcriptional repressor |
| Rnls | 25 | CTACTCCTCTCGCTATGCTC | 3810 | 12.66 | renalase, FAD dependent amine oxidase | T1D GWAS gene, strongly associated with T1D only |
| Lgsn | 26 | TGCAACCGCGAACCCTTACC | 3252 | 10.80 | lengsin, lens protein with glutamine synthetase domain | Structural protein |
| GCN1 (Gcn1l1) | 27 | GCTTGACACTGCATCGATAT | 3228 | 10.72 | GCN1 general control of amino-acid synthesis 1-like 1 (yeast) | Transcriptional regulator |
| Gm3604 | 28 | ACTTTCGTATACAGATACTG | 3226 | 10.72 | unknown | Unannotated gene, predicted to be a transcriptional repressor |
| Plin4 | 29 | CTGCCTCCTTAGTTCCGACA | 2529 | 8.40 | perilipin 4 | Associated with lipid metabolism |
| Med11 | 30 | TTTCACGCTCGATATCCTCC | 1346 | 4.47 | mediator complex subunit 11 | Transcriptional regulator |
| Tgm6 | 31 | CATCGGTGGCTGGGTCCTCC | 1225 | 4.07 | trans-glutaminase 6 | Enzyme |
| Zbed3 | 32 | GCGCGAGGCGGCCCTAATGC | 1160 | 3.85 | zinc finger BED-type containing 3 | Possible transcriptional regulator, T2D GWAS gene |
| Men1 | 33 | GCTGTATGACCTCGGACATC | 702 | 2.33 | Menin 1 | Known beta cell gene |
| Olfr911-ps1 | 34 | CTTCAAATGAGATCCACTGC | 503 | 1.67 | olfactory receptor 911, pseudogene 1 (olfactory receptor 909) | GPCR |
| Grm2 | 35 | GCGGCATAACGCCACACCCG | 131 | 0.44 | glutamate receptor, metabotropic 2 | GPCR |

(GPCR = G-protein coupled receptor;
GWAS = genome-wide association study;
T1D = type 1 diabetes mellitus;
T2D = type 2 diabetes mellitus)

As shown in Table 3, ten of the mouse genes targeted by gRNAs in the LOF screen had a known human homolog.

TABLE 3

Mouse genes identified in LOF screen with human homolog

| Mouse gene symbol | Human gene symbol | Human gene ID |
|---|---|---|
| Men1 | MEN1 | 4221 |
| Hivep2 | HIVEP2 | 3097 |
| Rnls | RNLS | 55328 |
| Lgsn | LGSN | 51557 |
| Gcn1l1 | GCN1 | 10985 |

TABLE 3-continued

Mouse genes identified in LOF screen with human homolog

| Mouse gene symbol | Human gene symbol | Human gene ID |
|---|---|---|
| Plin4 | PLIN4 | 729359 |
| Med11 | MED11 | 400569 |
| Tgm6 | TGM6 | 343641 |
| Zbed3 | ZBED3 | 84327 |
| Grm2 | GRM2 | 2912 |

Several of these selected gRNAs were enriched over 6000 times (>12% in the remaining transplanted cells) in the surviving graft. With the experimental set-up, any given gRNA is initially expected to infect only ~150 cells. Because not every cell carries homozygous mutations, the selected gRNAs are likely to have conferred strong protection even when causing only partial loss of function.

Notably, two of the top gRNA hits target the same Men1 that had previously been implicated in beta cell biology, though not in the context of autoimmunity. This result provides strong evidence that our approach yields highly relevant targets.

Strikingly, the third most enriched gRNA targets the gene Rnls that is a lead candidate for a type 1 diabetes-associated region identified by genome wide association study (GWAS). The Rnls gene has been suggested to associate with the progression rate to overt type 1 diabetes, but how Rnls is involved in pathogenesis is unknown. The fact that the Rnls gene is associated with type 1 diabetes but with no other autoimmune disease indicates that it probably has a non-immune role, likely altering beta cell survival or function.

Interestingly, another one of the 12 targets identified in this preliminary screen is a candidate gene for a type 2 diabetes-associated region (Zbed3). This particular gene had been suggested to participate in insulin secretion. Again, this provides suggestive evidence that this gene's role in type 2 diabetes stems for a key function in beta cell biology.

The remaining candidate genes identified have no clear link with diabetes based on current knowledge. One of these genes has not even been annotated previously (Gm3604), let alone studied. The fact that this screen was able to discover genes that were already associated with type 1 and 2 diabetes or that are known to impact beta cell biology highlights the power of this unbiased yet stringent screening strategy.

Example 2. Confirmation of Candidate Genes

In vitro experiments were performed to confirm the in vivo screen results that inhibition of the genes listed in Table 2 promoted survival of beta cells in a type 1 diabetes model.

NIT-1 stable cell lines were prepared for each candidate gene to investigate whether the gRNA used mediated editing of the target gene. To generate NIT-1 stable cell lines, the Cas9 gene and single gRNA targeting each candidate gene were stably incorporated into the genome of NIT-1 cells by lentivirus transduction.

Figure 5A:
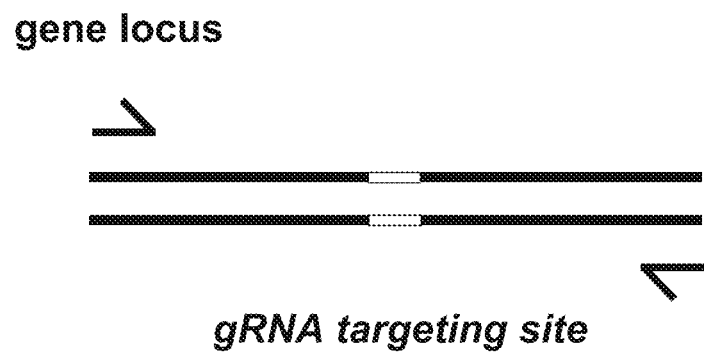
FIGS. 5A-5C show confirmation that the gRNAs used in the screen induced editing of the target gene.
Figure 5B:
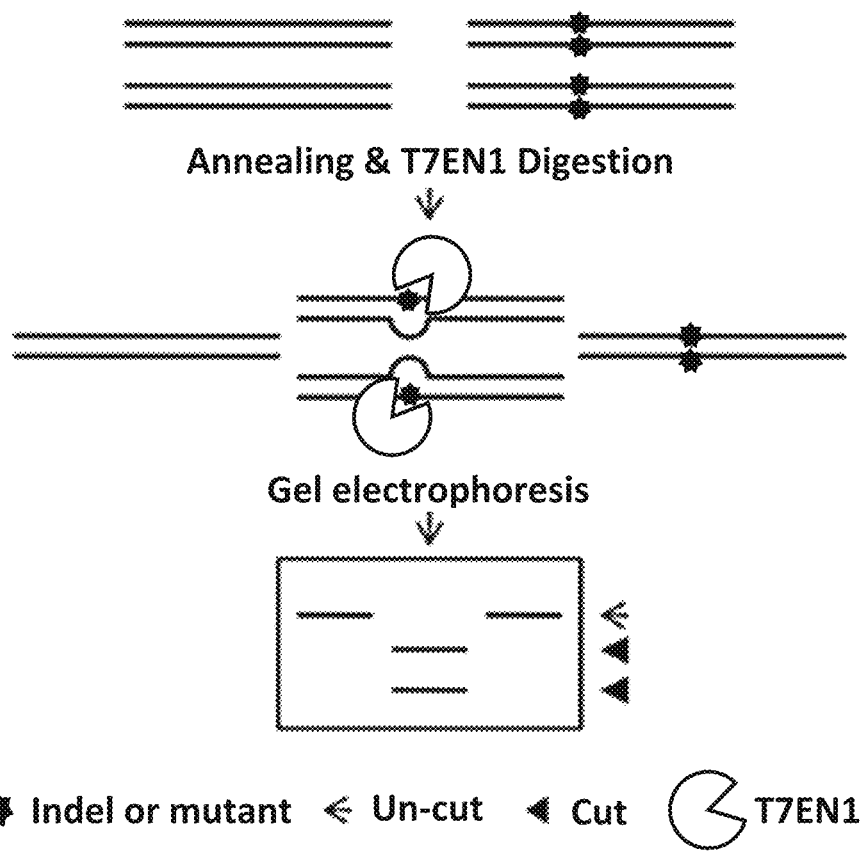
Figure 5C:
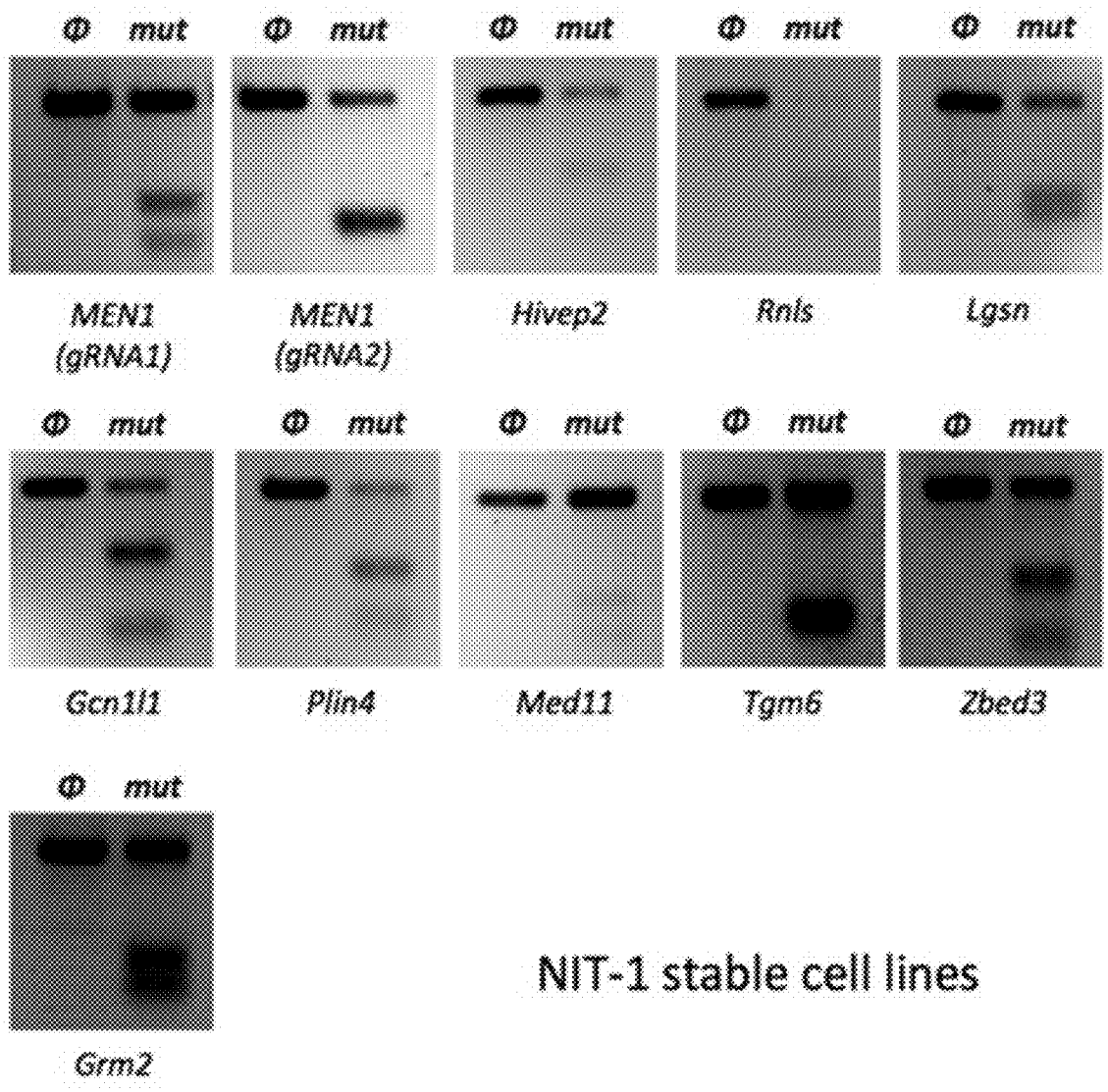

The T7E1 assay was used to detect mutations in the target genome locus, with activity based on the capability of T7 endonuclease I to cut mismatched double strand DNA. This strategy means that not all cells will have the homozygous null/missense mutation; therefore, a relative decrease (without total loss of native form) indicates successful editing of the target gene. Data shown in FIGS. 5A-5C shows editing experiments in stable cells lines. FIG. 5A shows the primer locations outside of the targeting site of the gRNA, and FIG. 5B shows the T7E1 assay design. Table 4 provides primers used for the T7E1 experiments.

TABLE 4

Genome PCR primers used for T7E1 assay

| Gene | SEQ ID No: | 5' primer | SEQ ID No: | 3' primer |
|---|---|---|---|---|
| Hivep2 | 36 | TCACAGTGGTC TGCCTCTTC | 49 | TGAAACCTTTC CCTCTCCAA |
| Rnls | 37 | TGGGACTTGTT TAAAGGAGCTT | 50 | TTGCGCTTCTT ATTATCAATGG |
| Lgsn | 38 | GCAGAGACCTG AAGGACAGC | 51 | CAAAGGGATCT CGGAAGGTT |
| Gcn1l1 | 39 | GGCTTACTAGG GCGTCTGGT | 52 | ACTAGGGGCTC TCCCCACT |
| Gm3604 | 40 | GTAACTGGATT GGCCCAAGA | 53 | TGTGGTAAAGC TTGTGTGTGG |
| Plin4 | 41 | GTTTGCAGCTC CCATGACTC | 54 | CAGTGTGACCA GCAGTGAAGA |
| Med11 | 42 | ACTCAGCCCCG CCCTAAG | 55 | CGCACATTAAC AGGCATTTC |
| Tgm6 | 43 | ACTGGTTTGGG GGATCCTT | 56 | AACAGATCAAG TGGGGTTGG |
| Zbed3 | 44 | GAGCTCGCCGA CCACCAT | 57 | TCAGTGCTTCA CGCTCTACC |
| Olfr909 | 45 | TTTTCCCTCTG TTGCAGCTC | 58 | AGGTGAGGAGG GCTGAAGAT |
| Grm2 | 46 | TGACTGGATGC TTTGAGCTG | 59 | CGCCTTAAGGT GCAGACG |
| Men1 (locus 1) | 47 | CCACGTCACCT CAGCTGTCT | 60 | AGTGGATAGGG TGTGTGATGC |
| Men1 (locus 2) | 48 | CAGGTCTGCCA AGTTCCCTA | 61 | CTCCTAGCCCT TCTGTGGTG |

As shown in FIG. 5C, successful editing was seen for all target genes in vitro using the gRNAs found during the in vivo screen. These data confirm that the gRNAs identified in the in vivo screen can successfully edit their target gene.

Figure 6A:
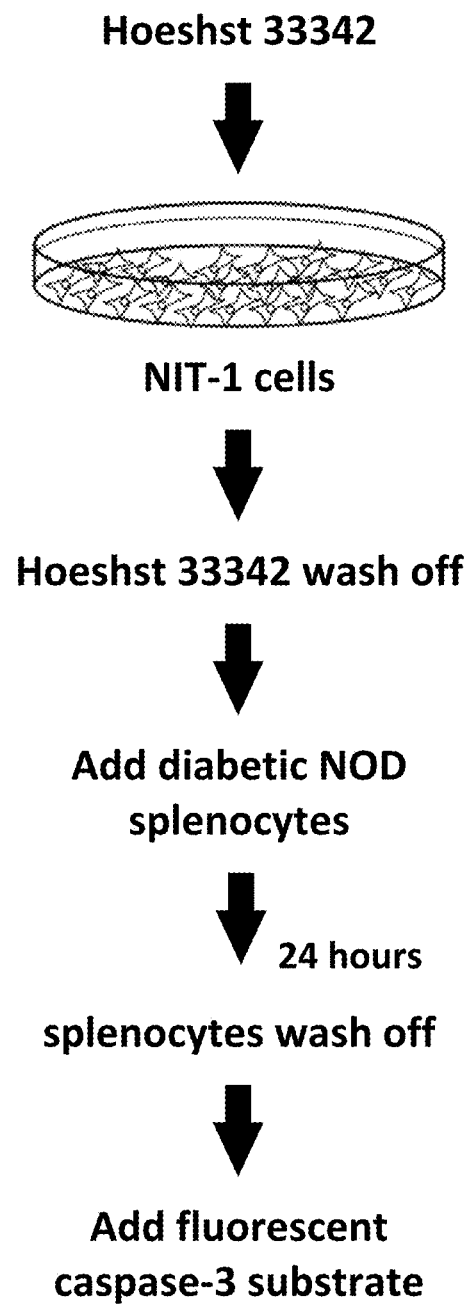
FIGS. 6A-6C show are in vitro co-culture system for studying NIT-1 cell death by NOD splenocytes.
Figure 6B:
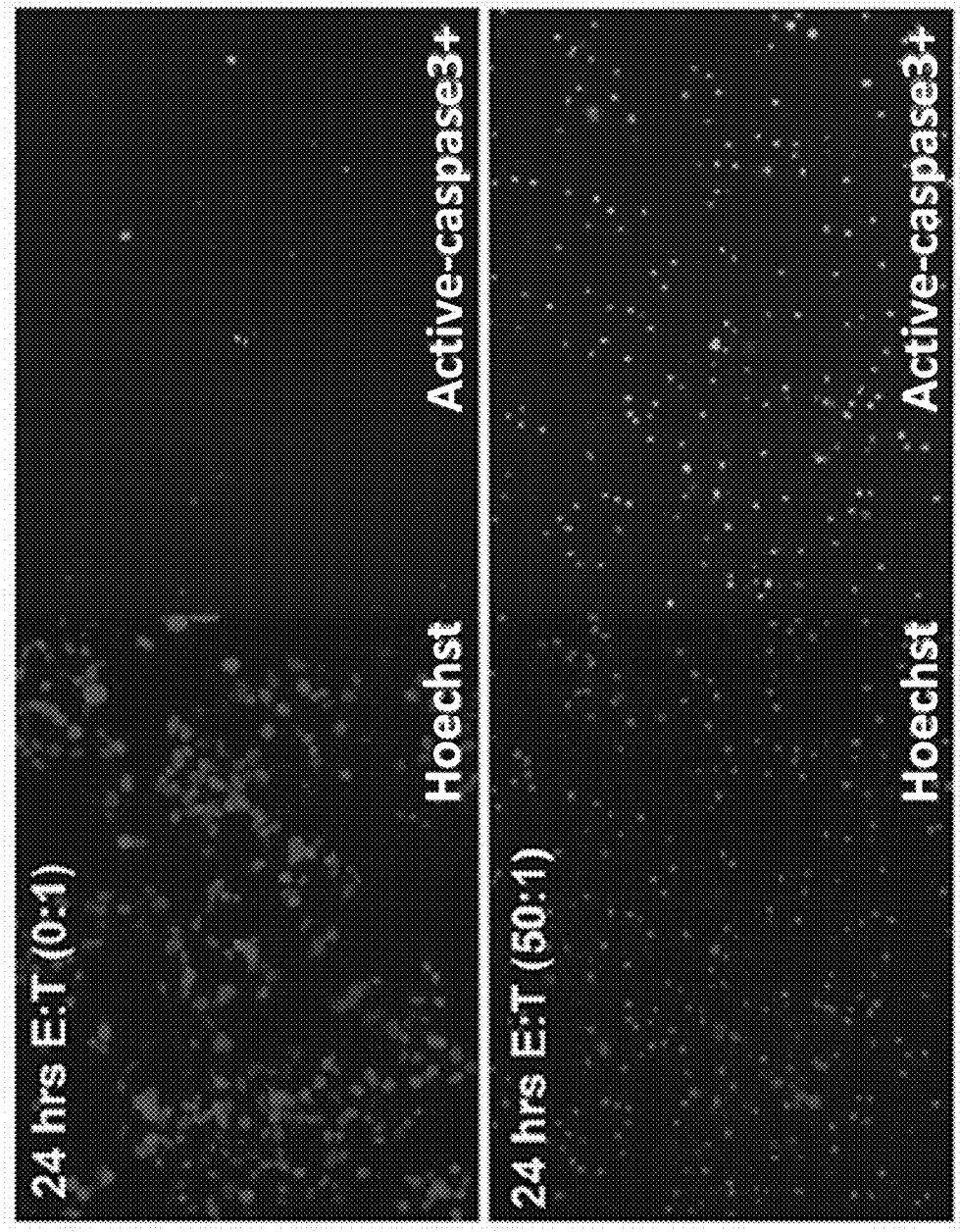
Figure 6C:
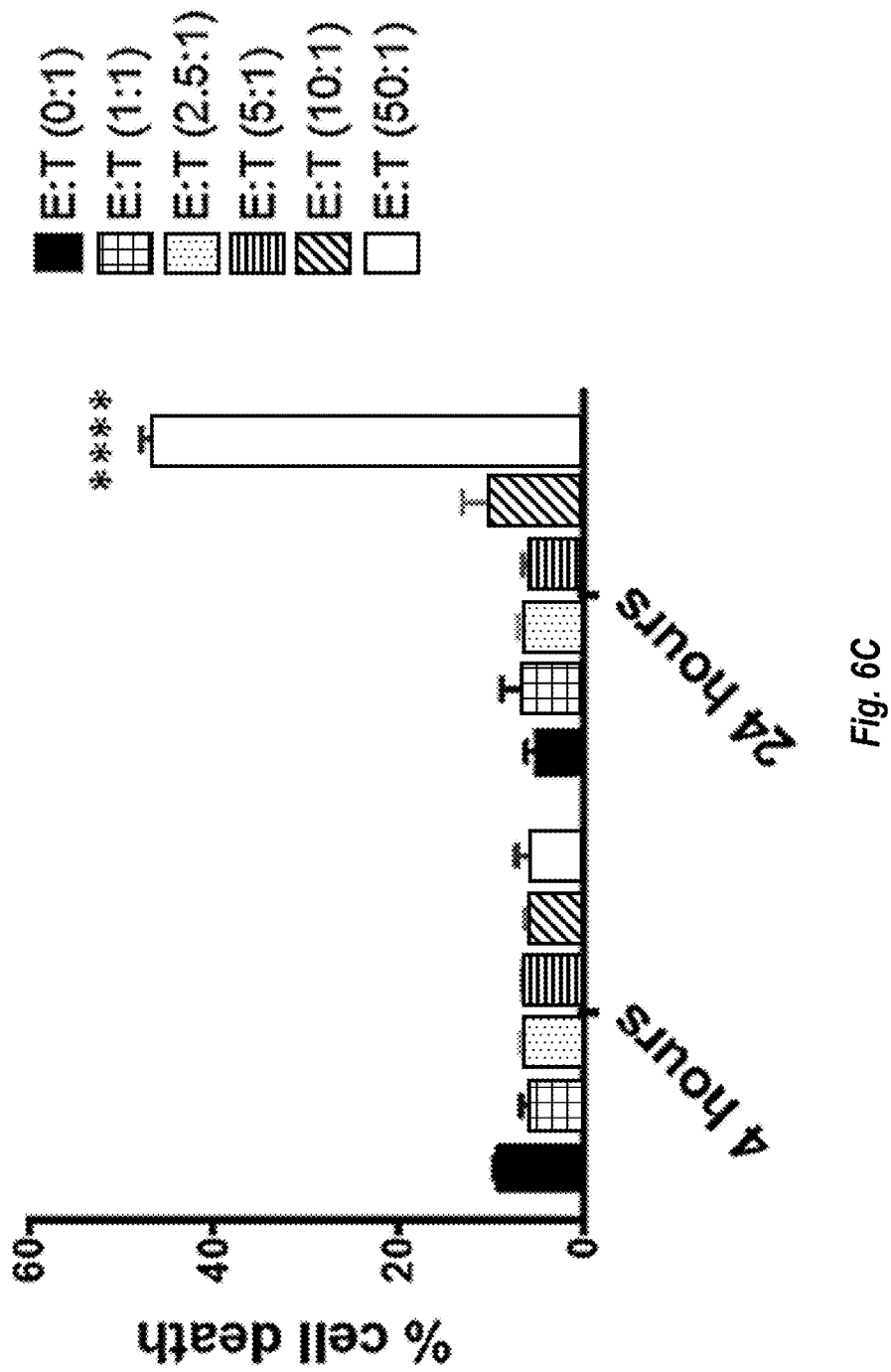

A cellular model of immune killing of stable NIT-1 cell lines was also developed, as shown in FIGS. 6A-6C. As shown in FIG. 6A, a co-culture assay with NIT-1 cells and NOD splenocytes was developed, wherein NIT-1 cells can be co-cultured with different ratios of NOD splenocytes (FIG. 6B). There is little cell death over 24 hours of NIT-1 cells not co-cultured with NOD splenocytes (0:1 ratio of splenocytes to NIT-1 cells in FIG. 6B), as evidenced by weak staining of active caspase-3. In contrast, NIT-1 cells co-cultured with a high ratio of NOD splenocytes (50:1 ratio of splenocytes to NIT-1 cells in FIG. 6B) show high cell death, as evidenced by strong caspase-3 activity. These data are summarized in FIG. 6C, which shows that 24 hour co-culture with a 50:1 ratio of NOD splenocytes:NIT-1 cells lead to a high percentage of cell death. This model can be used to study whether inhibiting or suppressing expression of target genes blocks or inhibits the ability of NOD splenocytes to mediate NIT-1 cell death over time.

Figure 7:
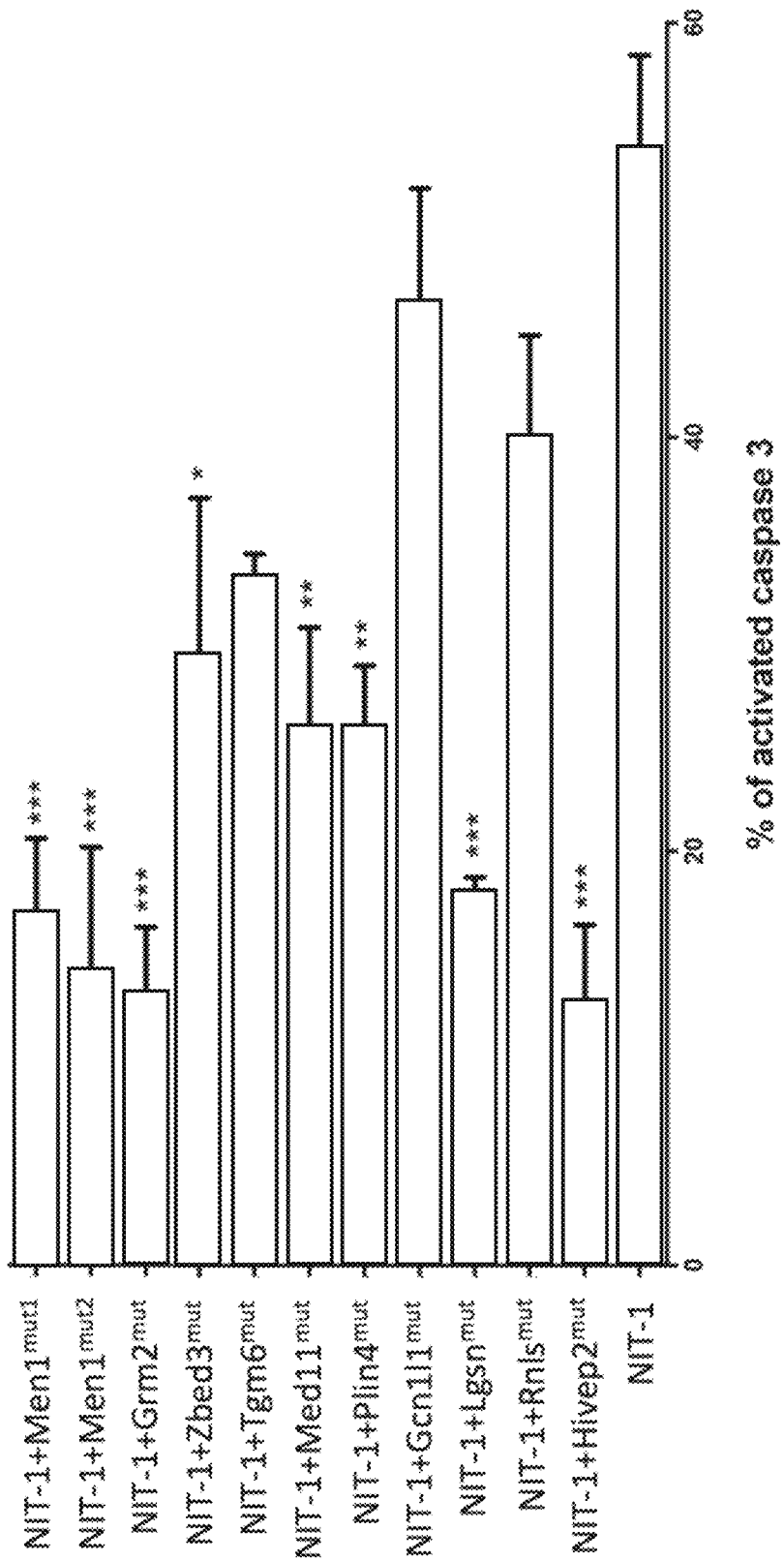
FIG. 7 shows results on activation of caspase 3 in a co-culture system of NOD splenocytes incubated with NIT-1 cells expressing gRNAs for different target genes. NIT-1 cells were incubated for 24 hours with splenocytes at a ratio of 50 splenocytes:1 NIT-1 cell. $P<0.05=*$; $P<0.01=$, and $P<0.001=*$.

FIG. 7 shows killing of NIT-1 cells by NOD splenocytes (measured by activated caspase 3) for NIT-1 cell lines stably expressing gRNAs to inhibit expression of various target genes. While more than 50% of NIT-1 cells without any inhibition of a target gene showed activated caspase 3 staining ("NIT1" group), expression of gRNAs to inhibit many of the target genes significantly decreased caspase 3 activation. For example, both gRNAs targeting menin (SEQ ID No: 23 and SEQ ID No: 33) significantly decreased NIT-1 cell death mediated by NOD splenocytes.

These data confirm that suppression of expression of many of the target genes found in the LOF screen protects NIT-1 cells from NOD splenocyte attack in an in vitro system.

Example 3. Reduction in Endoplasmic Reticulum Stress by Inhibition of Expression of Rnls or Zbed3 in Beta Cells In some instances, beta cell death in Type 1 diabetes is induced by endoplasmic reticulum (ER) stress. Blocking ER stress and subsequent beta cell death has been shown to reverse early-onset Type 1 diabetes in mouse models (see Morita S. et al. *Cell Metabolism* 2017: 25(4):883-897). Therefore, one way to assess whether a therapeutic intervention is capable of protecting beta cells from autoimmune destruction is to assess whether that therapeutic can protect beta cells from death caused by ER stress.

NIT-1 beta cells were genetically modified at two genes— 1) Rnls; and 2) Zbed3 with CRISPR/Cas9 and guide RNAs (gRNAs) targeting Rnls and Zbed3, respectively. The modified NIT-1 cells had reduced expression of renalase (Rnls mutants) or zinc finger BED domain-containing protein 3 (Zbed3 mutants). ER stress was induced by thapsigargin, which blocks the sarco/endoplasmic reticulum $Ca^{2+}$-ATPase (SERCA) pump on the ER, thus depleting calcium from the ER and leading to misfolding of proteins in ER and eventually ER stress induced cell death.

Figure 8:
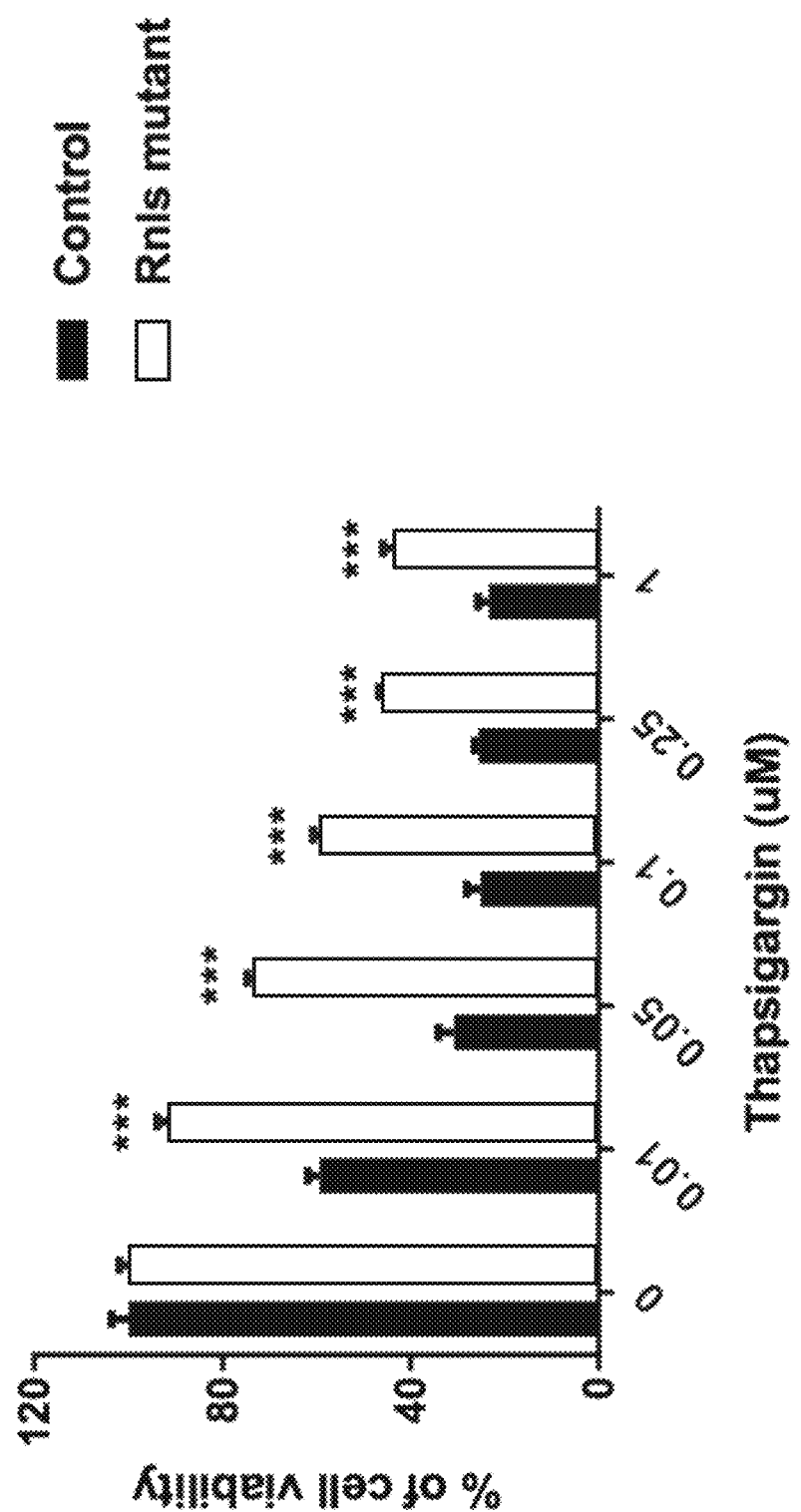
FIG. 8 shows cell viability of control or Rnls mutant NIT-1 cells following thapsigargin treatment.
Figure 9:
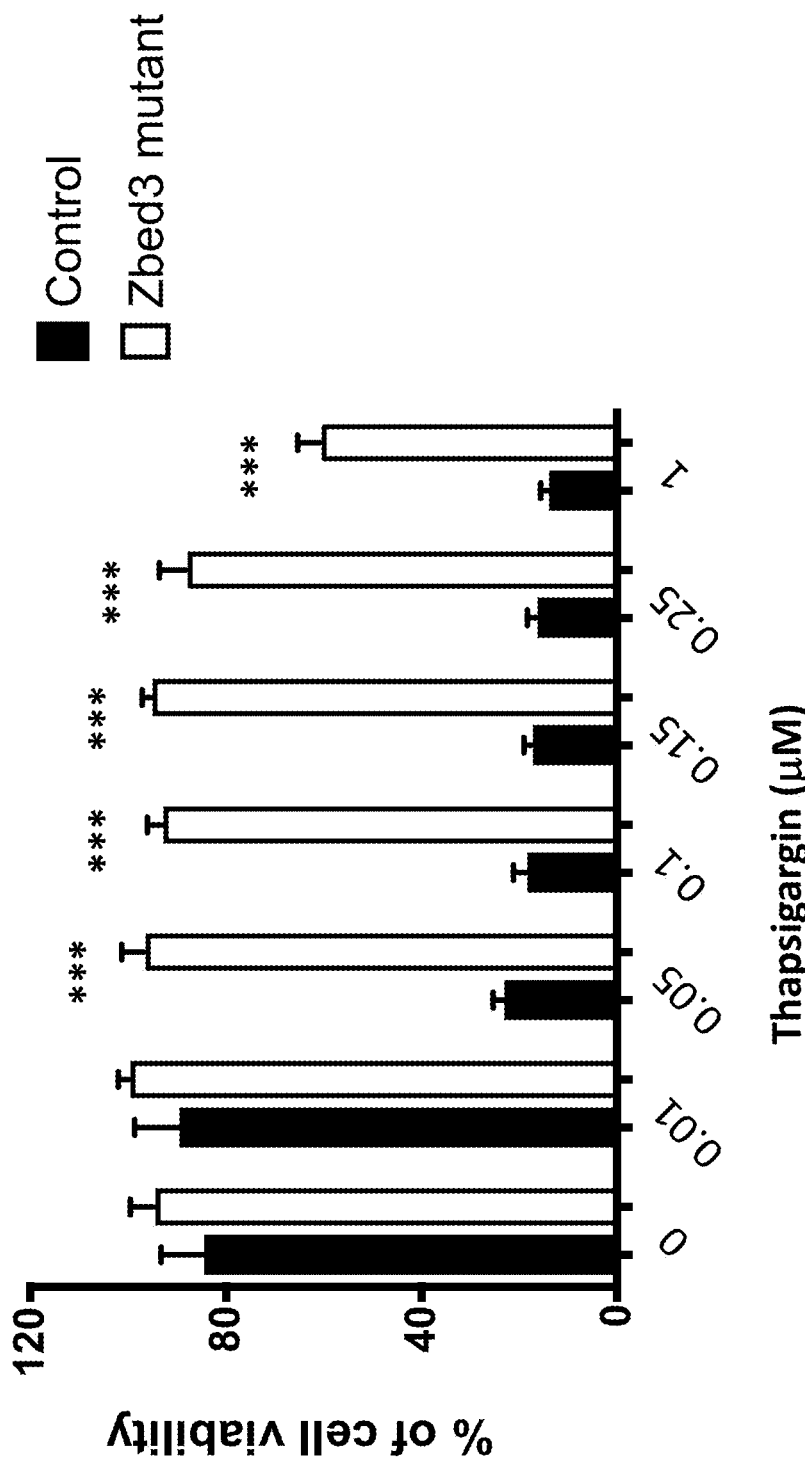
FIG. 9 shows cell viability of control or Zbed3 mutant NIT-1 cells following thapsigargin treatment.

All cells were treated with thapsigargin for 3 days, and cell viability was evaluated by a standard MTT assay (see Mosmann T, *J Immunol Methods* 65(1-2):55-63 (1983)). Our studies showed that thapsigargin at different dosages induced beta cell death in control cells. However, in Rnls mutant and Zbed3 mutant cells were both resistant to thapsigargin-induced cell death in a dosage-dependent manner. Thus, inhibiting expression of the Rnls or Zbed3 protected beta cells from cell death induced by ER stress. See FIG. 8 (Rnls) and FIG. 9 (Zbed3).

EQUIVALENTS

The foregoing written specification is considered to be sufficient to enable one skilled in the art to practice the embodiments. The foregoing description and Examples detail certain embodiments and describes the best mode contemplated by the inventors. It will be appreciated, however, that no matter how detailed the foregoing may appear in text, the embodiment may be practiced in many ways and should be construed in accordance with the appended claims and any equivalents thereof.

As used herein, the term about refers to a numeric value, including, for example, whole numbers, fractions, and percentages, whether or not explicitly indicated. The term about generally refers to a range of numerical values (e.g., +/−5-10% of the recited range) that one of ordinary skill in the art would consider equivalent to the recited value (e.g., having the same function or result). When terms such as at least and about precede a list of numerical values or ranges, the terms modify all of the values or ranges provided in the list. In some instances, the term about may include numerical values that are rounded to the nearest significant figure.

---

What is claimed is:

1. A method of lowering blood glucose, increasing insulin secretion in response to glucose, treating or ameliorating type 1 diabetes, or reducing the death of pancreatic islet cells in a subject comprising administering a genetically modified cell capable of producing insulin in response to glucose to the subject, wherein the cell is (1) a beta cell; (2) a cell generated from a stem cell; or (3) a reprogrammed or transdifferentiated pancreatic alpha cell, pancreatic exocrine cell, or a gut or stomach cell, and wherein the cell comprises a genetic modification to the coding region of a gene encoding renalase to inhibit expression of renalase.

2. The method of claim 1, wherein the cell further comprises one or more genetic modification to any one or more of:
   a. the coding region of a gene encoding menin to inhibit expression of menin,
   b. the coding region of a gene encoding transcription factor HIVEP2 to inhibit expression of HIVEP2,
   c. the coding region of a gene encoding lengsin to inhibit expression of lengsin,
   d. the coding region of a gene encoding eIF-2-alpha kinase activator GCN1 to inhibit expression of eIF-2-alpha kinase activator GCN1,
   e. the coding region of a gene encoding perilipin-4 to inhibit expression of perilipin-4,
   f. the coding region of a gene encoding mediator of RNA polymerase II transcription subunit 11, to inhibit expression of mediator of RNA polymerase II transcription subunit 11,
   g. the coding region of a gene encoding protein-glutamine gamma-glutamyltransferase 6 to inhibit expression of protein-glutamine gamma-glutamyltransferase 6,
   h. the coding region of a gene encoding zinc finger BED domain-containing protein 3 to inhibit expression of zinc finger BED domain-containing protein 3, or
   i. the coding region of a gene encoding metabotropic glutamate receptor 2 to inhibit expression of metabotropic glutamate receptor 2.

3. The method of claim 1, wherein the cell is isolated from a human, non-human primate, cow, horse, pig, sheep, goat, dog, cat, or rodent.

4. The method of claim 1, wherein the stem cell is an adult stem cell, pluripotent stem cell, embryonic stem cell, hematopoietic stem cell, bone marrow stromal stem cell, or mesenchymal stem cell.

5. The method of claim 1, wherein the genetic modification comprises a substitution, insertion, deletion, or excision of one or more nucleotides.

6. The method of claim 1, wherein no renalase is expressed, or wherein a non-functional renalase is produced.

7. The method of claim 1, wherein survival or proliferation of the genetically modified cell over 1, 2, 3, 4, 5, 6, 12, 18, 24, or 36 months is greater compared to a cell without the genetic modification.

8. The method of claim 1, wherein renalase comprises a sequence comprising SEQ ID NO: 3.

9. The method of claim 2, wherein menin comprises a sequence comprising SEQ ID No: 1, transcription factor HIVEP2 comprises a sequence comprising SEQ ID No: 2, lengsin comprises a sequence comprising SEQ ID No: 4, eIF-2-alpha kinase activator GCN1 comprises a sequence comprising SEQ ID No: 5, perilipin-4 comprises a sequence comprising SEQ ID No: 6, mediator of RNA polymerase II transcription subunit 11 comprises a sequence comprising SEQ ID No: 7, protein-glutamine gamma-glutamyltransferase 6 comprises a sequence comprising SEQ ID No: 8, zinc finger BED domain-containing protein 3 comprises a sequence comprising SEQ ID No: 9, and metabotropic glutamate receptor 2 comprises a sequence comprising SEQ ID No: 10.

10. The method of claim 1, wherein the genetically modified cell is protected from autoimmune destruction.

11. The method of claim 1, wherein the method lowers blood glucose in the subject.

12. The method of claim 1, wherein the method increases insulin secretion in response to glucose in the subject.

13. The method of claim 1, wherein the method treats or ameliorates type 1 diabetes in the subject.

14. The method of claim 1, wherein the method reduces the death of pancreatic islet cells in the subject.

* * * * *

SEQUENCE LISTING

```
Sequence total quantity: 61
SEQ ID NO: 1            moltype = AA  length = 615
FEATURE                 Location/Qualifiers
source                  1..615
                        mol_type = protein
                        organism = Homo sapiens
SEQUENCE: 1
MGLKAAQKTL FPLRSIDDVV RLFAAELGRE EPDLVLLSLV LGFVEHFLAV NRVIPTNVPE  60
LTFQPSPAPD PPGGLTYFPV ADLSIIAALY ARFTAQIRGA VDLSLYPREG GVSSRELVKK  120
VSDVIWNSLS RSYFKDRAHI QSLFSFITGW SPVGTKLDSS GVAFAVVGAC QALGLRDVHL  180
ALSEDHAWVV FGPNGEQTAE VTWHGKGNED RRGQTVNAGV AERSWLYLKG SYMRCDRKME  240
VAFMVCAINP SIDLHTDSLE LLQLQQKLLW LLYDLGHLER YPMALGNLAD LEELEPTPGR  300
PDPLTLYHKG IASAKTYYRD EHIYPYMYLA GYHCRNRNVR EALQAWADTA TVIQDYNYCR  360
EDEEIYKEFF EVANDVIPNL LKEAASLLEA GEERPGEQSQ GTQSQGSALQ DPECFAHLLR  420
FYDGICKWEE GSPTPVLHVG WATFLVQSLG RFEGQVRQKV RIVSREAEAA EAEEPWGEEA  480
REGRRRGPRR ESKPEEPPPP KKPALDKGLG TGQGAVSGPP RKPPGTVAGT ARGPEGGSTA  540
QVPAPTASPP PEGPVLTFQS EKMKGMKELL VATKINSSAI KLQLTAQSQV QMKKQKVSTP  600
SDYTLSFLKR QRKGL                                                 615

SEQ ID NO: 2            moltype = AA  length = 2446
FEATURE                 Location/Qualifiers
source                  1..2446
                        mol_type = protein
                        organism = Homo sapiens
SEQUENCE: 2
MDTGDTALGQ KATSRSGETD KASGRWRQEQ SAVIKMSTFG SHEGQRQPQI EPEQIGNTAS  60
AQLFGSGKLA SPSEVVQQVA EKQYPPHRPS PYSCQHSLSF PQHSLPQGVM HSTKPHQSLE  120
GPPWLFPGPL PSVASEDLFP FPIHGHSGGY PRKKISSLNP AYSQYSQKSI EQAEEAHKKE  180
HKPKKPGKYI CPYCSRACAK PSVLKKHIRS HTGERPYPCI PCGFSFKTKS NLYKHRKSHA  240
HAIKAGLVPF TESAVSKLDL EAGFIDVEAE IHSDGEQSTD TDEESSLFAE ASDKMSPGPP  300
IPLDIASRGG YHGSLEESLG GPMKVPILII PKSGIPLPNE SSQYIGPDML PNPSLNTKAD  360
DSHTVKQKLA LRLSEKKGQD SEPSLNLLSP HSKGSTDSGY FSRSESAEQQ ISPPNTNAKS  420
YEEIIFGKYC RLSPRNALSV TTTSQERAAM GRKGIMEPLP HVNTRLDVKM FEDPVSQLIP  480
SKGDVDPSQT SMLKSTKFNS ESRQPQIIPS SIRNEGKLYP ANFQGSNPVL LEAPVDSSPL  540
IRSNSVPTSS ATNLTIPPSL RGSHSFDERM TGSDDVFYPG TVGIPPQRML RRQAAFELPS  600
```

```
VQEGHVEVEH HGRMLKGISS SSLKEKKLSP GDRVGYDYDV CRKPYKKWED SETPKQNYRD    660
ISCLSSLKHG GEYFMDPVVP LQGVPSMFGT TCENRKRRKE KSVGDEEDTP MICSSIVSTP    720
VGIMASDYDP KLQMQEGVRS GFAMAGHENL SHGHTERFDP CRPQLQPGSP SLVSEESPSA    780
IDSDKMSDLG GRKPPGNVIS VIQHTNSLSR PNSFERSESA ELVACTQDKA PSPSETCDSE    840
ISEAPVSPEW APPGDGAESG GKPSPSQQVQ QQSYHTQPRL VRQHNIQVPE IRVTEEPDKP    900
EKEKEAQSKE PEKPVEEFQW PQRSETLSQL PAEKLPPKKK RLRLADMEHS SGESSFESTG    960
TGLSRSPSQE SNLSHSSSFS MSFEREETSK LSALPKQDEF GKHSEFLTVP AGSYSLSVPG   1020
HHHQKEMRRC SSEQMPCPHP AEVPEVRSKS FDYGNLSHAP VSGAAASTVS PSRERKKCFL   1080
VRQASFSGSP EISQGEVGMD QSVKQEQLEH LHAGLRSGWH HGPPAVLPPL QQEDPGKQVA   1140
GPCPPLSSGP LHLAQPQIMH MDSQESLRNP LIQPTSYMTS KHLPEQPHLF PHQETIPFSP   1200
IQNALFQFQY PTVCMVHLPA QQPPWWQAHF PHPFAQHPQK SYGKPSFQTE IHSSYPLEHV   1260
AEHTGKKPAE YAHTKEQTYP CYSGASGLHP KNLLPKFPSD QSSKSTETPS EQVLQEDFAS   1320
ANAGSLQSLP GTVVPVRIQT HVPSYGSVMY TSISQILGQN SPAIVICKVD ENMTQRTLVT   1380
NAAMQGIGFN IAQVLGQHAG LEKYPIWKAP QTLPLGLESS IPLCLPSTSD SVATLGGSKR   1440
MLSPASSLEL FMETKQQKRV KEEKMYGQIV EELSAVELTN SDIKKDLSRP QKPQLVRQGC   1500
ASEPKDGLQS GSSSFSSLSP SSSQDYPSVS PSSREPFLPS KEMLSGSRAP LPGQKSSGPS   1560
ESKESSDELD IDETASDMSM SPQSSSLPAG DGQLEEEGKG HKRPVGMLVR MASAPSGNVA   1620
DSTLLLTDMA DFQQILQFPS LRTTTTVSWC FLNYTKPNYV QQATFKSSVY ASWCISSCNP   1680
NPSGLNTKTT LALLRSKQKI TAEIYTLAAM HRPGTGKLTS SSAWKQFTQM KPDASFLFGS   1740
KLERKLVGNI LKERGKGDIH GDKDIGSKQT EPIRIKIFEG GYKSNEDYVY VRGRGRGKYI   1800
CEECGIRCKK PSMLKKHIRT HTDVRPYVCK LCNFAFKTKG NLTKHMKSKA HMKKCLELGV   1860
SMTSVDDTET EEAENLEDLH KAAEKHSMSS ISTDHQFSDA EESDGEDGDD NDDDDEDEDD   1920
FDDQGDLTPK TRSRSTSPQP PRFSSLPVNV GAVPHGVPSD SSLGHSSLIS YLVTLPSIRV   1980
TQLMTPSDSC EDTQMTEYQR LFQSKSTDSE PDKDRLDIPS CMDEECMLPS EPSSSPRDFS   2040
PSSHHSSPGY DSSPCRDNSP KRYLIPKGDL SPRRHLSPRR DLSPMRHLSP RKEAALRREM   2100
SQRDVSPRRH LSPRRPVSPG KDITARRDLS PRRERRYMTT IRAPSPRRAL YHNPPLSMGQ   2160
YLQAEPIVLG PPNLRRGLPQ VPYFSLYGDQ EGAYEHPGSS LFPEGPNDYV FSHLPLHSQQ   2220
QVRAPIPMVP VGGIQMVHSM PPALSSLHPS PTLPLPMEGF EEKKGASGES FSKDPYVLSK   2280
QHEKRGPHAL QSSGPPSTPS SPRLLMKQST SEDSLNATER EQEENIQTCT KAIASLRIAT   2340
EEAALLGPDQ PARVQEPHQN PLGSAHVSIR HFSRPEPGQP CTSATHPDLH DGEKDNFGTS   2400
QTPLAHSTFY SKSCVDDKQL DFHSSKELSS STEESKDPSS EKSQLH                  2446

SEQ ID NO: 3           moltype = AA  length = 342
FEATURE                Location/Qualifiers
source                 1..342
                       mol_type = protein
                       organism = Homo sapiens
SEQUENCE: 3
MAQVLIVGAG MTGSLCAALL RRQTSGPLYL AVWDKAEDSG GRMTTACSPH NPQCTADLGA     60
QYITCTPHYA KKHQRFYDEL LAYGVLRPLS SPIEGMVMKE GDCNFVAPQG ISSIIKHYLK    120
ESGAEVYFRH RVTQINLRDD KWEVSKQTGS PEQFDLIVLT MPVPEILQLQ GDITTLISEC    180
QRQQLEAVSY SSRYALGLFY EAGTKIDVPW AGQYITSNPC IRFVSIDNKK RNIESSEIGP    240
SLVIHTTVPF GVTYLEHSIE DVQELVFQQL ENILPGLPQP IATKCQKWRH SQVTNAAANC    300
PGQMTLHHKP FLACGGDGFT QSNFDGCITS ALCVLEALKN YI                       342

SEQ ID NO: 4           moltype = AA  length = 509
FEATURE                Location/Qualifiers
source                 1..509
                       mol_type = protein
                       organism = Homo sapiens
SEQUENCE: 4
MNNEEDLLQE DSTRDEGNET EANSMNTLRR TRKKVTKPYV CSTEVGETDM SNSNDCMRDS     60
SQILTPPQLS SRMKHIRQAM AKNRLQFVRF EATDLHGVSR SKTIPAHFFQ EKVSHGVCMP    120
RGYLEVIPNP KDNEMNNIRA TCFNSDIVLM PELSTFRVLP WADRTARVIC DTFTVTGEPL    180
LTSPRYIAKR QLSHLQASGF SLLSAFIYDF CIFGVPEILN SKIISFPALT FLNNHDQPFM    240
QELVDGLYHT GANVESFSSS TRPGQMEISF LPEFGISSAD NAFTLRTGVK EVARKYNYIA    300
SFFIETGFCD SGILSHSLWD VDRKKNMFCS TSGTEQLTIT GKKWLAGLLK HSAALSCLMA    360
PSVSCRKRYS KDRKDLKKSV PTTWGYNDNS CIFNIKCHGE KGTRIENKLG SATANPYLVL    420
AATVAAGLDG LHSSNEVLAG PDESTDFYQV EPSEIPLKLE DALVALEEDQ CLRQALGETF    480
IRYFVAMKKY ELENEEIAAE RNKFLEYFI                                      509

SEQ ID NO: 5           moltype = AA  length = 2671
FEATURE                Location/Qualifiers
source                 1..2671
                       mol_type = protein
                       organism = Homo sapiens
SEQUENCE: 5
MAADTQVSET LKRFAGKVTT ASVKERREIL SELGKCVAGK DLPEGAVKGL CKLFCLTLHR     60
YRDAASRRAL QAAIQQLAEA QPEATAKNLL HSLQSSGIGS KAGVPSKSSG SAALLALTWT    120
CLLVRIVFPS RAKRQGDIWN KLVEVQCLLL LEVLGGSHKH AVDGAVKKLT KLWKENPGLV    180
EQYLSAILSL EPNQNYAGML GLLVQFCTSH KEMDVVSQHK SALLDFYMKN ILMSKVKPPK    240
YLLDSCAPLL RYLSHSEFKD LILPTIQKSL LRSPENVIET ISSLLASVTL DLSQYAMDIV    300
KGLAGHLKSN SPRLMDEAVL ALRNLARQCS DSSAMESLTK HLFAILGGSE GKLTVVAQKM    360
SVLSGIGSVS HHVVSGPSSQ VLNGIVAELF IPFLQQEVHE GTLVHAVSVL ALWCNRFTME    420
VPKKLTEWFK KAFSLKTSTS AVRHAYLQCM LASYRGDTLL QALDLLPLLI QTVEKAASQS    480
TQVPTITEGV AAALLLLKLS VADSQAEAKL SSFWQLIVDE KKQVFTSEKF LVMASEDALC    540
TVLHLTERLF LDHPHRLTGN KVQQYHRALV AVLLSRTWHV RRQAQQVTRK LLSSLGGFKL    600
AHGLLEELKT VLSSHKVLPL EALVTDAGEV TEAGKAYVPP RVLQEALCVI SGVPGLKGDV    660
TDTEQLAQEM LIISHHPSLV AVQSGLWPAL LARMKIDPEA FITRHLDQII PRMTTQSPLN    720
```

```
QSSMNAMGSL SVLSPDRVLP QLISTITASV QNPALRLVTR EEFAIMQTPA GELYDKSIIQ    780
SAQQDSIKKA NMKRENKAYS FKEQIIELEL KEEIKKKKGI KEEVQLTSKQ KEMLQAQLDR    840
EAQVRRRLQE LDGELEAALG LLDIILAKNP SGLTQYIPVL VDSFLPLLKS PLAAPRIKNP    900
FLSLAACVMP SRLKALGTLV SHVTLRLLKP ECVLDKSWCQ EELSVAVKRA VMLLHTHTIT    960
SRVGKGEPGA APLSAPAFSL VFPFLKMVLT EMPHHSEEEE EWMAQILQIL TVQAQLRASP   1020
NTPPGRVDEN GPELLPRVAM LRLLTWVIGT GSPRLQVLAS DTLTTLCASS SGDDGCAFAE   1080
QEEVDVLLCA LQSPCASVRE TVLRGLMELH MVLPAPDTDE KNGLNLLRRL WVVKFDKEEE   1140
IRKLAERLWS MMGLDLQPDL CSLLIDDVIY HEAAVRQAGA EALSQAVARY QRQAAEVMGR   1200
LMEIYQEKLY RPPPVLDALG RVISESPPDQ WEARCGLALA LNKLSQYLDS SQVKPLFQFF   1260
VPDALNDRHP DVRKCMLDAA LATLNTHGKE NVNSLLPVFE EFLKNAPNDA SYDAVRQSVV   1320
VLMGSLAKHL DKSDPKVKPI VAKLIAALST PSQQVQESVA SCLPPLVPAI KEDAGGMIQR   1380
LMQQLLESDK YAERKGAAYG LAGLVKGLGI LSLKQQEMMA ALTDAIQDKK NFRRREGALF   1440
AFEMLCTMLG KLFEPYVVHV LPHLLLCFGD GNQYVREAAD DCAKAVMSNL SAHGVKLVLP   1500
SLLAALEEES WRTKAGSVEL LGAMAYCAPK QLSSCLPNIV PKLTEVLTDS HVKVQKAGQQ   1560
ALRQIGSVIR NPEILAIAPV LLDALTDPSR KTQKCLQTLL DTKFVHFIDA PSLALIMPIV   1620
QRAFQDRSTD TRKMAAQIIG NMYSLTDQKD LAPYLPSVTP GLKASLLDPV PEVRTVSAKA   1680
LGAMVKGMGE SCFEDLLPWL METLTYEQSS VDRSGAAQGL AEVMAGLGVE KLEKLMPEIV   1740
ATASKVDIAP HVRDGYIMMF NYLPITFGDK FTPYVGPIIP CILKALADEN EFVRDTALRA   1800
GQRVISMYAE TAIALLLPQL EQGLFDDLWR IRFSSVQLLG DLLFHISGVT GKMTTETASE   1860
DDNFGTAQSN KAIITALGVE RRNRVLAGLY MGRSDTQLVV RQASLHVWKI VVSNTPRTLR   1920
EILPTLFGLL LGFLASTCAD KRTIAARTLG DLVRKLGEKI LPEIIPILEE GLRSQKSDER   1980
QGVCIGLSEI MKSTSRDAVL YFSESLVPTA RKALCDPLEE VREAAAKTFE QLHSTIGHQA   2040
LEDILPFLLK QLDDEEVSEF ALDGLKQVMA IKSRVVLPYL VPKLTTPPVN TRVLAFLSSV   2100
AGDALTRHLG VILPAVMLAL KEKLGTPDEQ LEMANCQAVI LSVEDDTGHR IIIEYLLEAT   2160
RSPEVGMRQA AAIILNIYCS RSKADYTSHL RSLVSGLIRL FNDSSPVVLE ESWDALNAIT   2220
KKLDAGNQLA LIEELHKEIR LIGNESKGEH VPGFCLPKLG VTSILPVLRE GVLTGSPEQK   2280
EEAAKALGLV IRLTSADALR PSVVSITGPL IRILGDRFSW NVKAALLETL SLLLAKVGIA   2340
LKPFLPQLQT TFTKALQDSN RGVRLKAADA LGKLISIHIK VDPLFTELLN GIRAMEDPGV   2400
RDTMLQALRF VIQGAGAKVD AVIRKNIVSL LLSMLGHDED NTRISSAGCL GELCAFLTEE   2460
ELSAVLQQCL LADVSGIDWM VRHGRSLALS VAVNVAPGRL CAGRYSSDVQ EMILSSATAD   2520
RIPIAVSGVR GMGFLMRHHI ETGGGQLPAK LSSLFVKCLQ NPSSDIRLVA EKMIWWANKD   2580
PLPPPLDPQAI KPILKALLDN TKDKNTVVRA YSDQAIVNLL KMRQGEEVFQ SLSKILDVAS   2640
LEVLNEVNRR SLKKLASQAD STEQVDDTIL T                                 2671

SEQ ID NO: 6          moltype = AA   length = 1357
FEATURE               Location/Qualifiers
source                1..1357
                      mol_type = protein
                      organism = Homo sapiens
SEQUENCE: 6
MQTLGSFFGS LPGFSSARNL VANAHSSARA RPAADPTGAP AAEEAAQPQAQ VAAHPEQTAP    60
WTEKELQPSE KQMVSGAKDL VCSKMSRAKD AVSSGVASVV DVAKGVVQGG LDTTRSALTG   120
TKEVVSSGVT GAMDMAKGAV QGGLDTSKAV LTGTKDTVST GLTGAVNVAK GTVQAGVDTT   180
KTVLTGTKDT VTTGVMGAVN LAKGTVQGTV ETSKAVLTGT KDAVSTGLTG AVNVARGSIQ   240
TGVDTSKTVL TGTKDTVCSG VTGAMNVAKG TIQTGVDTSK TVLTGTKDTV CSGVTGAMNV   300
AKGTIQTGVD TSKTVLTGTK DTVCSGVTGA MNVAKGTIQT GVDTTKTVLT GTKNTVCSGV   360
TGAVNLAKEA IQGGLDTTKS MVMGTKDTMS TGLTGAANVA KGAMQTGLNT TQNIATGTKD   420
TVCSGVTGAM NLARGTIQTG VDTTKIVLTG TKDTVCSGVT GAANVAKGAV QGGLDTTKSV   480
LTGTKDAVST GLTGAVNVAK GTVQTGVDTT KTVLTGTKDT VCSGVTSAVN VAKGAVQGGL   540
DTTKSVVIGT KDTMSTGLTG AANVAKGAVQ TGVDTAKTVL TGTKDTVTTG LVGAVNVAKG   600
TVQTGMDTTK TVLTGTKDTI YSGVTVSAVN AKGAVQGTLK TTQNIATGTK NTFGSGVTGA   660
VNQAKGAAQT GVDTAKTVLT GTKDTVTTGL MGAVNVAKGT VQTSVDTTKT VLTGTKDTVC   720
SGVTGAANVA KGAIQGGLDT TKSVLTGTKD AVSTGLTGAV KLAKGTVQTG MDTTKTVLTG   780
TKDAVCSGVT GAANVAKGAV QMGVDTAKTV LTGTKDTVCS GVTGAANVAK GAVQTGLKTT   840
QNIATGTKNT LGSGVTGAAK VAKGAVQGGL DTTKSVLTGT KDAVSTGLTG AVNLAKGTVQ   900
TGVDTSKTVL TGTKDTVCSG VTGAVNAKG TVQTGVDTAK TVLSGAKDAV TTGVTGAVNV   960
AKGTVQTGVD ASKAVLMGTK DTVFSGVTGA MSMAKGAVQG GLDTTKTVLT GTKDAVSAGL  1020
MGSGNVATGA THTGLSTFQN WLPSTPATSW GGLTSSRTTD NGGEQTALSP QEAPFSGIST  1080
PPDVLSVGPE PAWEAAATTK GLATDVATFT QGAAPGREDT GLLATTHGPE EAPRLAMLQN  1140
ELEGLGDIFH PMNAEEQAQL AASQPGPKVL SAEQGSYFVR LGDLGPSFRQ RAFEHAVSHL  1200
QHGQFQARDT LAQLQDCFRL IEKAQQAPEG QPRLDQGSGA SAEDAAVQEE RDAGVLSRVC  1260
GLLRQLHTAY SGLVSSLQGL PAELQQPVGR ARHSLCELYG IVASAGSVEE LPAERLVQSR  1320
EGVHQAWQGL EQLLEGLQHN PPLSWLVGPF ALPAGGQ                          1357

SEQ ID NO: 7          moltype = AA   length = 117
FEATURE               Location/Qualifiers
source                1..117
                      mol_type = protein
                      organism = Homo sapiens
SEQUENCE: 7
MATYSLANER LRALEDIERE IGAILQNAGT VILELSKEKT NERLLDRQAA AFTASVQHVE    60
AELSAQIRYL TQVATGQPHE GSSYSSRKDC QMALKRVDYA RLKLSDVART CEQMLEN     117

SEQ ID NO: 8          moltype = AA   length = 706
FEATURE               Location/Qualifiers
source                1..706
                      mol_type = protein
                      organism = Homo sapiens
SEQUENCE: 8
```

```
MAGIRVTKVD WQRSRNGAAH HTQEYPCPEL VVRRGQSFSL TLELSRALDC EEILIFTMET    60
GPRASEALHT KAVFQTSELE RGEGWTAARE AQMEKTLTVS LASPPSAVIG RYLLSIRLSS   120
HRKHSNRRLG EFVLLFNPWC AEDDVFLASE EERQEYVLSD SGIIFRGVEK HIRAQGWNYG   180
QFEEDILNIC LSIILDRSPGH QNNPATDVSC RHNPIYVTRV ISAMVNSNND RGVVQGQWQG   240
KYGGGTSPLH WRGSVAILQK WLKGRYKPVK YGQCWVFAGV LCTVLRCLGI ATRVVSNFNS   300
AHDTDQNLSV DKYVDSFGRT LEDLTEDSMW NFHVWNESWF ARQDLGPSYN GWQVLDATPQ   360
EESEGVFRCG PASVTAIREG DVHLAHDGPF VFAEVNADYI TWLWHEDESR ERVYSNTKKI   420
GRCISTKAVG SDSRVDITDL YKYPEGSRKE RQVYSKAVNR LFGVEASGRR IWIRRAGGRC   480
LWRDDLLEPA TKPSIAGKFK VLEPPMLGHD LRLALCLANL TSRAQRVRVN LSGATILYTR   540
KPVAEILHES HAVRLGPQEE KRIPITISYS KYKEDLTEDK KILLAAMCLV TKGEKLLVEK   600
DITLEDFITI KVLGPAMVGV AVTVEVTVVN PLIERVKDCA LMVEGSGLLQ EQLSIDVPTL   660
EPQERASVQF DITPSKSGPR QLQVDLVSPH FPDIKGFVIV HVATAK                 706

SEQ ID NO: 9           moltype = AA   length = 234
FEATURE                Location/Qualifiers
source                 1..234
                       mol_type = protein
                       organism = Homo sapiens
SEQUENCE: 9
MRSGEPACTM DQARGLDDAA ARGGQCPGLG PAPTPTPPGR LGAPYSEAWG YFHLAPGRPG    60
HPSGHWATCR LCGEQVGRGP GFHAGTSALW RHLRSAHRRE LESSGAGSSP PAAPCPPPPG   120
PAAAPEGDWA RLLEQMGALA VRGSRREREL ERRELAVEQG ERALERRRRA LQEEERAAAQ   180
ARRELQAERE ALQARLRDVS RREGALGWAP AAPPPLKDDP EGDRDGCVIT KVLL         234

SEQ ID NO: 10          moltype = AA   length = 872
FEATURE                Location/Qualifiers
source                 1..872
                       mol_type = protein
                       organism = Homo sapiens
SEQUENCE: 10
MGSLLALLAL LLLWGAVAEG PAKKVLTLEG DLVLGGLFPV HQKGGPAEDC GPVNEHRGIQ    60
RLEAMLFALD RINRDPHLLP GVRLGAHILD SCSKDTHALE QALDFVRASL SRGADGSRHI   120
CPDGSYATHG DAPTAITGVI GGSYSDVSIQ VANLLRLFQI PQISYASTSA KLSDKSRYDY   180
FARTVPPDFF QAKAMAEILR FFNWTYVSTV ASEGDYGETG IEAFELEARA RNICVATSEK   240
VGRAMSRAAF EGVVRALLQK PSARVAVLFT RSEDARELLA ASQRLNASFT WVASDGWGAL   300
ESVVAGSEGA AEGAITIELA SYPISDFASY FQSLDPWNNS RNPWFREFWE QRFRCSFRQR   360
DCAAHSLRAV PFEQESKIMF VVNAVYAMAH ALHNMHRALC PNTTRLCDAM RPVNGRRLYK   420
DFVLNVKFDA PFRPADTHNE VRFDRFGDGI GRYNIFTYLR AGSGRYRYQK VGYWAEGLTL   480
DTSLIPWASP SAGPLPASRC SEPCLQNEVK SVQPGEVCCW LCIPCQPYEY RLDEFTCADC   540
GLGYWPNASL TGCFELPQEY IRWGDAWAVG PVTIACLGAL ATLFVLGVFV RHNATPVVKA   600
SGRELCYILL GGVFLCYCMT FIFIAKPSTA VCTLRRLGLG TAFSVCYSAL LTKTNRIARI   660
FGGAREGAQR PRFISPASQV AICLALISGQ LLIVAWLVV EAPGTGKETA PERREVVTLR   720
CNHRDASMLG SLAYNVLLIA LCTLYAFKTR KCPENFNEAK FIGFTMYTTC IIWLAFLPIF   780
YVTSSDYRVQ TTTMCVSVSL SGSVVLGCLF APKLHIILFQ PQKNVVSHRA PTSRFGSAAA   840
RASSSLGQGS GSQFVPTVCN GREVVDSTTS SL                                872

SEQ ID NO: 11          moltype = AA   length = 611
FEATURE                Location/Qualifiers
source                 1..611
                       mol_type = protein
                       organism = Mus musculus
SEQUENCE: 11
MGLKAAQKTL FPLRSIDDVV RLFAAELGRE EPDLVLLSLV LGFVEHFLAV NRVIPTNVPE    60
LTFQPSPAPD PPGGLTYFPV ADLSIIAALY ARFTAQIRGA VDLSLYPREG GVSSRELVKK   120
VSDVIWNSLS RSYFKDRAHI QSLFSFITGT KLDSSGVAPA VVWGACQALGL RDVHLALSED   180
HAWVVFGPNG EQTAEVTWHG KGNEDRRGQT VNAGVAERSW LYLKGSYMRC DRKMEVAFMV   240
CAINPSIDLH TDSLELLQLQ QKLLWLLYDL GHLERYPMAL GNLADLEELE PTPGRPDPLT   300
LYHKGIASAK TYYQDEHIYP YMYLAGYHCR NRNVREALQA WADTATVIQD YNYCREDEEI   360
YKEFFEVAND VIPNLLKEAA SLLETGEERT GEQAQGTQGQ SALQDPECF AHLLRFYDGI   420
CKWEEGSPTP VLHVGWATFL VQSLGRFEGQ VRQKVHIVSR EAEAAEAEEP WGDEAREGRR   480
RGPRRESKPE EPPPPKKPAL DKGPGSGQSA GSGPPRKTSG TVPGTTRGGQ EVGNAAQAPA   540
PAASPPPEGP VLTFQSEKMK GMKELLVATK INSSAIKLQL TAQSQVQMKK QKVSTPSDYT   600
LSFLKRQRKG L                                                       611

SEQ ID NO: 12          moltype = AA   length = 2430
FEATURE                Location/Qualifiers
source                 1..2430
                       mol_type = protein
                       organism = Mus musculus
SEQUENCE: 12
MDTGDTALGQ KATSRSGETD SVSGRWRQEQ SAVLKMSTFS SQEGPRPQPQI DPEQIGNAAS    60
AQLFGSGKLA SPGEGLHQVT EKQYPPHRPS PYPCQHSLSF PQHSLSQGMT HSHKPHQSLE   120
GPPWLFPGPL PSVASEDLFP FPMHGHSGGY PRKKISNLNP AYSQYSQKSI EQAEDAHKKE   180
HKPKKPGKYI CPYCSRACAK PSVLKKHIRS HTGERPYPCI PCGFSFKTKS NLYKHRKSHA   240
HAIKAGLVPF TESSVSKLDL EAGFIDVEAE IHSDGEQSTD TDEESSLFAE ASDKVSPGPP   300
VPLDIASRGG YHGSLEESLG GPMKVPILII PKSGIPLASE GSQYLSSEML PNPSLNAKAD   360
DSHTVKQKLA LRLSEKKGQD SEPSLNLLSP HSKGSTDSGY FSRSESAEQQ ISPPNTNAKS   420
YEEIIFGKYC RLSPRNTLSV TPTGQERTAM GRRGIMEPLP HLNTRLEVKM FEDPISQLNP   480
SKGEMDPGQI NMLKTTKFNS ECRQPQAIPS SVRNEGKPYP GNFLGSNPML LEAPVDSSPL   540
```

```
IRSNSMPTSS ATNLSVPPSL RGSHSFDERM TGSDDVFYPG TVGIPPQRML RRQAAFELPS      600
VQEGHMESEH PARVSKGLAS PSLKEKKLLP GDRPGYDYDV CRKPYKKWED SETLKQSYLG      660
SFKQGGEYFM DPSVPVQGVP TMFGTTCENR KRRKEKSVGD EEDVPMICGG MGNAPVGMMS      720
SEYDPKLQDG GRSGFAMTAH ESLAHGHSDR LDPARPQLPS RSPSLGSEDL PLAADPDKMT      780
DLGKKPPGNV ISVIQHTNSL SRPNSFERSE STEMVACPQD KTPSPAETCD SEVLEAPVSP      840
EWAPPGDGGE SGSKPTPSQQ VPQHSYHAQP RLVRQHNIQV PEIRVTEEPD KPEKEKEAPT      900
KEPEKPVEEF QWPQRSETLS QLPAEKLPPK KKRLRLADLE HSSGESSFES TGTGLSRSPS      960
QESNLSHSSS FSMSFDREET VKLTAPPKQD ESGKHSEFLT VPAGSYSLSV PGHHHQKEMR     1020
RCSSEQMPCP HPTEVPEIRS KSFDYGNLSH APVAGTSPST LSPSRERKKC FLVRQASFSG     1080
SPEIAQGEAG VDPSVKQEHM EHLHAGLRAA WSSVLPPLPG DDPGKQVGTC GPLSSGPPLH     1140
LTQQQIMHMD SQESLRNPLI QPTSYMTSKH LPEQPHLFPH QDAVPFSPIQ NALFQFQYPT     1200
VCMVHLPAQQ PPWWQTHFPH PFAPHPQNSY SKPPFQADLH SSYPLEHVAE HTGKKSADYP     1260
HAKEQTYPCY SGTSGLHSKN LPLKFPSDPG SKSTETPTEQ LLREDFASEN AGPLQSLPGT     1320
VVPVRIQTHV PSYGSVMYTS ISQILGQNSP AIVICKVDEN MTQRTLVTNA AMQGIGLNIA     1380
QVLGQHTGLE KYPLWKVPQT LPLGLESSIP LCLPSTSDNA ASLGGSKRML SPASSLELFM     1440
ETKQQKRVKE EKMYGQIVEE LSAVELTNSD IKKGLSRPQK PQLVRQGCAS EPKDGCFQSR     1500
SSSFSSLSPS SSQDHPSASG PFPPNREILP GSRAPPRRKF SGPSESRESS DELDMDETSS     1560
DMSMSPQSSA LPTGGGQQEE EGKARKLPVS MLVHMASGPG GNVANSTLLF TDVADFQQIL     1620
QFPSLRTTTT VSWCFLNYTK PSFVQQATFK SSVYASWCIS SCNPNPSGLN TKTTLALLRS     1680
KQKITAEIYT LAAMHRPGAG KLTSSSVWKQ FAQMKPDAPF LFGNKLERKL AGNVLKERGK     1740
GEIHGDKDLG SKQTEPIRIK IFEGGYKSNE DYVYVRGRGR GKYICEECGI RCKKPSMLKK     1800
HIRTHTDVRP YVCKLCNFAF KTKGNLTKHM KSKAHMKCKL ELGVSMTSVD DTETEEAENN     1860
EELHKTSEKH SMSGISTDHQ FSDAEESDGE DGDNDDDDE DDDDFDDQGD LTPKTRSRST      1920
SPQPPRFSSL PVNVGAVAHG VPSDSSLGHS SLISYLVTLP SIQVTQLMTP SDSCDDTQMT     1980
EYQRLFQSKS TDSEPDKDRL DIPSSMDEEA MLSSEPSSSP RDFSPSSYRS SPGYDSSPCR     2040
DNSPKRYLIP KGDLSPRRHL SPRRDLSPMR HLSPRKEAAL RREMSQGDAS PRRHLSPRRP     2100
LSPGKDITAR RDLSPRRERR YMTTIRAPSP RRALYPNPPL SMGQYLQTEP IVLGPPNLRR     2160
GIPQVPYFSL YGDQEGAYEH HGSSLFPEGP TDYVFSHLPL HSQQQVRAPI PMVPVGGIQM     2220
VHSLPPALSG LHPPPTLPLP TEGSEEKKGA PGEAFAKDPY ILSRRHEKQA PQVLQSSGLP     2280
SSPSSPRLLM KQSTSEDSLN STEREQEENI QTCTKAIASL RIATEEAALL GADPPTWVQE     2340
SPQKPLESAH VSIRHFGGPE PGQPCTSAAH PDLHDGEKDT FGTSQTAVAH PTFYSKSSVD     2400
EKRVDFQSSK ELSLSTEEGN EPSPEKNQLH                                     2430

SEQ ID NO: 13           moltype = AA   length = 342
FEATURE                 Location/Qualifiers
source                  1..342
                        mol_type = protein
                        organism = Mus musculus
SEQUENCE: 13
MSRVLVVGAG LTGSLCAALL RKEITAPLYL GLWDKGGDIG GRMITASSPH NPRCTADLGA       60
QYITCSPHYV KEHQNFYEEL LAHGILKPLT SPIEGMKGKE GDCNFVAPQG FSSVIKYYLK      120
KSGAEVSLKH CVTQIHLKDN KWEVSTDTGS AEQFDLVILT MPAPQILELQ GDIVNLISER      180
QREQLKSVSY SSRYALGLFY EVGMKIGVPW SCRYLSSHPC ICFISIDNKK RNIESSECGP      240
SVVIQTTVPF GVQHLEASEA DVQKLMIQQL ETILPGLPQP VATICHKWTY SQVTSSVSDR      300
PGQMTLHLKP FLVCGGDGFT HSNFNGCISS ALSVMKVLKR YI                         342

SEQ ID NO: 14           moltype = AA   length = 563
FEATURE                 Location/Qualifiers
source                  1..563
                        mol_type = protein
                        organism = Mus musculus
SEQUENCE: 14
MTDEGDLAQE DTAKDEGNVT EGSRMSKLRR ARRKVTKPHL CSMDGEEIAK ANSSEMSRNQ       60
IADLSKPGSA ESWSSHSAKD AYHPTPVVKP SLPSALAGAP DAEFSPNTDP TRYNAQSFNP      120
PQLSARMKHI KQEMAKNHLQ FVRFEATDLH GVSRSKSIPA QFFQEKVIHG VFMPRGYLEL      180
MPNPKDNEVN HIRATCFNSD IVLMPELSTF RVLPWAERTA RVICDTFTVT GEPLLTSPRY      240
IAKRQLRQLQ DAGFCLLSAF IYDFCIFGVP EVINSKTISF PASTLLSNHD QPFMQELVEG      300
LYQTGANVES FSSSTRPGQM EICFLPEFGI SSADNAFTLR TGLQEVARRY NYIASLVIET      360
GFCNSGILSH SIWDVGGKTN MFCSGSGVER LTLTGKKWAL GLLKHSAALS CLMAPAVNCR      420
KRYCKDSRDL KDSVPTTWGY NDNSCALNIK CHGEKGTQIE NKLGSATANP YLVLAATVAA      480
GLDGLQSSDG AAAGSDESQD LYQPEPSEIP LKMEDALAAL EQDECLKQAL GETFIRYFVA      540
MKKYELENEE TDAEGNKFLE YFI                                              563

SEQ ID NO: 15           moltype = AA   length = 2671
FEATURE                 Location/Qualifiers
source                  1..2671
                        mol_type = protein
                        organism = Mus musculus
SEQUENCE: 15
MAADTQVSET LKRFAVKVTT ASVKERREIL SELGRCIAGK DLPEGAVKGL CKLFCLTLHR       60
YRDAASRRAL QAAIQQLAEA QPEATAKNLL HSLQSSGVGS KACVPSKSSG SAALLALTWT      120
CLLVRIVFPL KAKRQGDIWN KLVEVQCLLL LEVLGGSHKH AVDGAVKKLT KLWKENPGLV      180
EQYFSAILSL EPSQNYAAML GLLVQFCTNH KEMDAVSQHK STLLEFYVKN ILMSKAKPPK      240
EAPLL RFMSHSEFKD LILPTIQKSL LRSPENVIET ISSLLASVTL DLSQYALDIV           300
KGLANQLKSN SPRLMDEAVL ALRNLARQCS DSSATEALTK HLFAILGGSE GKLTIIAQKM      360
SVLSGIGSLS HHVVSGPSGQ VLNGCVAELF IPFLQQEVHE GTLVHAVSIL ALWCNRFTTE      420
VPKKLTDWFK KVFSLKTSTS AVRHAYLQCM LASFRGDTLL QALDFLPLLM QTVEKAASQG      480
TQVPTVTEGV AAALLLSKLS VADAQAEAKL SGFWQLVVDE KRQTFTSEKF LLLASEDALC      540
TVLRLTERLF LDHPHRLTNS KVQQYYRVLV AVLLSRTWHV RRQAQQVTRK LLSSLGGVKL      600
```

```
                                                      -continued
ANGLLDELKT VLNSHKVLPL EALVTDAGEV TEMGKTYVPP RVLQEALCVI SGVPGLKGDI    660
PSTEQLAQEM LIISHHPSLV AVQSGLWPAL LTRMKIDPDA FITRHLDQII PRITTQSPLN    720
QSSMNAMGSL SVLSPDRVLP QLISTITASV QNPALCLVTR EEFSIMQTPA GELFDKSIIQ    780
SAQQDSIKKA NMKRENKAYS FKEQIIEMEL KEEIKKKKGI KEEVQLTSKQ KEMLQAQMDK    840
EAQIRRRLQE LDGELEAALG LLDAIMARNP CGLIQYIPVL VDAFLPLLKS PLAAPRVKGP    900
FLSLAACVMP PRLKTLGTLV SHVTLRLLKP ECALDKSWCQ EELPVAVRRA VSLLHTHTIP    960
SRVGKGEPDA APLSAPAFSL VFPMLKMVLT EMPYHSEEEE EQMAQILQIL TVHAQLRASP   1020
DTPPERVDEN GPELLPRVAM LRLLTWVIGT GSPRLQVLAS DTLTALCASS SGEDGCAFAE   1080
QEEVDVLLAA LQSPCASVRE TALRGLMELR LVLPSPDTDE KSGLSLLRRL WVIKFDKEDE   1140
IRKLAERLWS TMGLDLQSDL CSLLIDDVIY HEAAVRQAGA EALSQAVARY QRQAAEVMGR   1200
LMEIYQEKLY RPPPVLDALG RVISESPPDQ WEARCGLALA LNKLSQYLDS SQVKPLFQFF   1260
VPDALNDRNP DVRKCMLDAA LATLNAHGKE NVNSLLPVFE EFLKDAPNDA SYDAVRQSVV   1320
VLMGSLAKHL DKSDPKVKPI VAKLIAALST PSQQVQESVA SCLPPLVPAV KEDAGGMIQR   1380
LMQQLLESDK YAERKGAAYG LAGLVKGLGI LSLKQQEMMA ALTDAIQDKK NFRRREGALF   1440
AFEMLCTMLG KLFEPYVVHV LPHLLLCFGD GNQYVREAAD DCAKAVMSNL SAHGVKLVLP   1500
SLLAALEEES WRTKAGSVEL LGAMAYCAPK QLSSCLPNIV PKLTEVLTDS HVKVQKAGQQ   1560
ALRQIGSVIR NPEILAIAPV LLDALTDPSR KTQKCLQTLL DTKFVHFIDA PSLALIMPIV   1620
QRAFQDRSTD TRKMAAQIIG NMYSLTDQKD LAPYLPSVTP GLKASLLDPV PEVRTVSAKA   1680
LGAMVKGMGE SCFEDLLPWL METLTYEQSS VDRSGAAQGL AEVMAGLGVE KLEKLMPEIV   1740
ATASKVDIAP HVRDGYIMMF NYLPITFGDK FTPYVGPIIP CILKALADEN EFVRDTALRA   1800
GQRVISMYAE TAIALLLPQL EQGLFDDLWR IRFSSVQLLG DLLFHISGVT GKMTTETASE   1860
DDNFGTAQSN KAIITALGVD RRNRVLAGLY MGRSDTQLVR RQASLHVWKI VVSNTPRTLR   1920
EILPTLFGLL LGFLASTCAD KRTIAARTLG DLVRKLGEKI LPEIIPILEE GLRSQKSDER   1980
QGVCIGLSEI MKSTSRDAVL FFSESLVPTA RKALCDPLEE VREAAAKTFE QLHSTIGHQA   2040
LEDILPFLLK QLDDEEVSEF ALDGLKQVMA VKSRVVLPYL VPKLTTPPVN TRVLAFLSSV   2100
AGDALTRHLG VILPAVMLAL KEKLGTPDEQ LEMANCQAVI LSVEDDTGHR IIIEDLLEAT   2160
RSPEVGMRQA AAIILNMYCS RSKADYSSHL RSLVSGLIRL FNDSSPVVLE ESWDALNAIT   2220
KKLDAGNQLA LIEELHKEIR FIGNECKGEH VPGFCLPKRG VTSILPVLRE GVLTGSPEQK   2280
EEAAKGLGLV IRLTSADALR PSVVSITGPL IRILGDRFNW TVKAALLETL SLLLGKVGIA   2340
LKPFLPQLQT TFTKALQDSN RGVRLKAADA LGKLISIHVK VDPLFTELLN GIRAVEDPGI   2400
RDTMLQALRF VIQGASKVD AAIRKNLVSL LLSMLGHDED NTRISTAGCL GELCAFLTDE    2460
ELNTVLQQCL LADVSGIDWM VRHGRSLALS VAVNVAPSRL CAGRYSNEVQ DMILSNAVAD   2520
RIPIAMSGIR GMGFLMKYHI ETGSGQLPPR LSSLLIKCLQ NPCSDIRLVA EKMIWWANKE   2580
PRPPLEPQTI KPILKALLDN TKDKNTVVRA YSDQAIVNLL KMRRGEELLQ SLSKILDVAS   2640
LEALNECSRR SLRKLACQAD SVEQVDDTIL T                                 2671

SEQ ID NO: 16           moltype = AA   length = 1403
FEATURE                 Location/Qualifiers
source                  1..1403
                        mol_type = protein
                        organism = Mus musculus
SEQUENCE: 16
MSASGDGTRV PPKSKGKTLS SFFGSLPGFS SARNLVSHTH SSTSTKDLQT ATDPSGTPAP     60
SSKVSTNSQM AGDAAGLLQP SEQTAGDKDM GSFSVTSSED AFSGVFGIMD AAKGMVQGGL    120
GATQSALVGT KEAVSGGVMG AVGVAKGLVK GGLDTSKNVL TNTKDTVTTG VMGAANMAKG    180
TVQTGLDTTK SVVMGTKDTV ATGLAGAVNV AKGTIQGGLD TTKSVVMGTK DTVTTGLTGA    240
VNVAKGVVQG GLDTTKSVVM GTKDTVTTGL TGAMNVAKGT AQMGIDTSKT VLTGTKDTVC    300
AGATGAINVA KGAAQGGLDT TKSVLIGTKD TVTTGLTGAV NVAKGAVQGG LDTTKSVVMG    360
TKDTVTTGLT GAMNVAKGTA QMGLGTSKTV LTGTKDTVCA GLTGAINVAK GAAQGGLDTT    420
KSVLMGTKDT VTTGLTGAVN VAKGTIQGGL DTTKSVVMGT KDTVTTGLTG AVNVAKGTIQ    480
GGLDTTKSVV MGTKDTVTTG LTGAVNVAKG AAQGGLDTTK SVVMGTKDTV TTGLTGAVNV    540
AKGTAQMGLG TSKTVLTGTK DTVCAGLTGA INVAKGAAQG GLDTTKSVLM GTKDTVTTGL    600
TGAVNVAKGT IQGGLDTTKS VVMGTKDTVT TGLTGAVNVA KGAVQGGLDT TKSVVMGTKD    660
TVTTGLTGAL NVAKGTAQMG IDTSKTVLIG TKDTVCAGAT GAINMAKGAA QGGLDTTKSV    720
LMGTKDTVTT GLTGAINVAK GSAQGGLDTT KSVLIGTKDT VTTGLTGALN VAKGTVQTGL    780
DTSQRVLTGT KDNVYAGVTG AVNVAKGTIQ GGLDTTKSVV MGTKDTVTTG LTGAVNVAKG    840
AVQGGLDTTK SVVMGTKDTV TTGLTGAMNV AKGTAQMGID TSKTVLTGTK DTVCAGLTGA    900
INVAKGATQG GLDTTKSVLM GTKDTVTTGL TGAINVAKGA AQGGLDTTKS VLLGTKDTVT    960
TGLTGAANVA KETVQGMGLDT SKNILMDTKD SICAGATGAI TVVKGAAQGG LDTSNAALTG   1020
TMDTAKGTVQ TSLDTSKHML IGMKDTVCAG VTSAMNMAKG IHKNTDTTRD TQSSVLAHSG   1080
NVATNAIHTG VHTVPSSLSG SHSIICHEPS IYRATNHGVG QAILTSTESL CCETSSFSDK   1140
YGLGHVTEPR ADTKTLVSGM ASSACAATRS VEECGQLAAT GFAALPDELK GLGDIFQPMT   1200
TEEQAQLAVS ESGPRVLSAD RGSYYIRLGD LAPSFRQRAF EHALSHIQHN QFQARAALAQ   1260
LQEAFQMTDM TMEAACGKLC SDQSLNTMVE AVGSHEMRAS VAQDRLCTLA HQLHAAYSSL   1320
VTSLQGLPEV QQQAGQARHS LCKLYGLVSS EAGSELQTEQ LAQSSAGVVE AWQGLEVLLE   1380
KLQQNPPLSW LVGPFTSMPC GQL                                         1403

SEQ ID NO: 17           moltype = AA   length = 115
FEATURE                 Location/Qualifiers
source                  1..115
                        mol_type = protein
                        organism = Mus musculus
SEQUENCE: 17
MDPQTQNTSL QRLQNVENRV VKVLELAGGV MEELASPSGP KKEFVNSHCR EFMQSMKDIQ     60
VTLREEIKSA CEYRPFEKCD YNARIANEIC FQKLEYVLTQ LEDLKQTADR YPSSD           115

SEQ ID NO: 18           moltype = AA   length = 483
FEATURE                 Location/Qualifiers
source                  1..483
```

|  |  |  |
|---|---|---|
| | mol_type = protein | |
| | organism = Mus musculus | |
| SEQUENCE: 18 | | |
| MVNSNNDRGV VQGQWQGKYG GGTNPLNWRG SVAILQKWFK GRYKPVKYGQ CWVFAGVMCT | | 60 |
| VLRCLGIATR VVSNFNSAHD TDGNLSVDKY VDSYGRTLED LTEDSMWNFH VWNESWFARQ | | 120 |
| DLGPSYDGWQ VLDATPQEES EGMFRCGPAS VTAIREGDVH LAHDGPFVFA EVNADYITWL | | 180 |
| WHEDKRRERV YSDTKKIGRC ISTKAVGSDS RVDITGLYKY PEGSRKERQV YSKAVKKLLS | | 240 |
| VEAWGRRRRI RRASVRGVWR DDLLEPVTKP SITGKFKVLE PPVLGQDKL ALCLTNLTAR | | 300 |
| AQRVRVNVSG ATILYTRKPV AEILRESHTV KLGPLEEKKI PVTISYSQYK GDLTEDKKIL | | 360 |
| LAAMCLVSKG EKLLVEKDIT LEDFITIKVL GPAVVGVTVT VEVLVINPLS ESVKDCVLMV | | 420 |
| EGSGLLQGQL SIEVPSLQPQ EKALIQFNIT PSKSGPRQLQ VDLVSSQFPD IKGFVIIHVA | | 480 |
| TAK | | 483 |
| | | |
| SEQ ID NO: 19 | moltype = AA   length = 228 | |
| FEATURE | Location/Qualifiers | |
| source | 1..228 | |
| | mol_type = protein | |
| | organism = Mus musculus | |
| SEQUENCE: 19 | | |
| MKSKKPLKIT MEDSRRLNDP AEQGGLCPAP VGPSYSEAWG YFHLDPAQPR HRMMSAWATC | | 60 |
| RLCGLQVGGL PNFQMWTRAL CQHLSDVHLP ELKKSAAPSS PTTMPCPPPP SPTMAAEGDW | | 120 |
| ARLLEQMGEL AMRGSQRELE LERREAALMQ AELELERKRQ ALKQEAQSVE QERHQLQVER | | 180 |
| EALSKWIKKQ SPGAQVPEPP SPLPLLPKED PDIHDNNSDN DMVTKVLL | | 228 |
| | | |
| SEQ ID NO: 20 | moltype = AA   length = 872 | |
| FEATURE | Location/Qualifiers | |
| source | 1..872 | |
| | mol_type = protein | |
| | organism = Mus musculus | |
| SEQUENCE: 20 | | |
| MESLLRFLAL LLLRGAVAEG PAKKVLTLEG DLVLGGLFPV HQKGGPAEEC GPVNEHRGIQ | | 60 |
| RLEAMLFALD RINRDPHLLP GVRLGAHILD SCSKDTHALE QALDFVRASL SRGADGSRHI | | 120 |
| CPDGSYATLS DAPTAITGVI GGSYSDVSIQ VANLLRLFQI PQISYASTSA KLSDKSRYDY | | 180 |
| FARTVPPDFF QAKAMAEILR FFNWTYVSTV ASEGDYGETG IEAFELEARA RNICVATSEK | | 240 |
| VGRAMSRAAF EGVVRALLQK PSARVAVLFT RSEDARELLA ATQRLNASFT WVASDGWGAL | | 300 |
| ESVVAGSERA AEGAITIELA SYPISDFASY FQNLDPWNNS RNPWFREFWE ERFRCSFRQR | | 360 |
| DCAAHSLRAV PFEQESKIMF VVNAVYAMAH ALHNMHRALC PNTTRLCDAM RPVNGRRLYK | | 420 |
| DFVLNVKFDA PFRPADTDDE VRFDRFGDGI GRYNIFTYLR AGNGRYRYQK VGYWAEGLTL | | 480 |
| DTSIIPWASP SAGTLPASRC SEPCLQNEVK SVQPGEVCCW LCIPCQPYEY RLDEFTCADC | | 540 |
| GLGYWPNASL TGCFELPQEY IRWGDAWAVG PVTIACLGAL ATLFVLGFV RHNATPVVKA | | 600 |
| SGRELCYILL GGVFLCYCMT FIFIAKPSTA VCTLRRLGLG TAFSVCYSAL LTKTNRIARI | | 660 |
| FGGAREGAQR PRFISPASQV AICLALISGQ LLIVAAWLVV EAPGIGKETA PERREVVTLR | | 720 |
| CNHRDASMLG SLAYNVLLIA LCTLYAFKTR KCPENFNEAK FIGFTMYTTC IIWLAFLPIF | | 780 |
| YVTSSDYRVQ TTTMCVSVSL SGSVVLGCLF APKLHIILFQ PQKNVVSHRA PTSRFGSAAP | | 840 |
| RASANLGQGS GSQLVPTVCN GREVVDSTTS SL | | 872 |
| | | |
| SEQ ID NO: 21 | moltype = AA   length = 558 | |
| FEATURE | Location/Qualifiers | |
| source | 1..558 | |
| | mol_type = protein | |
| | organism = Mus musculus | |
| SEQUENCE: 21 | | |
| NAVTYEDVHV NFTQEEWALL DPSQKTLYKD VMLETFRNLN AIGFNWEAQN IEEYCQSSRR | | 60 |
| HRRCERSQSA EKPSEYTQRD KAFALHDHSH AQRHERVHTE KIPSEVIHCV EDFLPYTSLQ | | 120 |
| VHKRTQTGQK PYECNQCGKG FVMPSCLKRH ERPHTGEKPY KCNQCDKAFS QYNNLQTHRR | | 180 |
| THTGEKPYKC NQCDKAFSQH STLQTHRRTH TGEKPFKCNQ CDKAFSEKCS LQTHRRTHTG | | 240 |
| EKPYKCNQCD KAFSQYSHLH IHRRTHTGEK PLKCNECDET FSNHSNLQTH RRIHTGEKPY | | 300 |
| KCNQCDKAFS QHSTLQNHRR THTGEKPFKC NQCDKAFSRH STLQTHRRTH TGEKPFKCNQ | | 360 |
| CDKAFSQYSH LHIHRRTHTG EKPFKCNQCN KAFSQYSHLH IHRRTHTGEK PYKCNQCDKT | | 420 |
| FSNHSTLQTH RRTHTGEKPY KCNQCDKAFS RHSTLQTHRR THTGEKPFKC NQCDKAFSQK | | 480 |
| CSLQKHIRIH TGEKLYKCNE CDKAFSQHST LQTHRRTHTG EKPFKFNECD EGFSHHYNLQ | | 540 |
| IHERRHTREK PYKCIQCV | | 558 |
| | | |
| SEQ ID NO: 22 | moltype = AA   length = 311 | |
| FEATURE | Location/Qualifiers | |
| source | 1..311 | |
| | mol_type = protein | |
| | organism = Mus musculus | |
| SEQUENCE: 22 | | |
| MGLENGSLVT EFILLGLTND PDLQLPLFLL FLLIYTTTAV GNLALITLIA LNSHLHTPMY | | 60 |
| FFLLNLSCID LCYSSVITPK MLMNFLVRKN IISYMGCMTQ LYFFCFFAIC ECCVLTSMAY | | 120 |
| DRYVAICNPL LYNITMSPKV CSYLMLGSYI MGFSGAMIHT GCILRLTFCD RNIINHYFCD | | 180 |
| LPPLLQLSCT STYANEIEIL IVGGKDIIVP SVIIFTSYGF ILSNILQMRS TAGMSKAFST | | 240 |
| CSSHILAVSL FFGSCAFMYL QPSSPGSMDQ GKVSSVFYTI VVPMMNPLIY SFRNKDVKIA | | 300 |
| LRKIFGKRRF S | | 311 |
| | | |
| SEQ ID NO: 23 | moltype = DNA   length = 20 | |
| FEATURE | Location/Qualifiers | |
| misc_feature | 1..20 | |

```
                    note = gRNA sequence
source              1..20
                    mol_type = other DNA
                    organism = synthetic construct
SEQUENCE: 23
cacgcccgag ctgtccagtt                                                     20

SEQ ID NO: 24       moltype = DNA  length = 20
FEATURE             Location/Qualifiers
misc_feature        1..20
                    note = gRNA sequence
source              1..20
                    mol_type = other DNA
                    organism = synthetic construct
SEQUENCE: 24
tacgcactca tactgatgtt                                                     20

SEQ ID NO: 25       moltype = DNA  length = 20
FEATURE             Location/Qualifiers
misc_feature        1..20
                    note = gRNA sequence
source              1..20
                    mol_type = other DNA
                    organism = synthetic construct
SEQUENCE: 25
ctactcctct cgctatgctc                                                     20

SEQ ID NO: 26       moltype = DNA  length = 20
FEATURE             Location/Qualifiers
misc_feature        1..20
                    note = gRNA sequence
source              1..20
                    mol_type = other DNA
                    organism = synthetic construct
SEQUENCE: 26
tgcaaccgcg aaccctpacc                                                     20

SEQ ID NO: 27       moltype = DNA  length = 20
FEATURE             Location/Qualifiers
misc_feature        1..20
                    note = gRNA sequence
source              1..20
                    mol_type = other DNA
                    organism = synthetic construct
SEQUENCE: 27
gcttgacact gcatcgatat                                                     20

SEQ ID NO: 28       moltype = DNA  length = 20
FEATURE             Location/Qualifiers
misc_feature        1..20
                    note = gRNA sequence
source              1..20
                    mol_type = other DNA
                    organism = synthetic construct
SEQUENCE: 28
actttcgtat acagatactg                                                     20

SEQ ID NO: 29       moltype = DNA  length = 20
FEATURE             Location/Qualifiers
misc_feature        1..20
                    note = gRNA sequence
source              1..20
                    mol_type = other DNA
                    organism = synthetic construct
SEQUENCE: 29
ctgcctcctt agttccgaca                                                     20

SEQ ID NO: 30       moltype = DNA  length = 20
FEATURE             Location/Qualifiers
misc_feature        1..20
                    note = gRNA sequence
source              1..20
                    mol_type = other DNA
                    organism = synthetic construct
SEQUENCE: 30
tttcacgctc gatatcctcc                                                     20

SEQ ID NO: 31       moltype = DNA  length = 20
FEATURE             Location/Qualifiers
```

```
SEQ ID NO: 31
FEATURE                 Location/Qualifiers
misc_feature            1..20
                        note = gRNA sequence
source                  1..20
                        mol_type = other DNA
                        organism = synthetic construct
SEQUENCE: 31
catcggtggc tgggtcctcc                                                   20

SEQ ID NO: 32           moltype = DNA  length = 20
FEATURE                 Location/Qualifiers
misc_feature            1..20
                        note = gRNA sequence
source                  1..20
                        mol_type = other DNA
                        organism = synthetic construct
SEQUENCE: 32
gcgcgaggcg gccctaatgc                                                   20

SEQ ID NO: 33           moltype = DNA  length = 20
FEATURE                 Location/Qualifiers
misc_feature            1..20
                        note = gRNA sequence
source                  1..20
                        mol_type = other DNA
                        organism = synthetic construct
SEQUENCE: 33
gctgtatgac ctcggacatc                                                   20

SEQ ID NO: 34           moltype = DNA  length = 20
FEATURE                 Location/Qualifiers
misc_feature            1..20
                        note = gRNA sequence
source                  1..20
                        mol_type = other DNA
                        organism = synthetic construct
SEQUENCE: 34
cttcaaatga gatccactgc                                                   20

SEQ ID NO: 35           moltype = DNA  length = 20
FEATURE                 Location/Qualifiers
misc_feature            1..20
                        note = gRNA sequence
source                  1..20
                        mol_type = other DNA
                        organism = synthetic construct
SEQUENCE: 35
gcggcataac gccacacccg                                                   20

SEQ ID NO: 36           moltype = DNA  length = 20
FEATURE                 Location/Qualifiers
misc_feature            1..20
                        note = 5' PCR primer
source                  1..20
                        mol_type = other DNA
                        organism = synthetic construct
SEQUENCE: 36
tcacagtggt ctgcctcttc                                                   20

SEQ ID NO: 37           moltype = DNA  length = 22
FEATURE                 Location/Qualifiers
misc_feature            1..22
                        note = 5' PCR primer
source                  1..22
                        mol_type = other DNA
                        organism = synthetic construct
SEQUENCE: 37
tgggacttgt ttaaaggagc tt                                                22

SEQ ID NO: 38           moltype = DNA  length = 20
FEATURE                 Location/Qualifiers
misc_feature            1..20
                        note = 5' PCR primer
source                  1..20
                        mol_type = other DNA
                        organism = synthetic construct
SEQUENCE: 38
gcagagacct gaaggacagc                                                   20

SEQ ID NO: 39           moltype = DNA  length = 20
```

```
FEATURE                 Location/Qualifiers
misc_feature            1..20
                        note = 5' PCR primer
source                  1..20
                        mol_type = other DNA
                        organism = synthetic construct
SEQUENCE: 39
ggcttactag ggcgtctggt                                              20

SEQ ID NO: 40           moltype = DNA   length = 20
FEATURE                 Location/Qualifiers
misc_feature            1..20
                        note = 5' PCR primer
source                  1..20
                        mol_type = other DNA
                        organism = synthetic construct
SEQUENCE: 40
gtaactggat tggcccaaga                                              20

SEQ ID NO: 41           moltype = DNA   length = 20
FEATURE                 Location/Qualifiers
misc_feature            1..20
                        note = 5' PCR primer
source                  1..20
                        mol_type = other DNA
                        organism = synthetic construct
SEQUENCE: 41
gtttgcagct cccatgactc                                              20

SEQ ID NO: 42           moltype = DNA   length = 18
FEATURE                 Location/Qualifiers
misc_feature            1..18
                        note = 5' PCR primer
source                  1..18
                        mol_type = other DNA
                        organism = synthetic construct
SEQUENCE: 42
actcagcccc gccctaag                                                18

SEQ ID NO: 43           moltype = DNA   length = 19
FEATURE                 Location/Qualifiers
misc_feature            1..19
                        note = 5' PCR primer
source                  1..19
                        mol_type = other DNA
                        organism = synthetic construct
SEQUENCE: 43
actggtttgg gggatcctt                                               19

SEQ ID NO: 44           moltype = DNA   length = 18
FEATURE                 Location/Qualifiers
misc_feature            1..18
                        note = 5' PCR primer
source                  1..18
                        mol_type = other DNA
                        organism = synthetic construct
SEQUENCE: 44
gagctcgccg accaccat                                                18

SEQ ID NO: 45           moltype = DNA   length = 20
FEATURE                 Location/Qualifiers
misc_feature            1..20
                        note = 5' PCR primer
source                  1..20
                        mol_type = other DNA
                        organism = synthetic construct
SEQUENCE: 45
ttttccctct gttgcagctc                                              20

SEQ ID NO: 46           moltype = DNA   length = 20
FEATURE                 Location/Qualifiers
misc_feature            1..20
                        note = 5' PCR primer
source                  1..20
                        mol_type = other DNA
                        organism = synthetic construct
SEQUENCE: 46
tgactggatg ctttgagctg                                              20
```

```
SEQ ID NO: 47            moltype = DNA   length = 20
FEATURE                  Location/Qualifiers
misc_feature             1..20
                         note = 5' PCR primer
source                   1..20
                         mol_type = other DNA
                         organism = synthetic construct
SEQUENCE: 47
ccacgtcacc tcagctgtct                                                    20

SEQ ID NO: 48            moltype = DNA   length = 20
FEATURE                  Location/Qualifiers
misc_feature             1..20
                         note = 5' PCR primer
source                   1..20
                         mol_type = other DNA
                         organism = synthetic construct
SEQUENCE: 48
caggtctgcc aagttcccta                                                    20

SEQ ID NO: 49            moltype = DNA   length = 20
FEATURE                  Location/Qualifiers
misc_feature             1..20
                         note = 3' PCR primer
source                   1..20
                         mol_type = other DNA
                         organism = synthetic construct
SEQUENCE: 49
tgaaaccttt ccctctccaa                                                    20

SEQ ID NO: 50            moltype = DNA   length = 22
FEATURE                  Location/Qualifiers
misc_feature             1..22
                         note = 3' PCR primer
source                   1..22
                         mol_type = other DNA
                         organism = synthetic construct
SEQUENCE: 50
ttgcgcttct tattatcaat gg                                                 22

SEQ ID NO: 51            moltype = DNA   length = 20
FEATURE                  Location/Qualifiers
misc_feature             1..20
                         note = 3' PCR primer
source                   1..20
                         mol_type = other DNA
                         organism = synthetic construct
SEQUENCE: 51
caaagggatc tcggaaggtt                                                    20

SEQ ID NO: 52            moltype = DNA   length = 19
FEATURE                  Location/Qualifiers
misc_feature             1..19
                         note = 3' PCR primer
source                   1..19
                         mol_type = other DNA
                         organism = synthetic construct
SEQUENCE: 52
actaggggct ctccccact                                                     19

SEQ ID NO: 53            moltype = DNA   length = 21
FEATURE                  Location/Qualifiers
misc_feature             1..21
                         note = 3' PCR primer
source                   1..21
                         mol_type = other DNA
                         organism = synthetic construct
SEQUENCE: 53
tgtggtaaag cttgtgtgtg g                                                  21

SEQ ID NO: 54            moltype = DNA   length = 21
FEATURE                  Location/Qualifiers
misc_feature             1..21
                         note = 3' PCR primer
source                   1..21
                         mol_type = other DNA
                         organism = synthetic construct
SEQUENCE: 54
cagtgtgacc agcagtgaag a                                                  21
```

```
SEQ ID NO: 55             moltype = DNA  length = 20
FEATURE                   Location/Qualifiers
misc_feature              1..20
                          note = 3' PCR primer
source                    1..20
                          mol_type = other DNA
                          organism = synthetic construct
SEQUENCE: 55
cgcacattaa caggcatttc                                                    20

SEQ ID NO: 56             moltype = DNA  length = 20
FEATURE                   Location/Qualifiers
misc_feature              1..20
                          note = 3' PCR primer
source                    1..20
                          mol_type = other DNA
                          organism = synthetic construct
SEQUENCE: 56
aacagatcaa gtggggttgg                                                    20

SEQ ID NO: 57             moltype = DNA  length = 20
FEATURE                   Location/Qualifiers
misc_feature              1..20
                          note = 3' PCR primer
source                    1..20
                          mol_type = other DNA
                          organism = synthetic construct
SEQUENCE: 57
tcagtgcttc acgctctacc                                                    20

SEQ ID NO: 58             moltype = DNA  length = 20
FEATURE                   Location/Qualifiers
misc_feature              1..20
                          note = 3' PCR primer
source                    1..20
                          mol_type = other DNA
                          organism = synthetic construct
SEQUENCE: 58
aggtgaggag ggctgaagat                                                    20

SEQ ID NO: 59             moltype = DNA  length = 18
FEATURE                   Location/Qualifiers
misc_feature              1..18
                          note = 3' PCR primer
source                    1..18
                          mol_type = other DNA
                          organism = synthetic construct
SEQUENCE: 59
cgccttaagg tgcagacg                                                      18

SEQ ID NO: 60             moltype = DNA  length = 21
FEATURE                   Location/Qualifiers
misc_feature              1..21
                          note = 3' PCR primer
source                    1..21
                          mol_type = other DNA
                          organism = synthetic construct
SEQUENCE: 60
agtggatagg gtgtgtgatg c                                                  21

SEQ ID NO: 61             moltype = DNA  length = 20
FEATURE                   Location/Qualifiers
misc_feature              1..20
                          note = 3' PCR primer
source                    1..20
                          mol_type = other DNA
                          organism = synthetic construct
SEQUENCE: 61
ctcctagccc ttctgtggtg                                                    20
```